United States Patent
Naoe et al.

(10) Patent No.: US 8,051,182 B2
(45) Date of Patent: Nov. 1, 2011

(54) COMMUNICATION DEVICE, COMMUNICATION SYSTEM, COMMUNICATION METHOD, COMMUNICATION PROGRAM, AND COMMUNICATION CIRCUIT

(75) Inventors: Hitoshi Naoe, Kitakatsuragi-gun (JP); Fumihiro Fukae, Sakurai (JP); Koji Sakai, Osaka (JP); Shohei Ohsawa, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 411 days.

(21) Appl. No.: 11/883,254

(22) PCT Filed: Jan. 26, 2006

(86) PCT No.: PCT/JP2006/301183
§ 371 (c)(1),
(2), (4) Date: Jul. 26, 2007

(87) PCT Pub. No.: WO2006/080372
PCT Pub. Date: Aug. 3, 2006

(65) Prior Publication Data
US 2008/0189422 A1    Aug. 7, 2008

(30) Foreign Application Priority Data

| Jan. 28, 2005 | (JP) | 2005-022209 |
| Jan. 31, 2005 | (JP) | 2005-023901 |
| Jan. 31, 2005 | (JP) | 2005-023929 |
| Apr. 13, 2005 | (JP) | 2005-116096 |
| May 25, 2005 | (JP) | 2005-152910 |
| Jun. 30, 2005 | (JP) | 2005-192903 |
| Aug. 5, 2005 | (WO) | PCT/JP2005/014446 |
| Sep. 16, 2005 | (JP) | 2005-271231 |

(51) Int. Cl.
*G06F 15/16* (2006.01)

(52) U.S. Cl. ........ 709/227; 709/230; 709/250; 370/490; 370/466

(58) Field of Classification Search .................. 709/227
See application file for complete search history.

(56) References Cited

U.S. PATENT DOCUMENTS
4,957,348 A    9/1990 May
(Continued)

FOREIGN PATENT DOCUMENTS
CN    1394029 A    1/2003
(Continued)

OTHER PUBLICATIONS

Naoe et al., "Sekigaisan Tsushin o Mochiita Kokoritsu Protocol no Hyojunka Teian," The Institute of Electronics, Information and Communication Engineers, Nen Sogo Taikai Koen Ronbunshu, B-10-54, 2005.
(Continued)

*Primary Examiner* — Wing F Chan
*Assistant Examiner* — Tesfay Yohannes
(74) *Attorney, Agent, or Firm* — Birch, Stewart, Kolasch & Birch, LLP

(57) ABSTRACT

The present invention is a network layer protocol used for free-space optical transmission utilizing an LED or LD as a light source. In order to connect to a device, the network layer issues a connection request command (LAP_con_req2) to a lower layer when the network layer has received a connection request command (LM_con_req1) from an upper layer. Furthermore, when the network layer has received a connection confirmation command reception notification (LAP_con_conf1) from the lower layer, the network layer issues a connection confirmation command reception notification (LM_con_conf2) to the upper layer without issuing a data transfer request command to the lower layer. Accordingly, the invention provides a network layer protocol with which time for a connection or disconnection is reduced.

20 Claims, 33 Drawing Sheets

U.S. PATENT DOCUMENTS

| | | | |
|---|---|---|---|
| 5,448,561 A * | 9/1995 | Kaiser et al. | 370/471 |
| 5,450,412 A | 9/1995 | Takebayashi et al. | |
| 5,509,121 A * | 4/1996 | Nakata et al. | 709/230 |
| 5,515,508 A | 5/1996 | Pettus et al. | |
| 5,557,634 A | 9/1996 | Balasubramanian et al. | |
| 5,563,943 A | 10/1996 | Takebayashi et al. | |
| 5,585,952 A | 12/1996 | Imai et al. | |
| 5,638,373 A | 6/1997 | Takebayashi et al. | |
| 5,706,110 A | 1/1998 | Nykanen | |
| 5,764,643 A | 6/1998 | Takebayashi et al. | |
| 6,006,294 A | 12/1999 | Kurihara | |
| 6,034,962 A * | 3/2000 | Ohno et al. | 370/399 |
| 6,154,298 A | 11/2000 | Tamagawa | |
| 6,178,181 B1 | 1/2001 | Glitho | |
| 6,188,431 B1 | 2/2001 | Oie | |
| 6,211,797 B1 | 4/2001 | Kimura | |
| 6,256,296 B1 | 7/2001 | Ruziak et al. | |
| 6,297,802 B1 | 10/2001 | Fujioka | |
| 6,336,142 B1 | 1/2002 | Kato et al. | |
| 6,347,339 B1 | 2/2002 | Morris et al. | |
| 6,411,813 B1 | 6/2002 | Sano | |
| 6,629,373 B1 | 10/2003 | Donaldson | |
| 6,728,774 B1 | 4/2004 | Nykanen | |
| 6,735,245 B1 | 5/2004 | Palm | |
| 6,754,451 B1 | 6/2004 | Nakamura | |
| 6,812,881 B1 | 11/2004 | Mullaly et al. | |
| 6,839,564 B2 | 1/2005 | Sutinen et al. | |
| 6,842,433 B2 | 1/2005 | West et al. | |
| 6,865,687 B1 | 3/2005 | Ichimi | |
| 6,907,013 B1 | 6/2005 | Ruziak | |
| 6,944,483 B1 | 9/2005 | Motohashi | |
| 7,069,059 B2 | 6/2006 | Osawa | |
| 7,363,534 B1 | 4/2008 | Krishnamurthy et al. | |
| 7,366,532 B2 | 4/2008 | Khawand et al. | |
| 7,403,543 B2 * | 7/2008 | Lee et al. | 370/477 |
| 7,411,974 B2 | 8/2008 | Attar et al. | |
| 7,729,290 B2 | 6/2010 | Saleh et al. | |
| 2001/0007137 A1 * | 7/2001 | Suumaki et al. | 714/18 |
| 2001/0032326 A1 | 10/2001 | Haneda | |
| 2001/0044914 A1 | 11/2001 | Nakano et al. | |
| 2002/0065065 A1 | 5/2002 | Lunsford et al. | |
| 2002/0196782 A1 * | 12/2002 | Furukawa et al. | 370/352 |
| 2002/0196812 A1 | 12/2002 | Yamaguchi et al. | |
| 2003/0107651 A1 | 6/2003 | Chen et al. | |
| 2003/0114107 A1 | 6/2003 | Aoyagi | |
| 2003/0169744 A1 | 9/2003 | Elzur | |
| 2004/0042487 A1 * | 3/2004 | Ossman | 370/466 |
| 2004/0054796 A1 | 3/2004 | Kikuchi et al. | |
| 2004/0080537 A1 | 4/2004 | Adler | |
| 2004/0081436 A1 | 4/2004 | Tada et al. | |
| 2004/0111535 A1 * | 6/2004 | Boucher et al. | 709/250 |
| 2004/0170134 A1 | 9/2004 | Furuyama et al. | |
| 2004/0186928 A1 * | 9/2004 | Fukunaga et al. | 710/15 |
| 2004/0218209 A1 | 11/2004 | Hamaguchi et al. | |
| 2004/0228332 A1 | 11/2004 | Seguin et al. | |
| 2005/0014468 A1 | 1/2005 | Salokannel et al. | |
| 2005/0025188 A1 * | 2/2005 | Numakura et al. | 370/490 |
| 2005/0071733 A1 | 3/2005 | Fukae et al. | |
| 2005/0083885 A1 | 4/2005 | Ikeda et al. | |
| 2005/0091412 A1 | 4/2005 | Pinkerton et al. | |
| 2005/0097191 A1 | 5/2005 | Yamaki et al. | |
| 2005/0138226 A1 * | 6/2005 | Tateyama et al. | 710/11 |
| 2005/0254456 A1 | 11/2005 | Sakai et al. | |
| 2005/0271022 A1 | 12/2005 | Osawa et al. | |
| 2006/0250973 A1 | 11/2006 | Trott | |
| 2006/0291502 A1 | 12/2006 | Kalofonos | |
| 2007/0057762 A1 | 3/2007 | Han et al. | |
| 2007/0064733 A1 | 3/2007 | Osawa et al. | |
| 2008/0008165 A1 * | 1/2008 | Ikeda et al. | 370/360 |
| 2008/0126554 A1 | 5/2008 | Sakai et al. | |
| 2008/0145058 A1 | 6/2008 | Fukae et al. | |
| 2008/0189422 A1 | 8/2008 | Naoe et al. | |
| 2008/0279560 A1 | 11/2008 | Osawa et al. | |
| 2008/0279562 A1 | 11/2008 | Naoe et al. | |
| 2008/0291941 A1 | 11/2008 | Sakai et al. | |
| 2008/0313518 A1 | 12/2008 | Naoe et al. | |
| 2009/0190502 A1 | 7/2009 | Mameda et al. | |
| 2009/0262661 A1 | 10/2009 | Ueda et al. | |

FOREIGN PATENT DOCUMENTS

| | | |
|---|---|---|
| EP | 0 584 464 A1 | 3/1994 |
| EP | 0 886 410 A2 | 12/1998 |
| EP | 1780984 A1 | 5/2007 |
| JP | 58-56200 A | 4/1983 |
| JP | 62-29238 A | 2/1987 |
| JP | 64-32360 A | 2/1989 |
| JP | 1-164140 A | 6/1989 |
| JP | 02-016847 A | 1/1990 |
| JP | 2-41050 A | 2/1990 |
| JP | 2-281830 A | 11/1990 |
| JP | 3-70059 A | 3/1991 |
| JP | 3-98338 A | 4/1991 |
| JP | 3-139935 A | 6/1991 |
| JP | 4-839 A | 1/1992 |
| JP | 4-269031 A | 9/1992 |
| JP | 4-271567 A | 9/1992 |
| JP | 4-291556 A | 10/1992 |
| JP | 5-30150 A | 2/1993 |
| JP | 5-175985 A | 7/1993 |
| JP | 5-260124 A | 10/1993 |
| JP | 6-70383 A | 3/1994 |
| JP | 6-152687 A | 5/1994 |
| JP | 7-15485 A | 1/1995 |
| JP | 7-46292 A | 2/1995 |
| JP | 8-191271 A | 7/1996 |
| JP | 8-195785 A | 7/1996 |
| JP | 8-314831 A | 11/1996 |
| JP | 9-135210 A | 5/1997 |
| JP | 2655404 B2 | 5/1997 |
| JP | 9-154176 A | 6/1997 |
| JP | 9-224069 A | 8/1997 |
| JP | 9-284696 A | 10/1997 |
| JP | 9-312674 A | 12/1997 |
| JP | 10-98435 A | 4/1998 |
| JP | 10-107737 A | 4/1998 |
| JP | 10-126758 A | 5/1998 |
| JP | 10-145452 A | 5/1998 |
| JP | 10-163902 A | 6/1998 |
| JP | 10-290348 A | 10/1998 |
| JP | 10-307891 A | 11/1998 |
| JP | 11-4306 A | 1/1999 |
| JP | 11-154908 A | 6/1999 |
| JP | 11-317724 A | 11/1999 |
| JP | 2000-10745 A | 1/2000 |
| JP | 2000-31993 A | 1/2000 |
| JP | 2000-32000 A | 1/2000 |
| JP | 2000-69403 A | 3/2000 |
| JP | 2000-101605 A | 4/2000 |
| JP | 2000-196622 A | 7/2000 |
| JP | 2000-196654 A | 7/2000 |
| JP | 2000-332688 A | 11/2000 |
| JP | 2000-349782 A | 12/2000 |
| JP | 2001-60912 A | 3/2001 |
| JP | 2001-69297 A | 3/2001 |
| JP | 2001-83948 A | 3/2001 |
| JP | 2001-145164 A | 5/2001 |
| JP | 2001-202281 A | 7/2001 |
| JP | 2001-308955 A | 11/2001 |
| JP | 2002-51162 A | 2/2002 |
| JP | 2002-509378 A | 3/2002 |
| JP | 2002-135260 A | 5/2002 |
| JP | 2002-158730 A | 5/2002 |
| JP | 2002-223466 A | 8/2002 |
| JP | 2002-232507 A | 8/2002 |
| JP | 2003-69610 A | 3/2003 |
| JP | 2003-508728 A | 3/2003 |
| JP | 2003-101554 A | 4/2003 |
| JP | 2003-110579 A | 4/2003 |
| JP | 2003-218936 A | 7/2003 |
| JP | 2003-258880 A | 9/2003 |
| JP | 2003-263403 A | 9/2003 |
| JP | 2004-41375 A | 2/2004 |
| JP | 2004-64533 A | 2/2004 |
| JP | 2004-94555 A | 3/2004 |
| JP | 2004-104441 A | 4/2004 |
| JP | 2004-177586 A | 6/2004 |
| JP | 2004-236108 A | 8/2004 |
| JP | 2004-343246 A | 12/2004 |

| | | |
|---|---|---|
| JP | 2005-354652 A | 12/2005 |
| JP | 2006-211425 A | 8/2006 |
| WO | WO 99/31814 A1 | 6/1999 |
| WO | WO 02/23885 A1 | 3/2002 |
| WO | WO 2006/080357 A1 | 8/2006 |

OTHER PUBLICATIONS

Matsumoto et al., "Mobile Kankyo ni okeru Tsushin Media no Hyoka," National Institute of Advanced Industrial Science and Technology, OFS99-54 to 66, 2000, pp. 1-7.

"A Proposal of next generation proximity infrared communication—Optimization of IrDA protocol by IrSimple," Conference Presentations, The Institute of Image Electronics Engineers of Japan.

"Standardization Proposal of High Efficiency Protocols by using Infrared Data Association," IEICE Communications Society Conference, 2005, Technical Reports published Sep. 7, 2005, PowerPoint documents enclosed.

"High Efficiency Protocols (IrSimple) Using Infrared Communication," IEICE Communications Society Conference, 2005, Technical Reports published on Sep. 7, 2005, PowerPoint documents enclosed.

Infrared Data Association Serial Infrared Physical Layer Specification Version 1.4, May 30, 2001.

Infrared Data Association Serial Infrared Link Access Protocol (IrLAP) Version 1.1, Jun. 16, 1996.

Infrared Data Association Link Management Protocol Version 1.1, Jan. 23, 1996.

Infrared Data Association 'Tiny TP': A Flow-Control Mechanism for use with IrLMP Version 1.1, Oct. 20, 1996.

Infrared Data Association® (IrDA®) Object Exchange Protocol OBEX™ Version 1.3, Jan. 3, 2003.

IrDA Serial Infrared Sequence Management Protocol for IrSimple Version 1.00, Oct. 14, 2005.

IrDA Serial Infrared Link Management Protocol Specification for IrSimple Addition Errata to IrLMP Version 1.1 Version 1.00, Oct. 14, 2005.

IrSimple (Infrared Simple) Profile Version 1.00, Oct. 14, 2005.

IrDA Serial Infrared Link Access to Protocol Specification for IrSimple Addition Errata to IrLAP, Version 1.1 Version 1.00, Oct. 14, 2005.

H. Naoe et al., IrDA Next Generation High-Speed Infrared Communications Standards 'IrSimple', The Institute of Image Electronics Engineers of Japan, vol. 35, pp. 598-602 (2006).

H. Naoe et al., "Standardization of IrSimple, a High-Speed Infrared Communications Protocol", Sharp Technical Journal, 2007.02, vol. 95, pp. 63-68, URL; http://www.sharp.co.jp.corporate/rd/30/pdf/95_13.pdf.

"Infrared Data Association Serial Infrared Physical Layer Specification," Version 1.4, pp. i-iv & 1-60, May 30, 2001.

Diviney et al., "Infrared Data Association IrLAP Fast Connect (Application Note)," Version 1.0, pp. 1-17, Nov. 27, 2002.

Kitazumi et al., "A Proposal of next generation proximity infrared communication—Optimization of IrDA protocol by IrSimple," Institute of Image Electronics Engineers of Japan, IIEEJ Technical Report, 2 pages, Nov. 18, 2005.

Matsumoto et al., "An Evaluation of the Optical Wireless System in the Mobile Environment in the Room", Technical Report of IEICE, The Institute of Electronics, Information and Communication Engineers, pp. 1-7, Jan. 28, 2000.

Megowan et al., "Infrared Data Association® (IrDA®) Object Exchange Protocol OBEX," Version 1.3, pp. 1-95, Jan. 3, 2003.

Naoe et al., "Infrared Data Association IrDA Serial Infrared Link Access Protocol Specification for IrSimple Addition-Errata to IrLAP Version 1.1," Version 1.00, pp. 1-65, Oct. 14, 2005.

Naoe et al., "Infrared Data Association IrSimple (Infrared Simple) Profile," Version 1.00, pp. 1-30, Oct. 14, 2005.

Naoe et al., "High Efficiency Protocols (IrSimple) Using Infrared Communication—IrSimple Profile and Protocols at Infrared Data Association," B-15-14, Conference Presentation, Institute of Electronics, Information and Communication Engineers (IEICE), 1 page, Technical Reports published Sep. 7, 2005 with PowerPoint presentation Mar. 2005.

Naoe et al., "Infrared Data Association IrDA Serial Infrared Link Management Protocol Specification for IrSimple Addition-Errata to IrLMP Version 1.1," Version 1.00, pp. 1-27, Oct. 14, 2005.

Naoe et al., "Infrared Data Association IrDA Serial Infrared Sequence Management Protocol for IrSimple," Version 1.00, pp. 1-64, Oct. 14, 2005.

Naoe et al., "IrDA Next Generation High-Speed Infrared Communications Standards "IrSimple"," Technical Report of IEICE, The Institute of Image Electronics Engineers of Japan, vol. 35, pp. 598-602, 2006.

Naoe et al., "Standardization of IrSimple, a High-Speed Infrared Communications Protocol," Sharp Technical Journal, vol. 95, pp. 63-68, Feb. 2007 URL: http://www.sharp.co.jp/corporate/rd/03/pdf/95_13.pdf.

Naoe et al., "Standardization Proposal of High Efficiency Protocols by using Infrared Data Association," B-10-54, Conference Presentation, Institute of Electronics Information and Communication Engineers (IEICE), p. 344, Technical Reports published Sep. 7, 2005; with PowerPoint Presentation, Mar. 2005.

Naoe et al., "IrSimple Profile and Protocols at Infrared Data Association," B-15-14, IECE Society Conference Abstracts, p. 617, 2005.

S. Williams et al., "Infrared Data Association 'Tiny TP': A Flow-Control Mechanism for use with IrLMP," Version 1.1, pp. 1-17, Oct. 20, 1996.

Seaborne et al., "Infrared Data Association Link Management Protocol (IrLAP)," Version 1.1, pp. 1-98, Jan. 23, 1996.

T. Williams et al., "Infrared Data Association Serial Infrared Link Access Protocol (IrLAP),", Version 1.1, pp. 1-116, Jun. 16, 1996.

Yamaguchi et al., "Implementation of IrSimple for Mobile Phones," B-15-15, Paper for Institute of Electronics, Information and Communication Engineers (IEICE), Communication Society Conference, p. 618, 2005.

Office Action dated Jul. 11, 2011 for U.S. Appl. No. 11/883,253.

\* cited by examiner

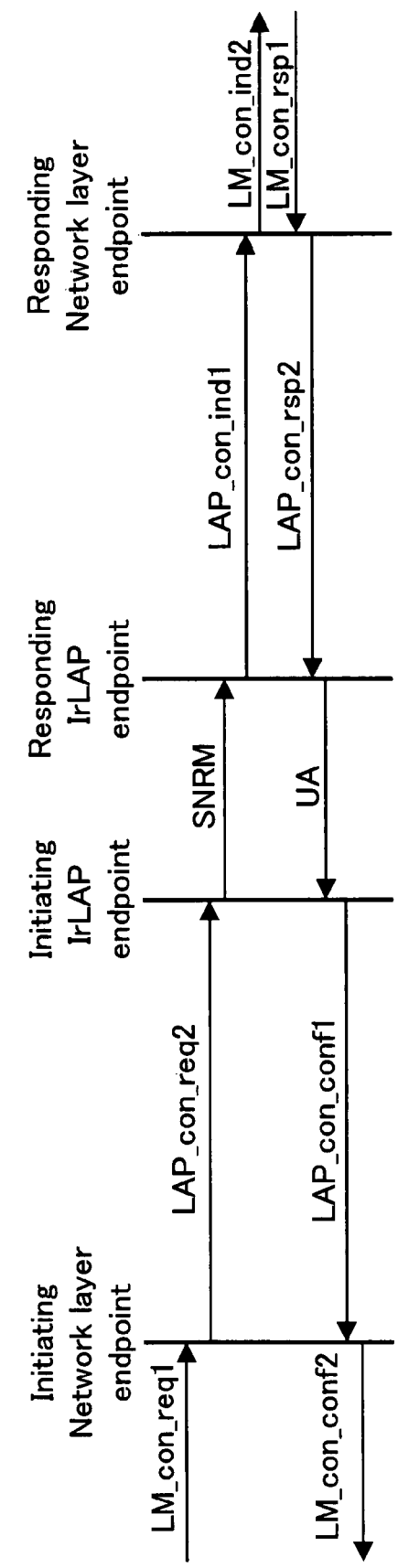
F I G. 1

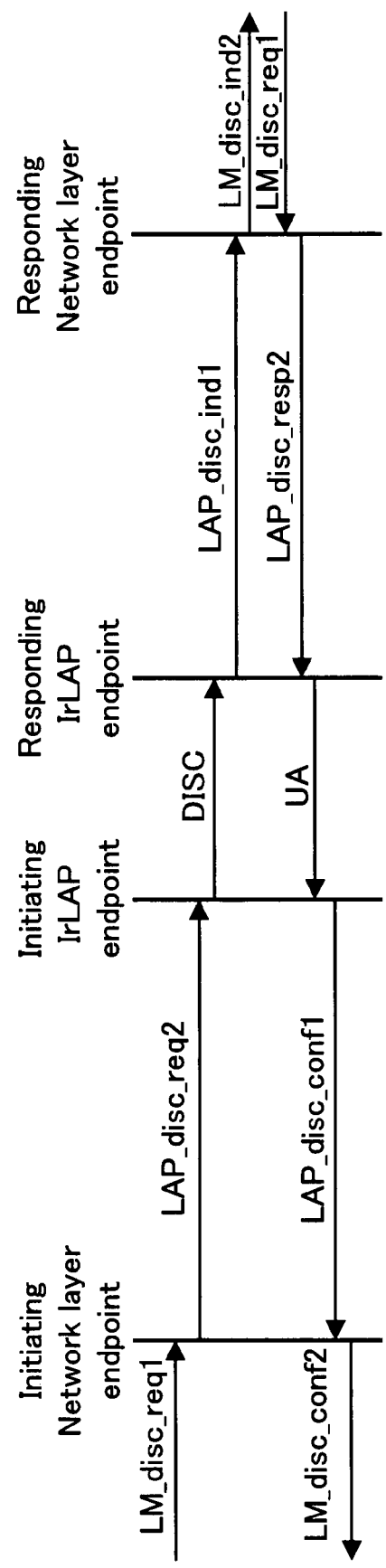
F I G. 2

F I G. 5
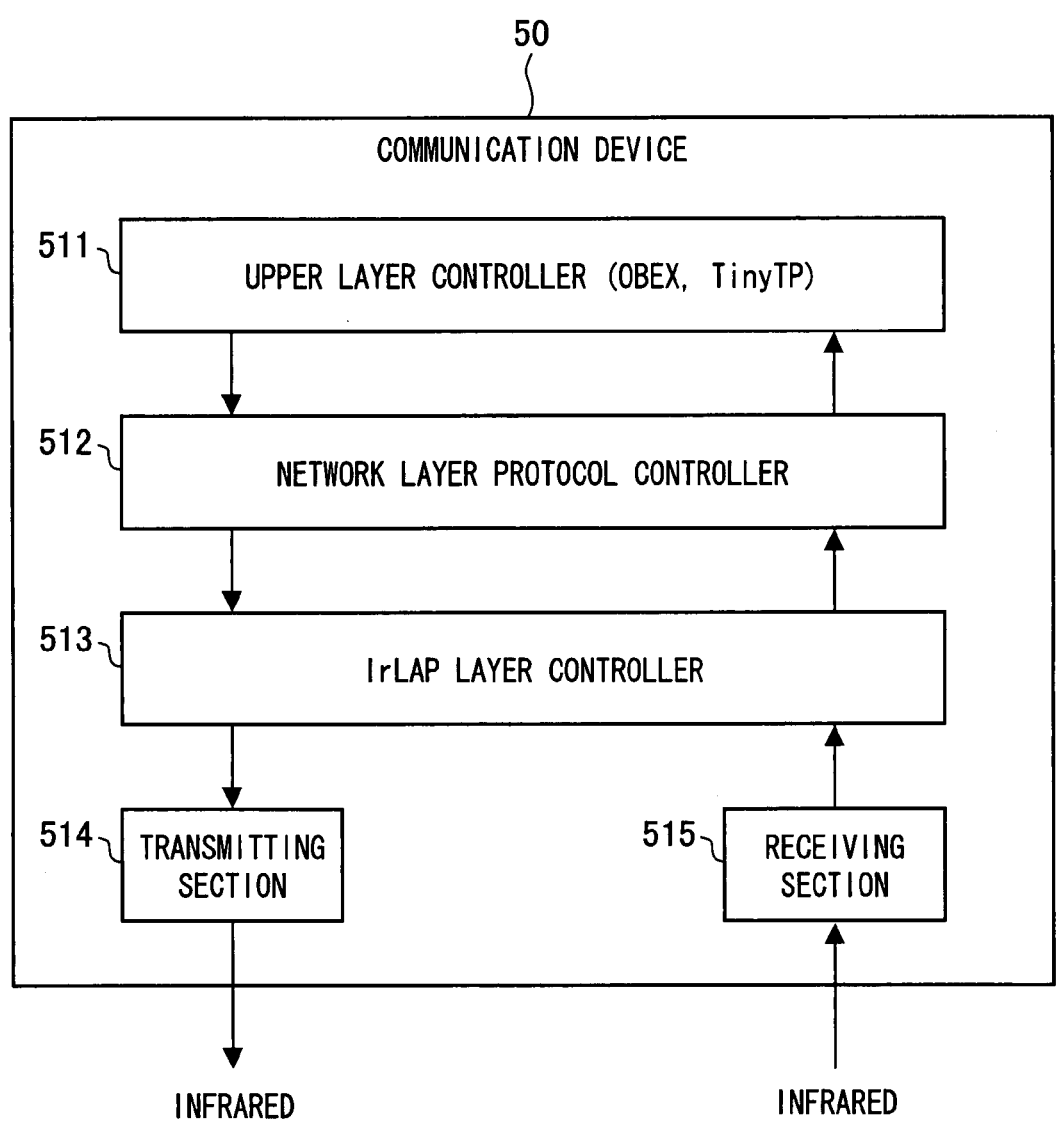

FIG. 8
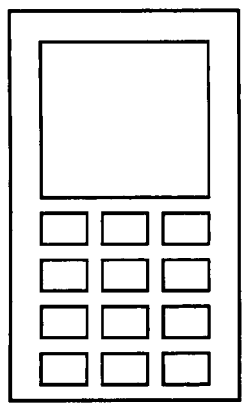
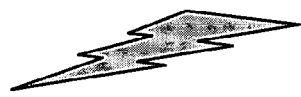
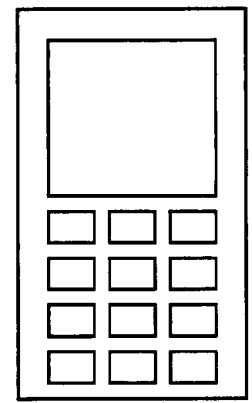
MOBILE PHONE A          MOBILE PHONE B
FIG. 9
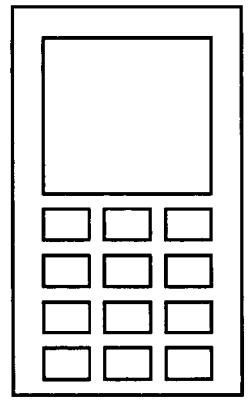
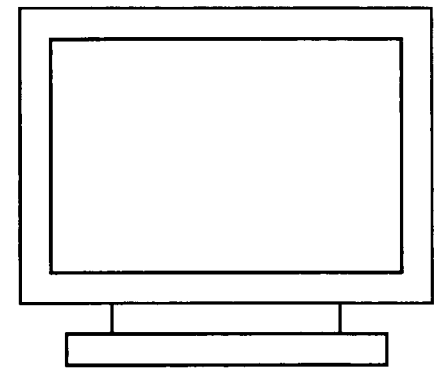
MOBILE PHONE A          DISPLAY DEVICE B

MOBILE PHONE A

PRINTING DEVICE B

MOBILE PHONE A

RECORDING DEVICE B

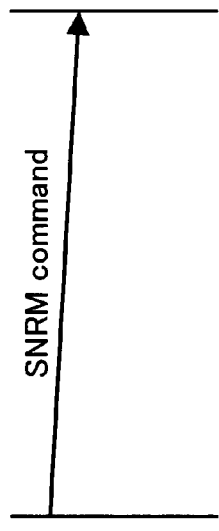
F I G. 1 4 (a)
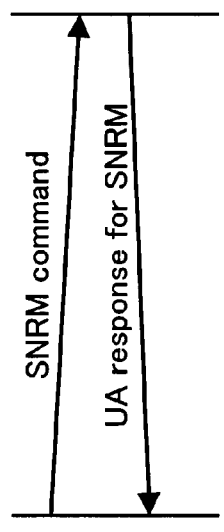
F I G. 1 4 (b)
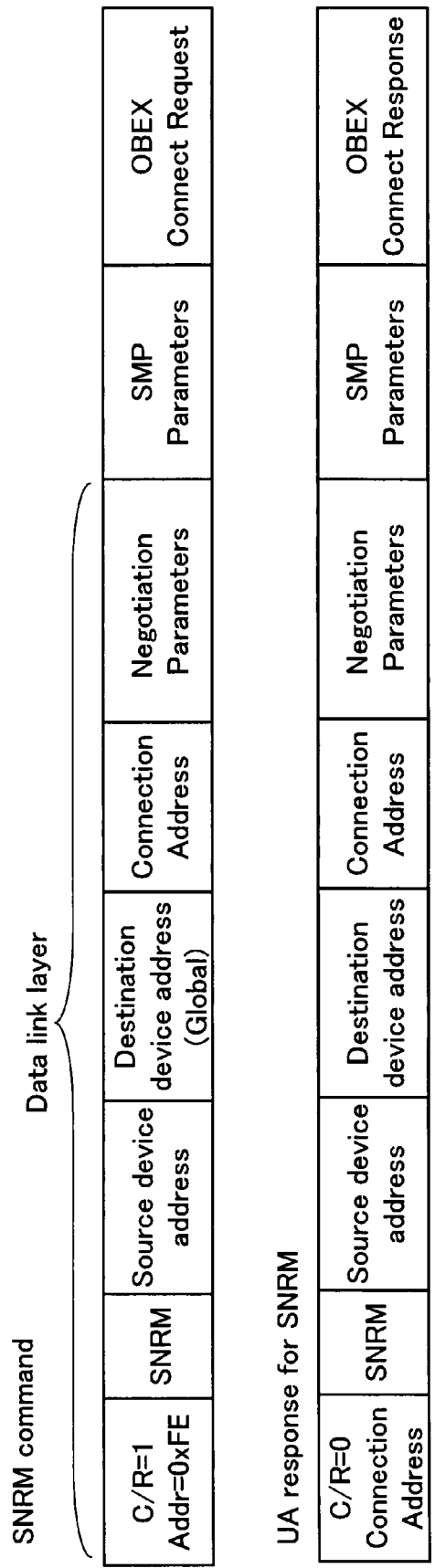
F I G. 1 4 (c)

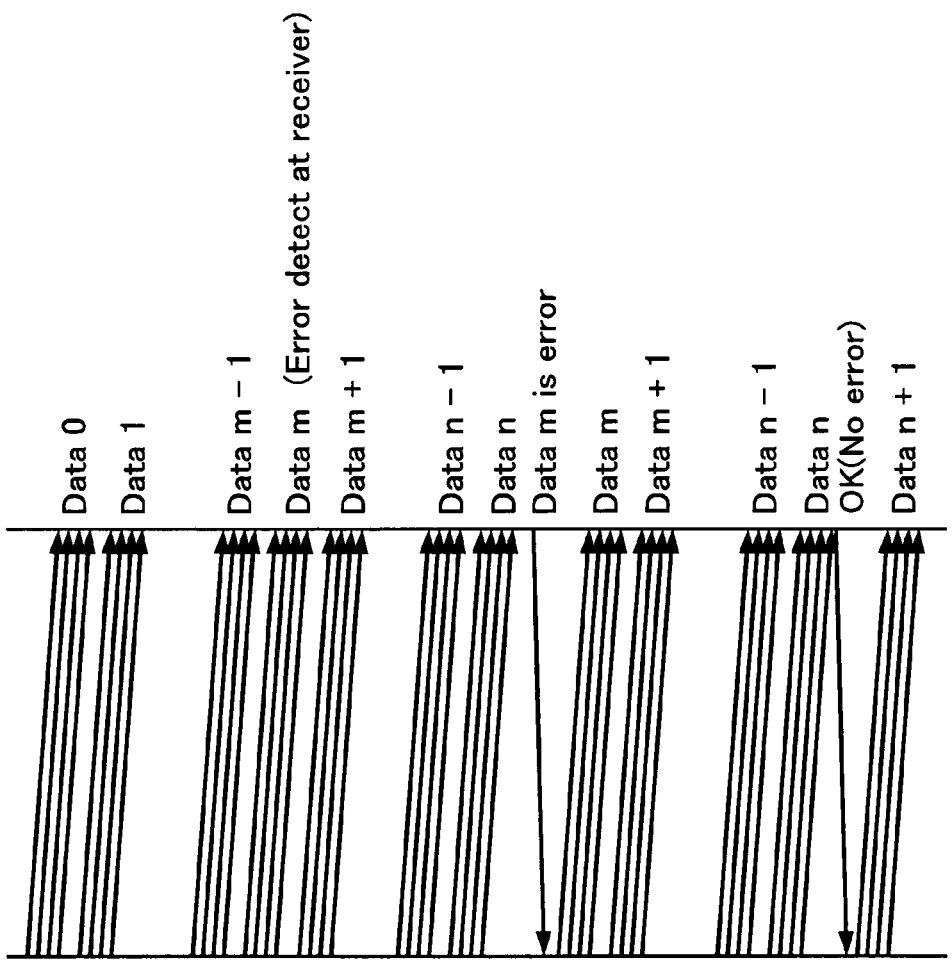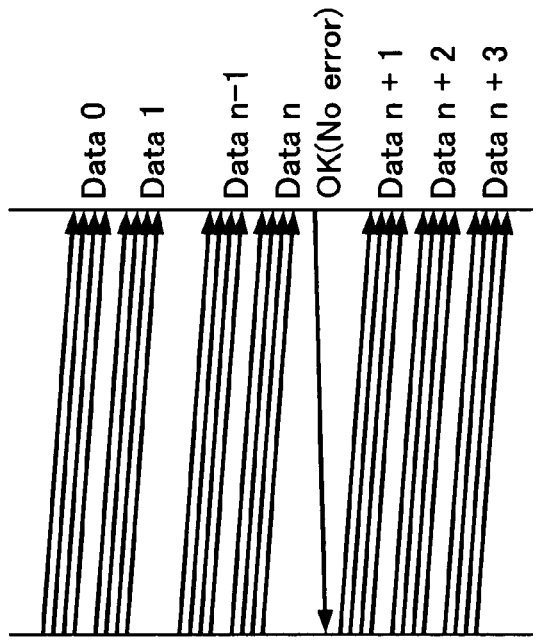

FIG. 16(a)

IrDA DATA FRAME (I FRAME)

| Addr | Nr/Ns | LSAP | TTP Header | OBEX Data |
|------|-------|------|------------|-----------|

FIG. 16(b)

DATA FRAME OF THE PRESENT INVENTION (UI FRAME)

| Addr | UI | LSAP | sending right Sequential Number | OBEX Data |
|------|----|------|--------------------------------|-----------|

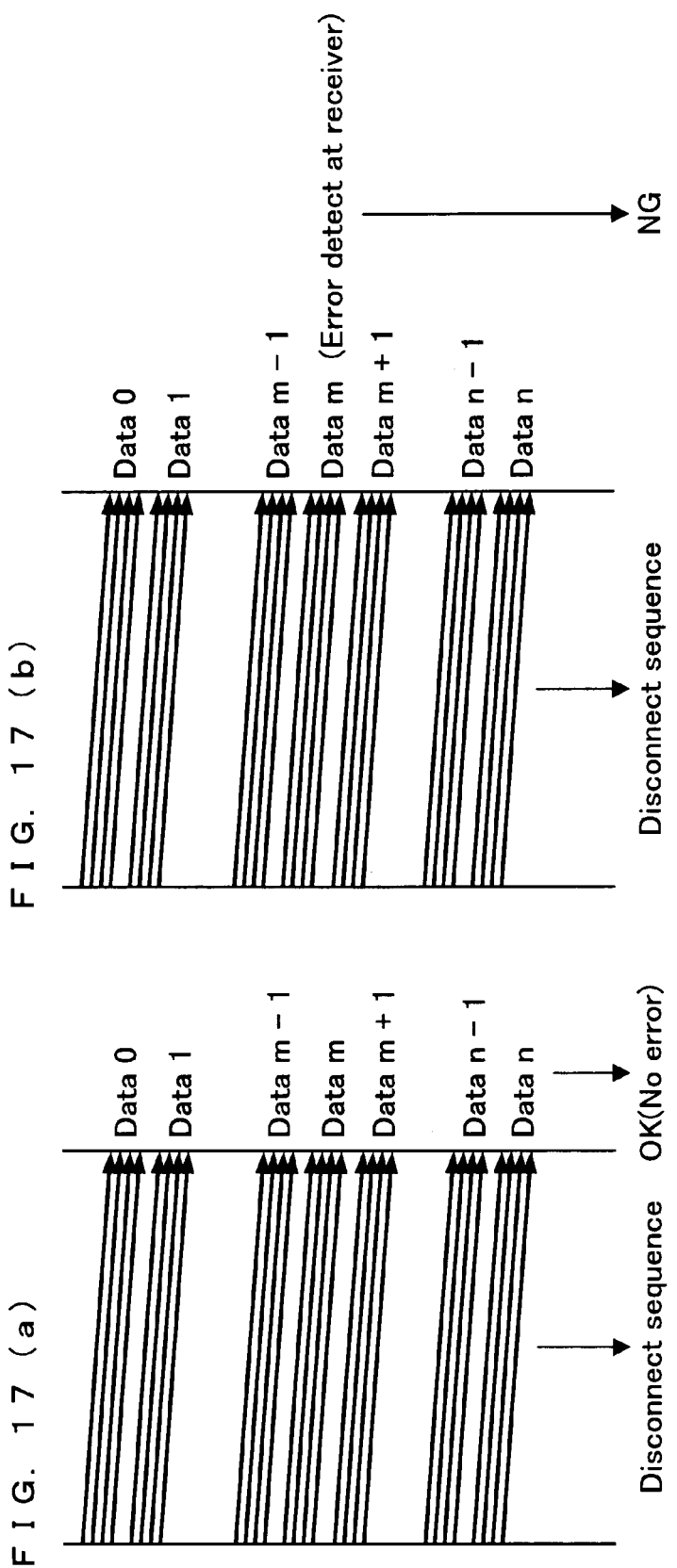

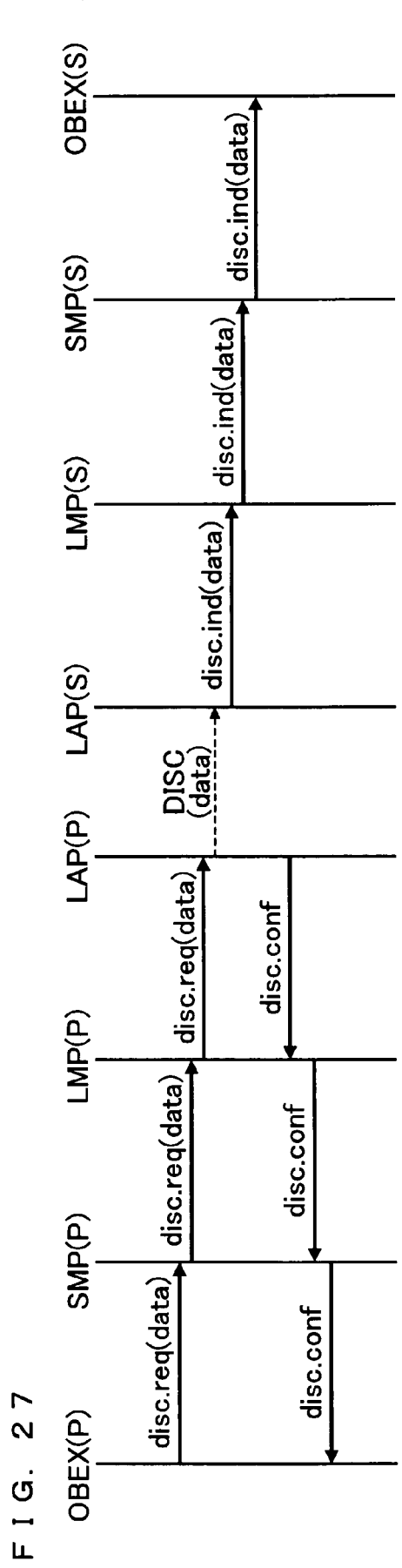
F I G. 27

F I G. 3 2
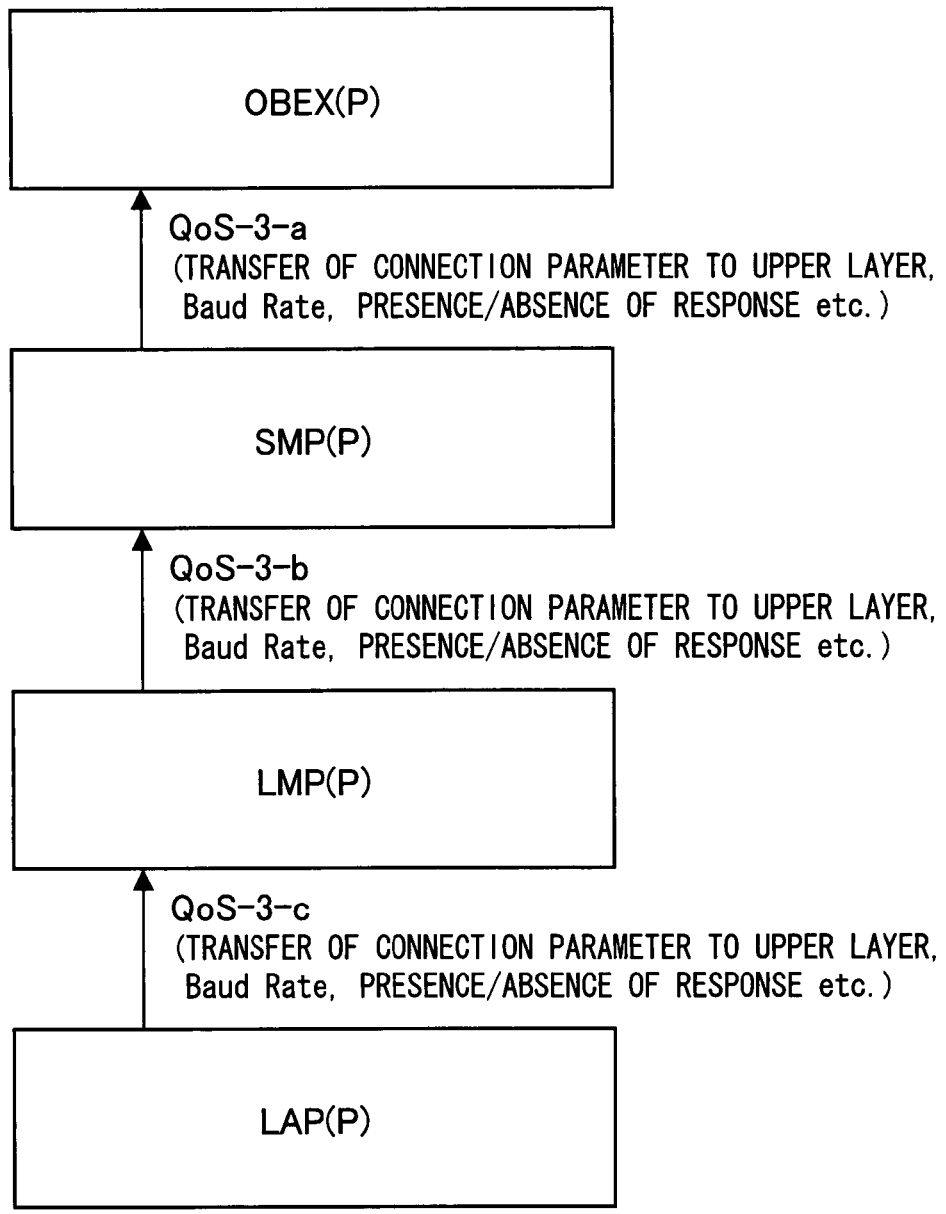

COMMUNICATION DEVICE, COMMUNICATION SYSTEM, COMMUNICATION METHOD, COMMUNICATION PROGRAM, AND COMMUNICATION CIRCUIT

TECHNICAL FIELD

The present invention relates to communication devices, communication systems, communication methods, communication programs, and communication circuits for wireless or wired communication.

BACKGROUND ART

The IrDA (Infrared Data Association) scheme is one of currently known free-space optical communication standards. The IrDA scheme uses IrLMP (Infrared Link Management Protocol) as the network layer protocol.

In IrLMP, the connection and disconnection with other devices is carried out primarily by station control which controls that connection and disconnection via an IrLAP (Infrared Link Access Protocol) which is a lower layer and a LSAP (Link Service Access Point) which logically controls the connection.

To connect to a device, as shown in FIG. 3, when the LSAP of the primary station (initiating station) receives, from the upper layer, a connection request command 1 (LM_con_req1) which contains data needed to establish a connection to the secondary station (responding station), the LSAP issues a connection request command 2 (LS_con_req2) to the station control of the primary station which then issues a connection request command 3 (LAP_con_req3) to the IrLAP (lower layer) of the primary station.

The IrLAP of the primary station receives the connection request command 3 and outputs an SNRM command at a transfer rate of 9,600 bps to the secondary station (responding device). The IrLAP of the secondary station, upon receiving the SNRM command, issues a connection request command reception notification 1 (LAP_con_ind1) to the station control which is part of the IrLMP layer of the secondary station. When receiving the notification 1, the station control of the secondary station issues a connection confirmation command 1 (LAP_con_rsp1) to the IrLAP of the secondary station.

The IrLAP of the secondary station receives the connection confirmation command 1 and outputs a UA response to the primary station at a transfer rate of 9,600 bps. The IrLAP of the primary station receives the UA response and communicates a connection confirmation command reception notification 1 (LAP_con_conf1) to the station control of the primary station. The station control of the primary station issues a connection confirmation command reception notification 2 (LS_con_conf2) to the LSAP of the primary station.

The LSAP of the primary station receives the connect command reception notification 2 and issues a data transmission request 1 (LAP_Data_req1) for a transmission of data present in the connection request command 1 to the IrLAP. Upon receiving the data transmission request 1, the IrLAP outputs an I frame to the secondary station. The transfer rate of the I frame in that situation is determined by the IrLAP layer (lower layer) by observing the exchange of the aforementioned SNRM command and UA response: for example, 115.2 kbps or 4 Mbps.

The IrLAP of the secondary station receives the I frame, issues a data reception notification 1 (LAP_Data_ind1) to the LSAP of the secondary station, and passes data to the LSAP of the secondary station.

The LSAP of the secondary station, upon the parameter reception, issues a connection request command 4 (LS_con_req4) to the station control of the secondary station. Upon receiving the connection request command 4, the station control of the secondary station issues a connection confirmation command reception notification 3 (LS_con_conf3) to the LSAP of the secondary station.

The LSAP of the secondary station issues, to the upper layer of the secondary station, a connection request command reception notification 2 (LM_con_ind2) which contains the data received from the primary station and needed to establish a connection. The upper layer of the secondary station receives the connection request command reception notification 2 and issues, to the LSAP of the secondary station, a connection confirmation command 4 (LM_con_rsp4) which contains data needed to establish a connection to the other device. The LSAP of the secondary station receives the connection confirmation command 4 and issues a data transmission request 2 (LAP_DATA_req2) to the IrLAP of the secondary station.

The IrLAP of the secondary station receives this and transmits an I frame to the primary station. Upon receiving the I frame, the IrLAP of the primary station issues a data reception notification 2 (LAP_Data_ind2) to the LSAP of the primary station. The LSAP issues connection confirmation command reception notification 4 (LM_con_conf4) which contains data received from the secondary station and needed to establish a connection. That ends the series of actions (connection sequence) by the IrLMP layer.

To disconnect from the other device, as shown in FIG. 4, the upper layer of the primary station issues a disconnection request command 1 (LM_disc_req1) which contains data needed for a disconnection. Upon receiving the disconnection request command 1, the LSAP of the primary station issues a data transmission request (LAP_Data_req) to transmit the data of the disconnection request command 1. The IrLAP of the primary station, upon receiving the data transmission request, transmits an I frame to the secondary station. The IrLAP of the secondary station receives the I frame and issues a data reception notification (LAP_Data_ind) to the LSAP.

The LSAP of the secondary station identifies the data in the data reception notification as indicating a request for a disconnection. The LSAP then issues a disconnection request 3 (LS_disc_req3) to the station control of the secondary station and issues, to the upper layer, a disconnection command reception notification (LM_disc_ind) containing data which came from the primary station and needed for a disconnection. Meanwhile, the LSAP of the primary station, after issuing a data transmission request, issues a disconnection request command 2 (LS_disc_req2) to the station control of the primary station.

The station control of the primary station receives the disconnection request command 2 and implements a disconnection, and issues a disconnection request command 4 (LAP_disc_req4) to the IrLAP of the primary station. The IrLAP of the primary station receives the disconnection request command 4 and issues a DISC command to the secondary station. The IrLAP of the secondary station receives the DISC command and transmits a UA response to the primary station. That ends the series of actions (disconnection sequence) by the IrLMP layer.

[Non-patent Document 1] Infrared Data Association Link Management Protocol Version 1.1 [Search conducted on Jan. 21, 2005], the Internet <URL: http://irda.affiniscape.com/displaycommon.cfm?an=1&subarticlenbr=7>

However, the conventional scheme requires the exchange of 6 packets (namely, the SNRM command, UA response, I frame, Ack, I frame, Ack) between the devices to make a connection and the exchange of 4 packets (I frame, Ack, DISC command, and UA response) to break up the connection.

In infrared communication, it takes at least a fixed period of time after an optical transmission for a transmission/reception module to be able to start reception for the following reasons. In communication between devices, the reception module is in operation even when a transmission is being made. The module thus receives light that is emitted by itself. In far-distance communication, the light emitted by the module is far more intense than the light coming from the other device. Capacitors and passive circuits in the receiving circuit must be discharged and reset to stop emission of light, so that the module can reliably receive light from the other device.

The waiting time for the switching is specified to 1 ms (milliseconds) or longer for data communication at a transfer rate of 4 Mbps. However, actual waiting times of about 10 ms occur. Summing this and a packet transmission time amounts to 100 ms to 200 ms for a LAP layer connection (exchange of an SNRM command and a UA response) and 50 ms to 100 ms for a LMP layer connection (exchange of an I frame and an Ack). Communication overhead, that is, the time between the start of a connection process and the start of a data transmission, gets longer. That causes a problem of low overall communication efficiency.

In addition, the IrDA scheme has another problem. If the initiating station does not receive a response from the responding station in a connection establishing process, the initiating station cannot establish the connection, still less establish a one-way connection or perform a one-way data transfer.

DISCLOSURE OF INVENTION

The present invention has an objective of providing a communication device, a communication system, a communication method, a communication program, and a communication circuit capable of quick connection and disconnection.

The communication device in accordance with the present invention, to achieve the objective, is a communication device as a primary station for communication with a secondary station. The device includes a network layer, an upper layer which is an upper-level communication layer to the network layer, and a lower layer which is a lower-level communication layer to the network layer. The device is configured to include a network layer protocol controller. In order to connect to the secondary station, in the network layer, the network layer protocol controller issues a connection request command to the lower layer when the network layer protocol controller has received a connection request command from the upper layer and issues a connection confirmation command reception notification to the upper layer, without issuing a data transfer request command to the lower layer, when the network layer protocol controller has received a connection confirmation command reception notification from the lower layer.

The communication method in accordance with the present invention is a communication method implemented by a communication device as a primary station for communication with a secondary station. The device includes a network layer, an upper layer which is an upper-level communication layer to the network layer, and a lower layer which is a lower-level communication layer to the network layer. In order to connect to the secondary station, the method involves, in the network layer, the steps of: issuing a connection request command to the lower layer upon receiving a connection request command from the upper layer; and issuing a connection confirmation command reception notification to the upper layer, without issuing a data transfer request command to the lower layer, upon receiving a connection confirmation command reception notification from the lower layer.

The communication device in accordance with the present invention is a communication device as a secondary station for communication with a primary station. The device includes a network layer, an upper layer which is an upper-level communication layer to the network layer, and a lower layer which is a lower-level communication layer to the network layer. The device is configured to include a network layer protocol controller. In order to connect to the primary station, the network layer protocol controller issues a connection request command reception notification to the upper layer, without issuing a data transfer request command to the lower layer, when the network layer protocol controller has received a connection request command reception notification from the lower layer and issues a connection confirmation command to the lower layer when the network layer protocol controller has received a connection confirmation command from the upper layer.

The communication method in accordance with the present invention is a communication method implemented by a communication device as a secondary station for communication with a primary station. The device includes a network layer, an upper layer which is an upper-level communication layer to the network layer, and a lower layer which is a lower-level communication layer to the network layer. In order to connect to the primary station, the method involves the steps of: issuing a connection request command reception notification to the upper layer, without issuing a data transfer request command to the lower layer, upon receiving a connection request command reception notification from the lower layer; and issuing a connection confirmation command to the lower layer upon receiving a connection confirmation command from the upper layer.

The communication system in accordance with the present invention is configured to include the communication device as the primary station and the communication device as the secondary station.

According to the configurations and methods, in the primary station, in order to connect to the secondary station, the network layer issues a connection request command to the lower layer when the network layer has received a connection request command from the upper layer and issues a connection confirmation command reception notification to the upper layer, without issuing a data transfer request command to the lower layer, when the network layer has received a connection confirmation command reception notification from the lower layer. Meanwhile, in the secondary station, in order to connect to the primary station, the network layer issues a connection request command reception notification to the upper layer, without issuing a data transfer request command to the lower layer, when the network layer has received a connection request command reception notification from the lower layer and issues a connection confirmation command to the lower layer when the network layer has received a connection confirmation command from the upper layer.

According to the connection sequence, no communication is needed to establish a connection between the network layers after the lower layers are connected. That simplifies the connection sequence, improving communication efficiency.

The communication device in accordance with the present invention is a communication device as a primary station for communication with a secondary station. The device includes a network layer, an upper layer which is an upper-level communication layer to the network layer, and a lower layer which is a lower-level communication layer to the network layer. The device is configured to include a network layer protocol controller. In order to disconnect from the secondary station, in the network layer, the network layer protocol controller issues a disconnection request command, without issuing a data transfer request command to the lower layer, when the network layer protocol controller has received a disconnection request command from the upper layer and issues a disconnection confirmation command reception notification to the upper layer when the network layer protocol controller has received a disconnection confirmation command reception notification from the lower layer.

The communication method in accordance with the present invention is a communication method implemented by a communication device as a primary station for communication with a secondary station. The device includes a network layer, an upper layer which is an upper-level communication layer to the network layer, and a lower layer which is a lower-level communication layer to the network layer. In order to disconnect from the secondary station, the method involves, in the network layer, the steps of: issuing a disconnection request command, without issuing a data transfer request command to the lower layer, upon receiving a disconnection request command from the upper layer; and issuing a disconnection confirmation command reception notification to the upper layer upon receiving a disconnection confirmation command reception notification from the lower layer.

The communication device in accordance with the present invention is a communication device as a secondary station for communication with a primary station. The device includes a network layer, an upper layer which is an upper-level communication layer to the network layer, and a lower layer which is a lower-level communication layer to the network layer. The device is configured to include a network layer protocol controller. In order to disconnect from the primary station, the network layer protocol controller issues a disconnection request command reception notification to the upper layer when the network layer protocol controller has received a disconnection request command reception notification from the lower layer and issues a disconnection confirmation command to the lower layer when the network layer protocol controller has received a disconnection confirmation command from the upper layer.

The communication method in accordance with the present invention is a communication method implemented by a communication device as a secondary station for communication with a primary station. The device includes a network layer, an upper layer which is an upper-level communication layer to the network layer, and a lower layer which is a lower-level communication layer to the network layer. In order to disconnect from the primary station, the method involves the steps of: issuing a disconnection request command reception notification to the upper layer upon receiving a disconnection request command reception notification from the lower layer; and issuing a disconnection confirmation command to the lower layer upon receiving a disconnection confirmation command from the upper layer.

The communication system in accordance with the present invention is configured to include the communication device as the primary station and the communication device as the secondary station.

According to the configurations and methods, in the primary station, in order to disconnect from the secondary station, the network layer issues a disconnection request command, without issuing a data transfer request command to the lower layer, when the network layer has received a disconnection request command from the upper layer and issues a disconnection confirmation command reception notification to the upper layer when the network layer has received a disconnection confirmation command reception notification from the lower layer. Meanwhile, in the secondary station, in order to disconnect from the primary station, the network layer issues a disconnection request command reception notification to the upper layer when the network layer has received a disconnection request command reception notification from the lower layer and issues a disconnection confirmation command to the lower layer when the network layer has received a disconnection confirmation command from the upper layer.

According to the disconnection sequence, no communication is needed for a disconnection of the network layers before the lower layers are disconnected. That simplifies the disconnection sequence, improving communication efficiency.

The communication device may be realized on a computer. When that is the case, the present invention encompasses a communication program executed on a computer to realize the communication device by manipulating the computer as the network layer protocol controller. The invention also encompasses a computer-readable storage medium containing the program.

The communication device may be realized by a communication circuit which functions as the network layer protocol controller.

The communication device is suitable for application in mobile phones which incorporates the communication device for communication.

The communication device is suitable for application in display devices which produce displays from the data received by the communication device.

The communication device is suitable for application in printing devices which print from the data received by the communication device.

The communication device is suitable for application in recording devices which record the data received by the communication device.

Additional objects, advantages and novel features of the invention will be set forth in part in the description which follows, and in part will become apparent to those skilled in the art upon examination of the following or may be learned by practice of the invention.

BRIEF DESCRIPTION OF DRAWINGS

FIG. 1 is a signal sequence diagram illustrating an embodiment of the present invention.

FIG. 2 is a signal sequence diagram illustrating another embodiment of the present invention.

FIG. 5 is a block diagram illustrating an embodiment of the present invention.

FIG. 8 is an illustration of yet another embodiment of the present invention.

FIG. 9 is an illustration of another embodiment of the present invention.

FIG. 14(a) is a sequence diagram for the establishment of a connection in an embodiment of the present invention. FIG. 14(b) is a sequence diagram for the establishment of a connection in an embodiment of the present invention. FIG. 14(c) is an illustration of packet formats used in the establishment of a connection in an embodiment of the present invention.

FIG. 15(a) is an illustration of a data exchange sequence in accordance with an embodiment of the present invention. FIG. 15(b) is an illustration of a data exchange sequence in accordance with an embodiment of the present invention.

FIG. 16(a) is an illustration of a packet format used in an IrDA data exchange. FIG. 16(b) is an illustration of a packet format used in a data exchange in accordance with the present invention.

FIG. 17(a) is an illustration of a data exchange sequence in accordance with an embodiment of the present invention. FIG. 17(b) is an illustration of a data exchange sequence in accordance with an embodiment of the present invention.

FIG. 27 is a sequence diagram showing a flow of functions (commands and messages) and packets between layers for a disconnection sequence in accordance with an embodiment of the present invention.

FIG. 32 is a schematic diagram for the connection parameters of a connection confirmation function being passed between layers in a primary station in accordance with an embodiment of the present invention.

REFERENCE NUMERALS

Figure 3:
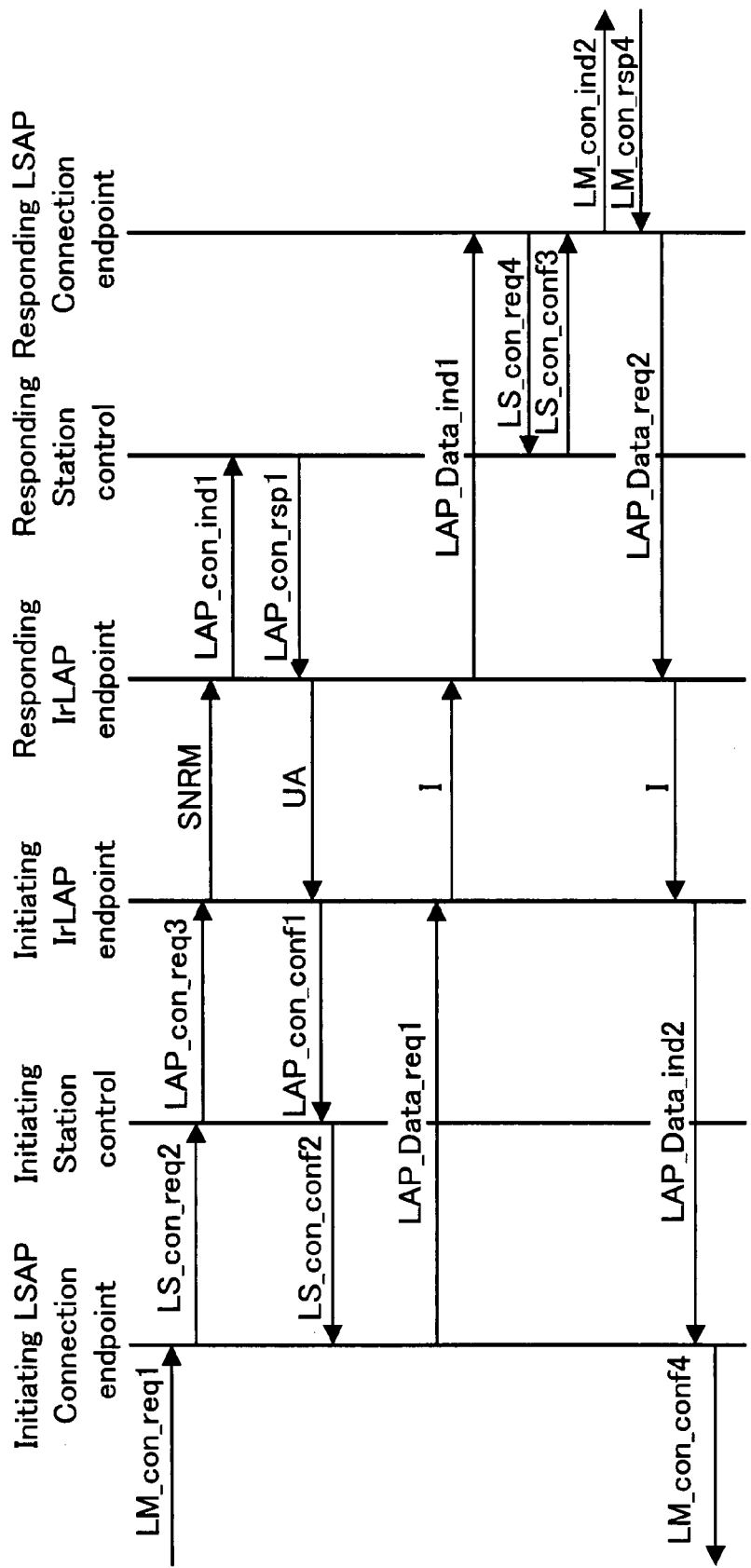
FIG. 3 is a signal sequence diagram illustrating a connection process up to the IrLMP layer according to a conventional IrDA scheme.
Figure 4:
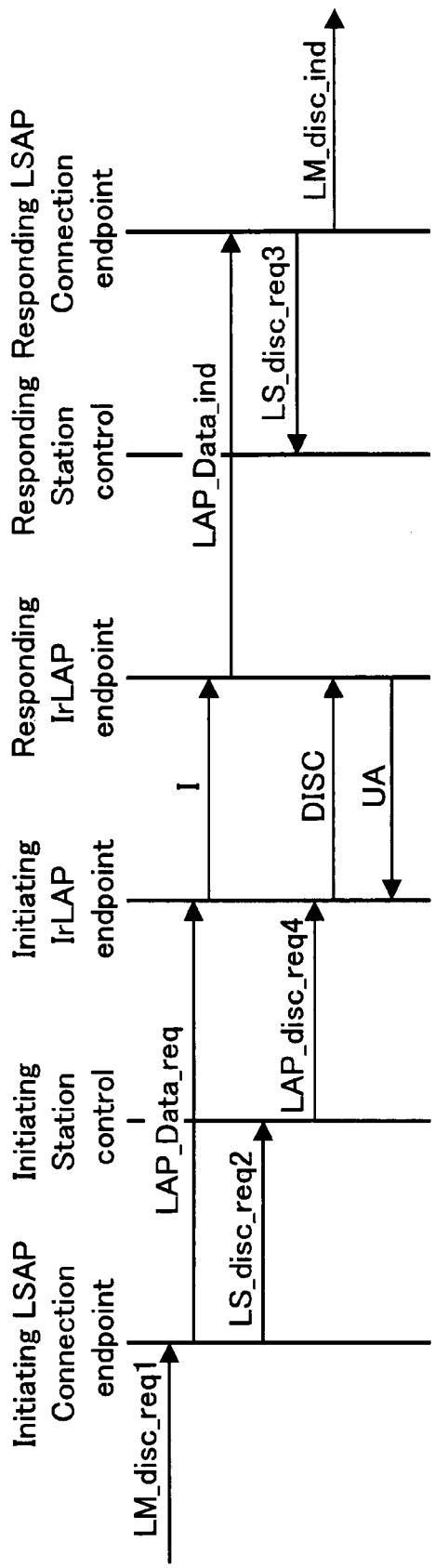
FIG. 4 is a signal sequence diagram illustrating a disconnection process up to the IrLMP layer according to a conventional IrDA scheme.

50 Communication device
511 Upper Layer Controller (Upper Layer)
512 Network Layer Protocol Controller
513 IrLAP Layer Controller (Lower Layer)

BEST MODE FOR CARRYING OUT INVENTION

Overview

Communication Layers

In the embodiments below will describe in detail the configuration and operation of a transmitter and a receiver of a communication system in accordance with the present invention based on an the OSI 7-layer model. Here, other names for the OSI 7-layer model is the "OSI base reference model" and the "OSI hierarchical model."

The OSI 7-layer model divides the communication function that each computer should have into 7 layers and defines a standard function module for each layer to allow for data communication between different types of computers.

Specifically, layer 1 (physical layer) serves to electrical conversion, mechanical operation, etc. required to output data to a communication line. Layer 2 (data link layer) secures physical communication path and performs error detection on the data transmitted over the communication path. Layer 3 (network layer) selects a communication path and manages addresses along the communication path. Layer 4 (transport layer) performs data compression, error correction, retransmission control, and other operations. Layer 5 (session layer) establishes/releases a virtual path (connection) for carrying out data transmission/reception between communication programs. Layer 6 (presentation layer) converts the data received from layer 5 into a format that is readily manipulable by users and converts the data from layer 7 into a format suitable for transmission. Layer 7 (application layer) provides various services using data communication to persons or to other programs.

Each of the communication layers of the communication systems in accordance with the embodiments has the same functions as those of corresponding layer of the OSI 7-layer model. However, in each embodiment, the communication system has a 6-layer structure in which the session layer and the presentation layer are merged. In addition, no explanation will be given as to the application layer.

The present invention is widely applicable to communication systems in which a transmitter and a receiver establish connections between communication layers for communication. That is, the communication function may not be divided like the OSI 7-layer model. Any given number of communication layers may be provided so long as there are two or more communication layers to be connected.

The present invention reduces the time required to establish a connection by handling connection requests by a plurality of communication layers, thereby providing an easy way for recovery from a disconnection. The present invention is therefore particularly suited for infrared wireless communication, as an example, which is susceptible to disconnection. The present invention is also effective with other wireless and wired communication.

For ease of explanation, the embodiments will be described based on IrSimple which is one of may applications of the invention. However, the present invention is by no means limited to IrSimple. IrSimple is made by partly modifying the functionality of its predecessor, IrDA.

Note that, in the embodiments, the data link layer, the network layer, the transport layer, and the session/presentation layer may be referred to as LAP, LMP, SMP, and OBEX respectively according to IrSimple.

IrLMP Layer (LSAP)

The present invention is primarily related to the network layer. The following will describe the IrLMP layer, the network layer for IrDA and IrSimple.

Figure 12:
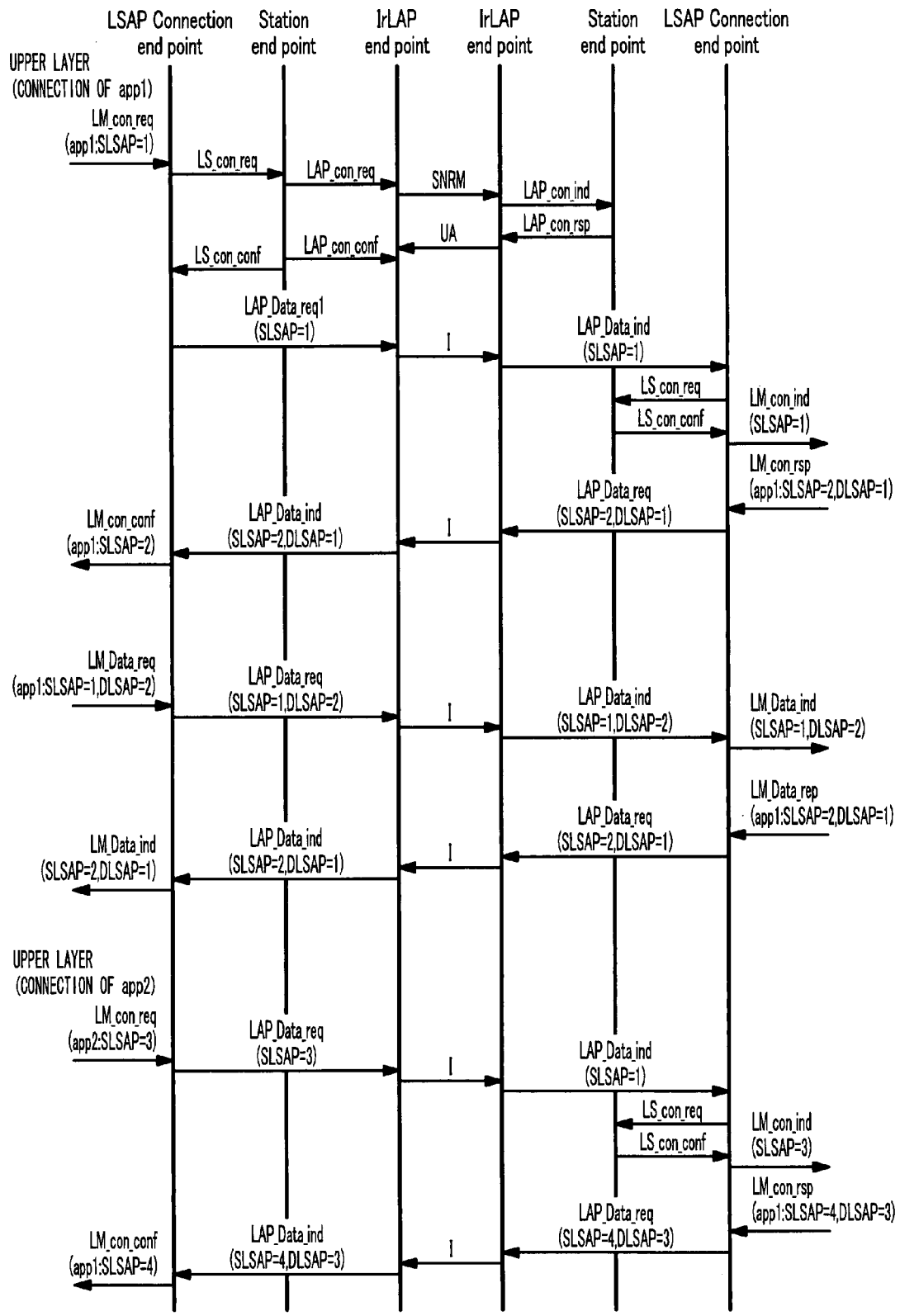
FIG. 12 is a signal sequence diagram illustrating a connection and a data transfer process according to a conventional IrDA scheme.

FIG. 12 is a signal sequence diagram illustrating a connection and a data transfer process according to a conventional IrDA scheme.

The IrLMP (Infrared Link Management Protocol) layer performs multiplexing using the IrLAP layer (lower layer) for an efficient transfer of data from a plurality of upper layer applications. Specifically, in 1-to-N communication or one-to-one communication in which two or more applications are running in the upper layer, the LMP layer creates a required logic channel for each application so that the upper layer can use the channels for data transmission/reception. These logic channels are LSAPs (Link Service Access Points).

For example, if a connection is to be made when two or more applications are running in the upper layer in one-to-one communication, the upper layer of the transmitter (primary station) sends a logic channel request of its own device (for example, 1) to the LMP layer and sends to the LMP layer an enquiry on a logic channel for application 1 (app 1) to which the other device is to connect. Upon receiving this, the LMP layer of the primary station first completes connecting of the LAP layer by station control in charge of the control of the connection of the LAP layer. Thereafter, the LMP layer sets the transmission source logic channel (SLSAP: Source Link Service Access Point) of its own device to aforementioned 1 and passes to the LAP layer as a data transfer request command (data is a connect command of the LMP layer). In so doing, the transmitted transmission source logic channel (1) is held.

Next, the LMP layer of the receiver (secondary station), upon receiving the data transfer request command (data is a connect command of the LMP layer) from the lower layer, analyzes the transmission source logic channel of the primary station in the connect command and notifies the upper layer of a result of the analysis and the reception of the connect command. Upon receiving them, the upper layer of the secondary station sets up the logic channel (SLSAP) (for example, 2) for application 1 of its own device and the logic channel of the primary station as the logic channel of the other device and passes to the LMP layer as a connection response command. The LMP layer of the secondary station, upon receiving this, sets up the logic channel (SLSAP=2) of application 1 of its own device from the upper layer and the logic channel (DL-SAP: Destination Link Service Access Point=1) of the application of the primary station and passes a data transfer request command (data is a connection response command of the LMP layer) to the lower layer.

Next, upon receiving this from the lower layer, since the transmission destination logic channel (DLSAP=1) in the connection response command matches the transmission source logic channel (1) being held, the LMP layer of the primary station sends a connection response command reception notification to application 1 of the upper layer and notifies application 1 of the logic channel (2) of the secondary station.

Application 1 transfers data using the logic channel created upon the connection. Specifically, the primary station, in a data transfer, sets up a transmission source logic channel (SLSAP=1) and a transmission destination logic channel (DLSAP=2) for data transmission. Meanwhile, the secondary station sets up a transmission source logic channel (SLSAP=2) and a transmission destination logic channel (DLSAP=1) for data transmission.

When application 2 (app 2) connects, the same connection process is carried out.

Problems with IrLMP Layer

Infrared communication between current devices incorporating IrDA is mostly one-to-one communication. In addition, most applications are file transfer applications (only one application can run).

As in the foregoing, the current IrLMP standards allow for a logic channel creation process to realize 1-to-N device-to-device communication and a data transfer while two or more applications are running. However, as described in the foregoing, since there is only one application running in most communication, logic channels are established merely in form, and the exchange of frames for that purpose is a waste. In other words, the processing by the station end point can be omitted in one-to-one device-to-device communication and when only one application is involved.

Accordingly, the logic channel may be predetermined to simplify the network layer. That configuration, however, is not compatible with the connection process of the current IrLMP standards when one wants to include only the connection data of the upper layer in the connection packet of an LAP layer. The network layer of the present invention is designed to work with one-to-one device-to-device communication and when there is involved only one application and still retains compatibility with the IrLMP standards, to simplify the connection/disconnection sequence.

Embodiment 1

The following will describe an embodiment of the present invention in reference to FIGS. 1, 2.

A signal sequence figure for the present embodiment is shown in FIG. 1, and a block diagram is shown in FIG. 5. This is by no means intended to be limiting the invention. FIG. 5 shows OBEX and TinyTP as the upper layer; this is again by no means intended to be limiting the invention. FIG. 5 shows a network layer protocol controller as a single layer; the functionality of that controller may be incorporated into the upper layer or the lower layer, in which case there may not be an independent network layer protocol controller. The modules in FIG. 5 may be implemented either in software or hardware provided that their functions are properly realized.

As shown in FIG. 1, first of all, the upper layer controller 511 of the primary station issues a connection request command 1 (LM_con_req1) containing data needed for a connection. Upon receiving the connection request command 1, the network layer protocol controller 512 of the primary station transmits, to the IrLAP layer controller 513, a connection request command 2 (LAP_con_req2) containing the data contained in the connection request command 1. The IrLAP layer controller 513 of the primary station, upon receiving the connection request command 2, transmits an SNRM command containing the data contained in the connection request command 2 to the secondary station via the transmitting section 514.

In the secondary station, the receiving section 515 receives the SNRM command. The IrLAP controller 513 then issues a connection request command reception notification 1 (LAP_con_ind1) containing the data contained in the SNRM command to the network layer protocol controller 512. The network layer protocol controller 512 of the secondary station issues a connection request reception notification 2 (LM_con_ind2) containing the data contained in the connection request command reception notification 1 to the upper layer controller 511. Upon receiving the connection request reception notification 2, the upper layer controller 511 of the secondary station issues a connection confirmation command 1 (LM_con_resp1) containing data needed for a connection to the primary station to the network layer protocol controller 512 of the secondary station to establish a connection to the primary station.

The network layer protocol controller 512 of the secondary station issues a connection confirmation command 2 (LAP_con_rsp2) contained in the connection confirmation command 1 to the IrLAP layer controller 513 of the secondary station. The IrLAP layer controller 513 of the secondary station transmits the UA response containing the data contained in the connection confirmation command 2 to the primary station via the transmitting section 514.

Upon the receiving section 515 receiving the UA response, the IrLAP layer controller 513 of the primary station issues a connection confirmation command reception notification 1 (LAP_con_conf1) containing the data contained in the UA response to the network layer protocol controller 512 of the primary station. The network layer protocol controller 512 of the primary station receives the connection confirmation command reception notification 1 and issues a connection confirmation command reception notification (LM_con_conf2) containing the data contained in the connection confirmation command reception notification 1 to the upper layer controller 511 of the primary station.

According to conventional IrDA, the logic channel used by the upper layer is created (SLSAP are DLSAP are exchanged) in the exchange of LAP_Data.request1 issued by the initiating LSAP connection endpoint and LAP_DATA_req2 issued by the responding LSAP connection endpoint in FIG. 3. In contrast, in the present embodiment, the network layer protocol controller 512 of the primary station, upon receiving the connection confirmation command reception notification 1 (LAP_con_conf1), creates the logic channel using predetermined fixed values.

This connection sequence can end without going through those steps executed by the station control of the primary and secondary stations. There are only two packets that are exchanged between the devices: the SNRM command and the UA response. Communication efficiency is thus improved over conventional cases.

The signals are listed below, using the symbols in FIG. 1:
connection request command 1: LM_con_req1 (AAA, Data1) connection request command 2: LAP_con_req2 (BBB, Data1)
connection request command reception notification 1: LAP_con_ind1 (CCC, Data1)
connection request command reception notification 2: LM_con_ind2 (DDD, Data1)
connection confirmation command 1: LM_con_rsp1 (EEE, Data2)
connection confirmation command 2: LAP_con_rsp2 (FFF, Data2)
connection confirmation command reception notification 1: LAP_con_conf1 (GGG, Data2)
connection confirmation command reception notification 2: LM_con_conf2 (HHH Data2)

The SNRM command and the UA response are not written in symbols because they are treated as a packet format for a transmission from the LAP layer. This is not a major issue for the present invention, and their description is therefore omitted. AAA to HHH denote parameters required for the signals. The signals indicated by rightward arrows in FIG. 1 contain Data1, and those indicated by leftward arrows contain Data2.

Embodiment 2

The following will describe another embodiment of the present invention in reference to FIGS. 2, 5.

A signal sequence figure for the present embodiment is shown in FIG. 2, and a block diagram is shown in FIG. 5. This is by no means intended to be limiting the invention. FIG. 5 shows OBEX and TinyTP as the upper layer; this is again by no means intended to be limiting the invention. FIG. 5 shows a network layer protocol controller as a single layer; the functionality of that controller may be incorporated into the upper layer or the lower layer, in which case there may not be an independent network layer protocol controller. The modules in FIG. 5 may be implemented either in software or hardware provided that their functions are properly realized.

As shown in FIG. 2, first of all, for a disconnection, the upper layer controller 511 of the primary station issues a disconnection request command 1 (LM_disc_req1) containing data needed for a disconnection. Upon receiving the disconnection request command 1, the network layer protocol controller 512 of the primary station transmits, to the IrLAP layer controller 513 of the primary station, a disconnection request command 2 (LAP_disc_req2) containing the data contained in the disconnection request command 1. The IrLAP layer controller 513 of the primary station, upon receiving the disconnection request command 2, transmits a DISC command containing the data contained in the disconnection request command 2 to the secondary station via the transmitting section 514.

Upon the receiving section 515 receiving the DISC command, the IrLAP layer controller 513 of the secondary station issues disconnection request command reception notification 1 (LAP_disc_ind1) containing the data contained in the DISC command to the network layer protocol controller 512 of the secondary station. The network protocol controller 512 of the secondary station issues a disconnection request reception notification 2 (LM_disc_ind2) containing the data contained in the disconnection request command reception notification 1 to the upper layer controller 511 of the secondary station.

The upper layer controller 511 of the secondary station, upon receiving the disconnection request reception notification 2, issues a disconnection confirmation command 1 (LM_disc_resp1) containing data needed for a disconnection from the primary station to the network protocol controller 512 of the secondary station, so as to disconnect from the primary station.

The network layer protocol controller 512 of the secondary station issues a disconnection confirmation command 2 (LAP_disc_rsp2) containing the data contained in the disconnection confirmation command 1 to the IrLAP layer controller 513 of the secondary station. The IrLAP layer controller 513 of the secondary station transmits a UA response containing the data contained in the disconnection confirmation command 2 to the primary station via the transmitting section 514. Upon the receiving section 515 receiving the UA response, the IrLAP layer controller 513 of the primary station issues disconnection confirmation command reception notification 1 (LAP_disc_conf1) containing the data contained in the UA response to the network layer protocol controller 512 of the primary station.

Next, the network layer protocol controller 512 of the primary station, upon receiving the disconnection confirmation command reception notification 1, issues disconnection confirmation command reception notification 2 (LM_disc_conf2) containing the data contained in the disconnection confirmation command reception notification 1 to the upper layer controller 511 of the primary station.

This disconnection sequence can end without going through those steps executed by the station controls of the primary and secondary stations. There are only two packets that are exchanged between the devices: the DISC command and the UA response. Communication efficiency is thus improved over conventional cases.

The signals are listed below, using the symbols in FIG. 2:
disconnection request command 1: LM_disc_req1 (AAA, Data1) disconnection request command 2: LAP_disc_req2 (BBB, Data1)
disconnection request command reception notification 1: LAP_disc_ind1 (CCC, Data1)
disconnection request command reception notification 2: LM_disc_ind2 (DDD, Data1)
disconnection confirmation command 1: LM_disc_rsp1 (EEE, Data2)
disconnection confirmation command 2: LAP_disc_rsp2 (FFF, Data2)
disconnection confirmation command reception notification 1: LAP_disc_conf1 (GGG, Data2)
disconnection confirmation command reception notification 2: LM_disc_conf2 (HHH Data2)

The DISC command and the UA response are not written in symbols because they are treated as a packet format for a transmission from the LAP layer. This is not a major issue for the present invention, and their description is therefore omitted. AAA to HHH denote parameters required for the signals. The signals indicated by rightward arrows in FIG. 2 contain Data1, and those indicated by leftward arrows contain Data2.

Incidentally, in a disconnect of the conventional IrLMP layer, as the disconnection process for the upper layer ends and a disconnection request command is issued to the IrLMP layer in the primary station, the IrLMP layer of the primary station transmits a data transfer request (data is a disconnection request command of the IrLMP layer) to the IrLAP layer. Upon receiving this, the IrLMP layer of the secondary station switches to a disconnected state upon the reception of the disconnection request command. In so doing, no disconnection response is transmitted. Then, the primary station, after transmitting the IrLMP layer disconnection request command mentioned above, notifies the IrLAP layer of the disconnection request command so that the IrLAP layer implements a disconnection process.

Embodiment 3

Figure 6:
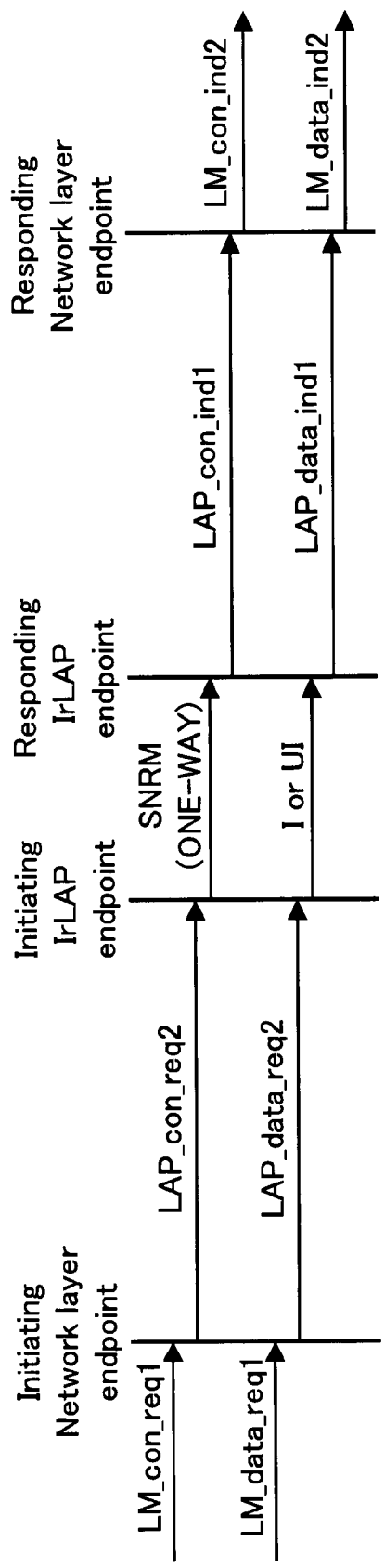
FIG. 6 is a signal sequence diagram illustrating a further embodiment of the present invention.

The following will describe another embodiment of the present invention in reference to FIGS. 5, 6.

A signal sequence figure for the present embodiment is shown in FIG. 6, and a block diagram is shown in FIG. 5. This is by no means intended to be limiting the invention. FIG. 5 shows OBEX and TinyTP as the upper layer; this is again by no means intended to be limiting the invention. FIG. 5 shows a network layer protocol controller as a single layer; the functionality of that controller may be incorporated into the upper layer or the lower layer, in which case there may not be an independent network layer protocol controller. The modules in FIG. 5 may be implemented either in software or hardware provided that their functions are properly realized.

As shown in FIG. 6, first of all, the upper layer controller 511 of the primary station issues a connection request command 1 (LM_con_req1) containing data needed for a connection. In the issuing, information on whether the communication will be one-way transfer or two-way transfer is also sent. The present embodiment assumes that one-way transfer is selected throughout the following.

Upon receiving the connection request command 1, the network layer protocol controller 512 of the primary station transmits a connection request command 2 (LAP_con_req2) containing the data contained in the connection request command 1 to the IrLAP layer controller 513 of the primary station. In the transmission, a one-way communication select from the upper layer is also sent. The IrLAP layer controller 513 of the primary station, upon receiving connection request command 2, transmits an SNRM command containing the data contained in the connection request command 2 and the one-way communication select information to the secondary station via the transmitting section 514.

The network layer protocol controller 512 of the primary station completes the connection process upon issuing the connection request command to the LAP layer controller 513. If the controller 512 receives a data transfer request command from the upper layer controller 511, the controller 512 issues a data transfer request command to the IrLAP layer controller 513 (lower layer).

Meanwhile, upon the receiving section 515 receiving an SNRM command containing the aforementioned one-way communication select information, the IrLAP layer controller 513 of the secondary station issues, to the network layer protocol controller 512 of the secondary station, a connection request command reception notification 1 (LAP_con_ind1) containing the data contained in the SNRM command and the one-way communication select information. The network layer protocol controller 512 of the secondary station issues, to the upper layer controller 511 of the secondary station, a connection request reception notification 2 (LM_con_ind2) containing the data contained in the connection request command reception notification 1 and the one-way communication select information.

Upon receiving the connection request reception notification 2, the upper layer controller 511 of the secondary station establishes a connection to the primary station in this state. The network layer protocol controller 512 of the secondary station completes the connection process upon issuing a connection request command reception notification to the upper layer controller 511. If the controller 512 receives a data transfer request command reception notification from the LAP layer controller 513 (lower layer), the controller 512 issues a data transfer request command reception notification to the upper layer controller 511.

This connection sequence can end the connect operation by one-way communication. In addition, there is only one packet being exchanged between the devices: the SNRM command. Communication efficiency is thus improved over conventional cases.

The signals are listed below, using the symbols in FIG. 6:
connection request command 1: LM_con_req1 (AAA, Data1) connection request command 2: LAP_con_req2 (BBB, Data1)
connection request command reception notification 1: LAP_con_ind1 (CCC, Data1)
connection request command reception notification 2: LM_con_ind2 (DDD, Data1)

The SNRM command is not written in a symbol because it is treated as a packet format for a transmission from the LAP layer. This is not a major issue for the present invention, and their description is therefore omitted. AAA to DDD denote parameters required for the signals. The signals indicated by rightward arrows in FIG. 6 contain Data1.

Embodiment 4

Figure 7:
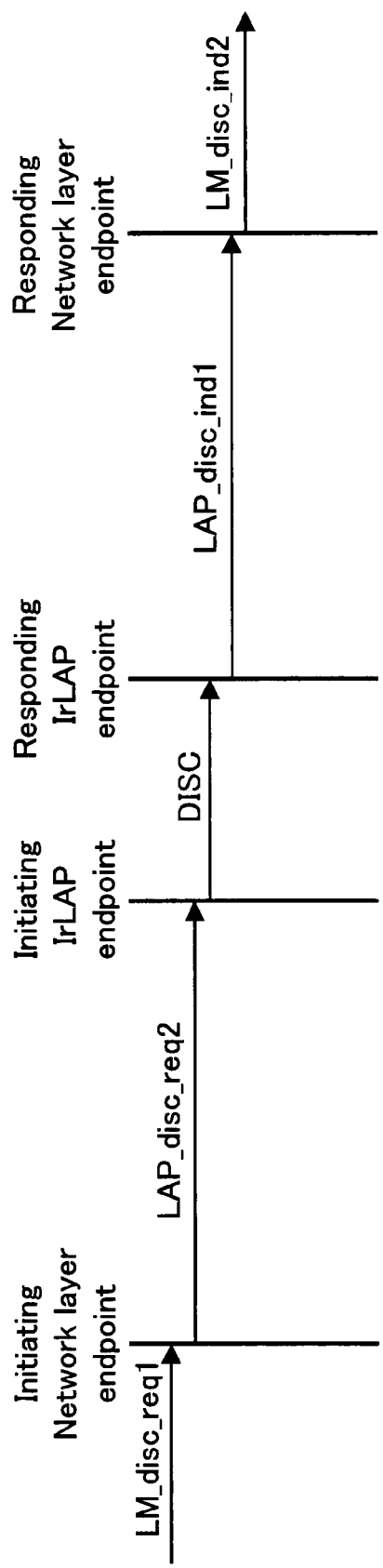
FIG. 7 is a signal sequence diagram illustrating still another embodiment of the present invention.

The following will describe another embodiment of the present invention in reference to FIGS. 5, 7.

A signal sequence figure for the present embodiment is shown in FIG. 7, and a block diagram is shown in FIG. 5. This is by no means intended to be limiting the invention. FIG. 5 shows OBEX and TinyTP as the upper layer; this is again by no means intended to be limiting the invention. FIG. 5 shows a network layer protocol controller as a single layer; the functionality of that controller may be incorporated into the upper layer or the lower layer, in which case there may not be an independent network layer protocol controller. The modules in FIG. 5 may be implemented either in software or hardware provided that their functions are properly realized. The present embodiment assumes that a connection has been already established between the primary station and the secondary station by one-way communication.

As shown in FIG. 7, first of all, for a disconnection, the upper layer controller 511 of the primary station issues a disconnection request command 1 (LM_disc_req1) containing data needed for a disconnection. Upon receiving the disconnection request command 1, the network layer protocol controller 512 of the primary station issues, to the IrLAP layer controller 513 of the primary station, a disconnection request command 2 (LAP_disc_req2) containing the data contained in the disconnection request command 1. The IrLAP layer controller 513 of the primary station, upon receiving the disconnection request command 2, transmits a DISC command containing the data contained in the disconnection request command 2 to the secondary station via the transmitting section 514. The network layer protocol controller 512 of the primary station completes the disconnection process upon issuing the disconnection request command to the LAP layer controller 513.

Meanwhile, the IrLAP layer controller 513 of the secondary station, upon the receiving section 515 receiving the DISC command, issues a disconnection request command reception notification 1 (LAP_disc_ind1) containing the data contained in DISC command to the network layer protocol controller 512 of the secondary station. The network layer protocol controller 512 of the secondary station issues a disconnection request command reception notification 2 (LM_disc_ind2) containing the data contained in the disconnection request command reception notification 1 to the upper layer controller 511 of the secondary station. The upper layer controller 511 of the secondary station switches to a disconnected state upon receiving the disconnection request command reception notification 2. The network layer protocol controller 512 of the secondary station completes the disconnection process upon issuing a disconnection request command reception notification to the upper layer controller 511.

This disconnection sequence can end the disconnect operation without going through those steps executed by the station controls of the primary and secondary stations even during one-way communication. There is only one packet being exchanged between the devices: the DISC command. Communication efficiency is improved over conventional cases.

The signals are listed below, using the symbols in FIG. 7.
disconnection request command 1: LM_disc req1 (AAA, Data1) disconnection request command 2: LAP_disc_req2 (BBB, Data1)
disconnection request command reception notification 1: LAP_disc_ind1 (CCC, Data1)
disconnection request command reception notification 2: LM_disc_ind2 (DDD, Data1)

The DISC command is not written in symbols because it is treated as a packet format for a transmission from the LAP layer. This is not a major issue for the present invention, and their description is therefore omitted. AAA to DDD denote parameters required for the signals. The signals indicated by rightward arrows in FIG. 7 contain Data1.

Embodiment 5

The following will describe another embodiment of the present invention in reference to FIG. 8.

The present embodiment will describe, as an example, communication between mobile phones. Although the embodiment assumes that both the transmitter and the receiver are mobile phones, only one of the transmitter and the receiver need to be a mobile phone. One of the two devices may not be a mobile phone provided that data transmission and reception is possible through the sequences described in embodiments 1 to 4.

In FIG. 8, data in mobile phone A is transmitted to mobile phone B by infrared. Upon receiving the data transmitted from mobile phone A, mobile phone B records the received data into memory in mobile phone B or external memory connected to it. The data may be text data, image data, audio data, telephone directory data, or system information, among other examples, and is by no means limited to any particular formats. The data in mobile phone A may be either data in internal memory of mobile phone A or data in external memory (SD card or another kind of non-volatile memory) connected to the mobile phone.

For example, in two-way communication, in the transmitting end (mobile phone A), the connection sequence discussed earlier enables the network layer protocol controller 512 to pass data on the upper layer together with a connection request command to the IrLAP layer controller 513, and when the IrLAP layer controller 513 sends a connection confirmation command reception notification, to pass also data destined for the upper layer to the upper layer controller 511. On the other hand, in the receiving end (mobile phone B), the sequence enables the network layer protocol controller 512 to pass also the data on the upper layer to the upper layer controller 511 when the IrLAP layer controller 513 sends the connection request command reception notification, and to pass also the data on the upper layer to the IrLAP layer controller 513 when the upper layer controller 511 sends a connection confirmation command notification. That completes the connection process.

In this way, the connection sequence enables the establishing of a connection through the exchange of one packet, which takes less time than the establishing of a connection according to conventional IrDA schemes in which a plurality of packets are exchanged.

Meanwhile, in one-way communication, in the transmitting end (mobile phone A), the sequence enables the network layer protocol controller 512 to pass the data on the upper layer together with a connection request to the lower layer. In the receiving end (mobile phone B), the sequence enables the network layer protocol controller 512 to pass also the data on the upper layer to the upper layer controller 511 when the IrLAP layer controller 513 sends a connection confirmation command reception notification. On the other hands, in the receiving end (mobile phone B), the sequence enables the controller 512 to pass also the data on the upper layer to the upper layer controller 511 when the IrLAP layer 513 sends the connection request command reception notification. That completes the connection process.

In this way, the connection sequence enables the establishing of a connection through the exchange of one packet, which takes less time than the establishing of a connection according to conventional IrDA schemes in which a plurality of packets are exchanged.

As described in the foregoing, the device needs to point to the other station for a shorter period of time than in conventional IrDA schemes. The user can enjoy greater convenience and reduced error rate. In addition, infrared data transfer by means of one-way communication becomes possible.

Embodiment 6

The following will describe another embodiment of the present invention in reference to FIG. 9.

The present embodiment will describe, as an example, communication between a mobile phone and a display device. Although the embodiment assumes that the transmitter is a mobile phone, the transmitter may not be a mobile phone provided that data transmission is possible through the sequence described in embodiments 1 to 4. In addition, the display device may be the transmitting end.

in FIG. 9, data in mobile phone A is transmitted to display device B (TV, monitor, etc.) by infrared. Display device B performs suitable processes on the data transmitted from mobile phone A for display. For example, if the data is image data, the data is decompressed where necessary. This is however by no means intended to be limiting the invention. The data may be text data, image data, audio data, telephone directory data, or system information, among other examples, and is by no means limited to any particular formats. The data in mobile phone A may be either data in internal memory of mobile phone A or data in external memory (SD card or another kind of non-volatile memory) connected to the mobile phone.

For example, in two-way communication, in the transmitting end (mobile phone A), the connection sequence discussed earlier enables the network layer protocol controller 512 to pass data on the upper layer together with a connection request command to the IrLAP layer controller 513, and when the IrLAP layer controller 513 sends a connection confirmation command reception notification, to pass also the data on the upper layer to the upper layer controller 511. On the other hand, in the receiving end (display device B), the sequence enables the network layer protocol controller 512 to pass also the data on the upper layer to the upper layer controller 511 when the IrLAP layer controller 513 sends the connection request command reception notification, and to pass also the data on the upper layer to the IrLAP layer controller 513 when the upper layer controller 511 sends a connection confirmation command notification. That completes the connection process.

In this way, the connection sequence enables the establishing of a connection through the exchange of one packet, which takes less time than the establishing of a connection according to conventional IrDA schemes in which a plurality of packets are exchanged.

Meanwhile, in one-way communication, in the transmitting end (mobile phone A), the sequence enables the network layer protocol controller 512 to pass the data on the upper layer together with a connection request to the lower layer. In the receiving end (display device B), the sequence enables the network layer-protocol controller 512 to pass also the data on the upper layer to the upper layer controller 511 when the IrLAP layer controller 513 sends a connection confirmation command reception notification. On the other hand, in the receiving end (display device B), the sequence enables the controller 512 to pass also the data on the upper layer to the upper layer controller 511 when the IrLAP layer 513 sends the connection request command reception notification. That completes the connection process.

In this way, the connection sequence enables the establishing of a connection through the exchange of one packet, which takes less time than the establishing of a connection according to conventional IrDA schemes in which a plurality of packets are exchanged.

As described in the foregoing, the device needs to point to the other station for a shorter period of time than in conventional IrDA schemes. The user can enjoy greater convenience and reduced error rate. In addition, infrared data transfer by means of one-way communication becomes possible.

Embodiment 7

Figure 10:
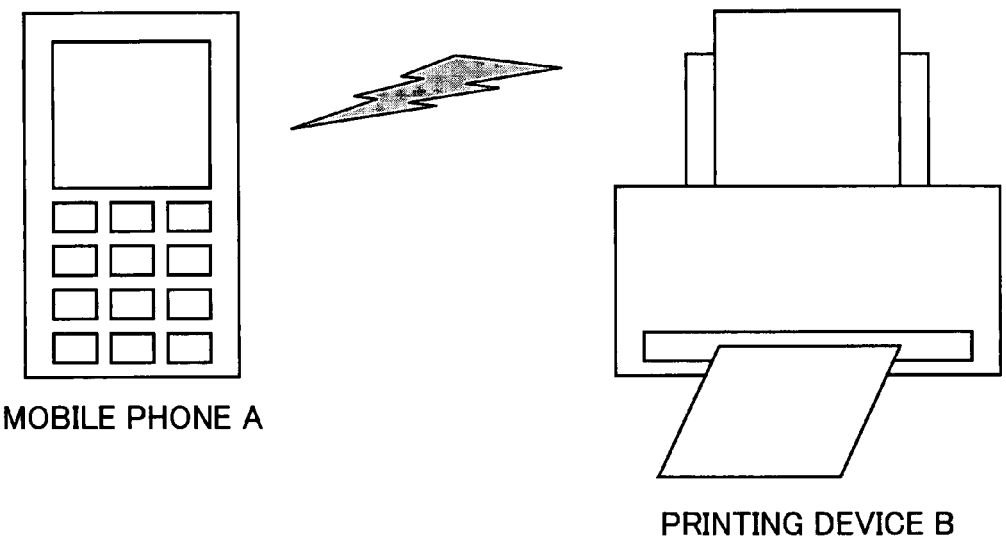
FIG. 10 is an illustration of another embodiment of the present invention.

The following will describe another embodiment of the present invention in reference to FIG. 10.

The present embodiment will describe, as an example, communication between a mobile phone and a printing device. Although the embodiment assumes that the transmitter is a mobile phone, the transmitter may not be a mobile phone provided that data transmission is possible through the sequence described in embodiments 1 to 4. In addition, the transmitting end may be a printing device.

In FIG. 10, data in mobile phone A is transmitted to the printing device B by infrared. Printing device B performs suitable processes on the data transmitted from mobile phone A for printing. For example, if the data is image data, the data is decompressed where necessary. This is however by no means intended to be limiting the invention. The data may be text data, image data, audio data, telephone directory data, or system information, among other examples, and is by no means limited to any particular formats. The data in mobile phone A may be either data in internal memory of mobile phone A or data in external memory (SD card or another kind of non-volatile memory) connected to the mobile phone.

For example, in two-way communication, in the transmitting end (mobile phone A), the connection sequence discussed earlier enables the network layer protocol controller 512 to pass data on the upper layer together with a connection request command to the IrLAP layer controller 513, and when the IrLAP layer controller 513 sends a connection confirmation command reception notification, to pass also the data on the upper layer to the upper layer controller 511. On the other hand, in the receiving end (printing device B), the sequence enables the network layer protocol controller 512 to pass also the data on the upper layer to the upper layer controller 511 when the IrLAP layer controller 513 sends the connection request command reception notification, and to pass also the data on the upper layer to the IrLAP layer controller 513 when the upper layer sends a connection confirmation command notification. That completes the connection process.

In this way, the connection sequence enables the establishing of a connection through the exchange of one packet, which takes less time than the establishing of a connection according to conventional IrDA schemes in which a plurality of packets are exchanged.

Meanwhile, in one-way communication, in the transmitting end (mobile phone A), the sequence enables the network layer protocol controller 512 to pass the data on the upper layer together with a connection request to the lower layer. In the receiving end (printing device B), the sequence enables the network layer protocol controller 512 to pass also the data on the upper layer to the upper layer controller 511 when the IrLAP layer controller 513 sends a connection confirmation command reception notification. On the other hand, in the receiving end (printing device B), the sequence enables the controller 512 to pass also the data on the upper layer to the upper layer controller 511 when the IrLAP layer controller 513 sends the connection request command reception notification. That completes the connection process.

In this way, the connection sequence enables the establishing of a connection through the exchange of one packet, which takes less time than the establishing of a connection according to conventional IrDA schemes in which a plurality of packets are exchanged.

As described in the foregoing, the device needs to point to the other station for a shorter period of time than in conventional IrDA schemes. The user can enjoy greater convenience and reduced error rate. In addition, infrared data transfer by means of one-way communication becomes possible.

Embodiment 8

Figure 11:
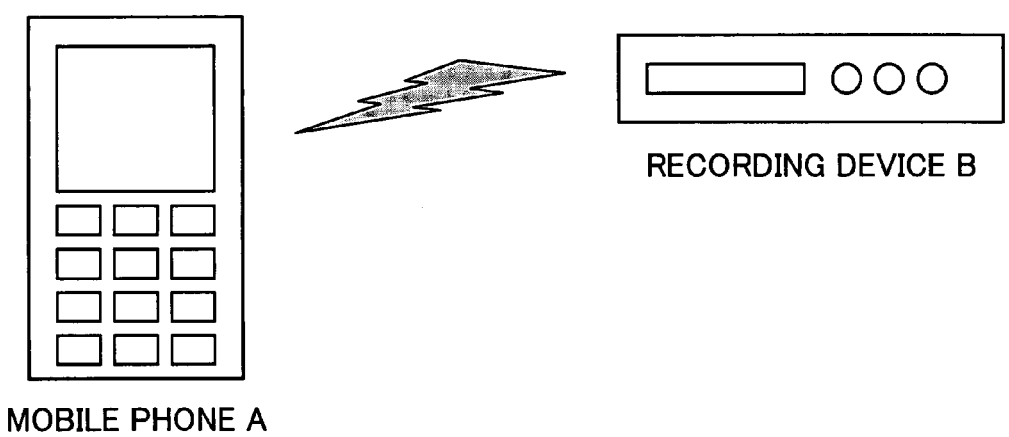
FIG. 11 is an illustration of another embodiment of the present invention.

The following will describe another embodiment of the present invention in reference to FIG. 11.

The present embodiment will describe, as an example, communication between a mobile phone and a recording device. Although the embodiment assumes that the transmitter is a mobile phone, the transmitter may not be a mobile phone provided that data transmission is possible through the sequence described in embodiments 1 to 4. In addition, the transmitting end may be a recording device.

In FIG. 11, data in mobile phone A is transmitted to recording device B by infrared. Recording device B performs suitable processes on the data transmitted from mobile phone A for recording. For example, if the data is image data, the data is recorded in internal memory of the recording device or external memory connected to the recording device. The internal memory of the recording device may be volatile memory (e.g., SDRAM), flash memory (e.g., non-volatile memory), and recordable DVD and HDD drives so long as the memory is a medium capable of holding records temporarily or semi-permanently. The data may be text data, image data, audio data, telephone directory data, or system information, among other examples, and is by no means limited to any particular formats. The data in mobile phone A may be either data in internal memory of mobile phone A or data in external memory (SD card or another kind of non-volatile memory) connected to the mobile phone.

For example, in two-way communication, in the transmitting end (mobile phone A), the connection sequence discussed earlier enables the network layer protocol controller 512 to pass data on the upper layer together with a connection request command to the IrLAP layer controller 513, and when the IrLAP layer controller 513 sends a connection confirmation command reception notification, to pass also the data on the upper layer to the upper layer controller 511. On the other hand, in the receiving end (recording device B), the sequence enables the network layer protocol controller 512 to pass also the data on the upper layer to the upper layer controller 511 when the IrLAP layer 513 sends the connection request command reception notification, and to pass also the data on the upper layer to the IrLAP layer controller 513 when the upper layer controller 511 sends a connection confirmation command notification. That completes the connection process.

In this way, the connection sequence enables the establishing of a connection through the exchange of one packet, which takes less time than the establishing of a connection according to conventional IrDA schemes in which a plurality of packets are exchanged.

Meanwhile, in one-way communication, in the transmitting end (mobile phone A), the sequence enables the network layer protocol controller 512 to pass the data on the upper layer together with a connection request to the lower layer. In the receiving end (recording device B), the sequence enables the network layer protocol controller 512 to pass also the data on the upper layer to the upper layer controller 511 when the IrLAP layer controller 513 sends a connection confirmation command reception notification. On the other hand, in the receiving end (recording device B), the sequence enables the controller 512 to pass also the data on the upper layer to the upper layer controller 511 when the IrLAP layer controller 513 sends a connection request command reception notification. That completes a connection process. In this way, the connection sequence enables the establishing of a connection through the exchange of one packet.

That takes less time than the establishing of a connection according to conventional IrDA schemes in which a plurality of packets are exchanged.

As described in the foregoing, the device needs to point to the other station for a shorter period of time than in conventional IrDA schemes. The user can enjoy greater convenience and reduced error rate.

Embodiment 9

Figure 13:
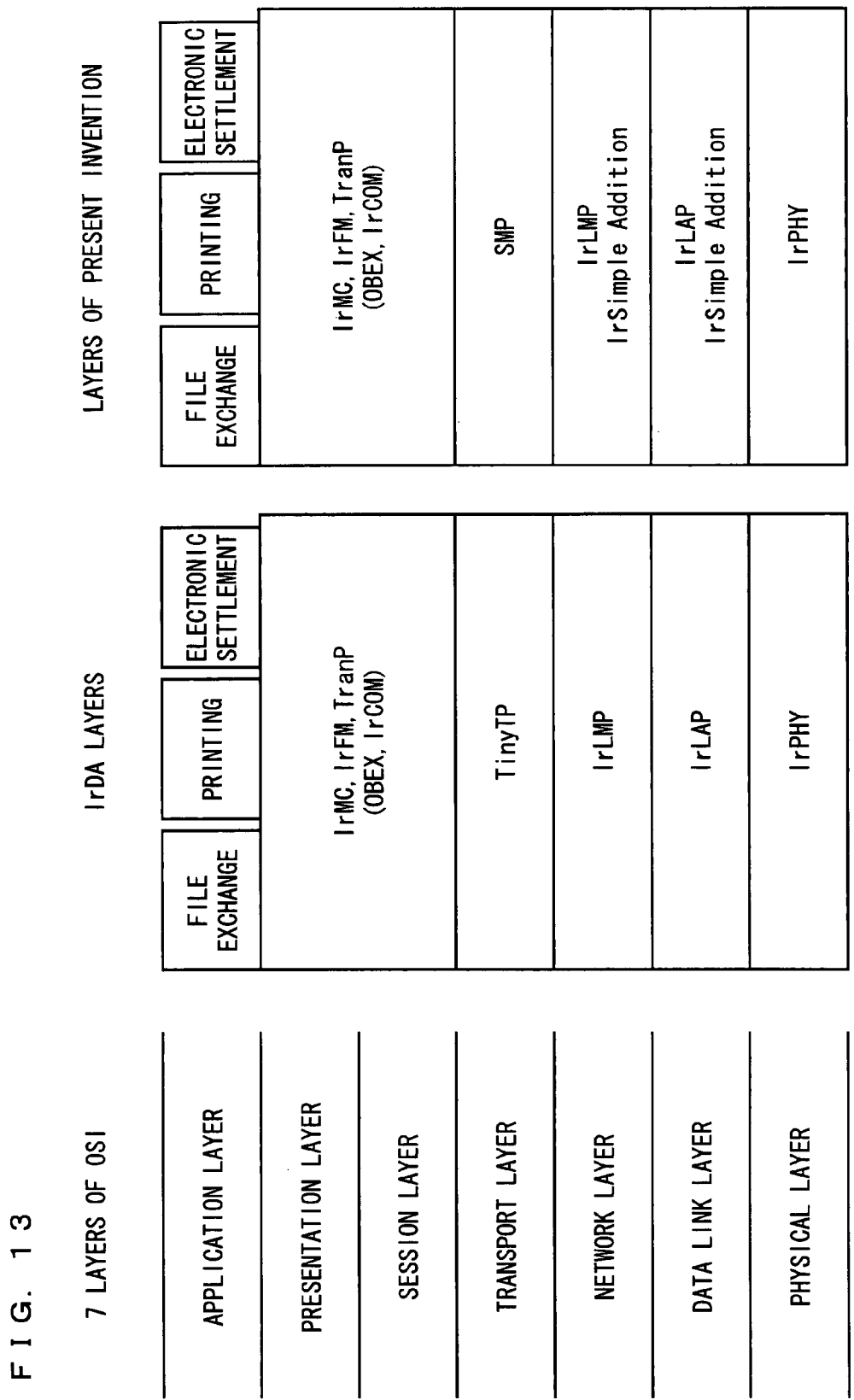
FIG. 13 is a schematic diagram for how the layers in the OSI 7-layer model, the IrDA scheme, and the present invention correspond to each other.
Figure 18:
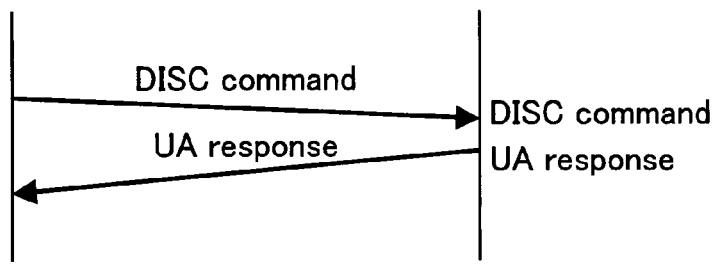
FIG. 18(a) is an illustration of a disconnection sequence in accordance with an embodiment of the present invention.
FIG. 18(b) is an illustration of a disconnection sequence in accordance with an embodiment of the present invention.
FIG. 18(c) is an illustration of packet formats used in a disconnection sequence in accordance with an embodiment of the present invention.
Figure 18:
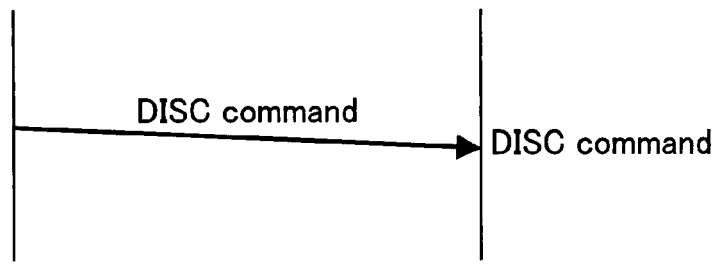
Figure 18:
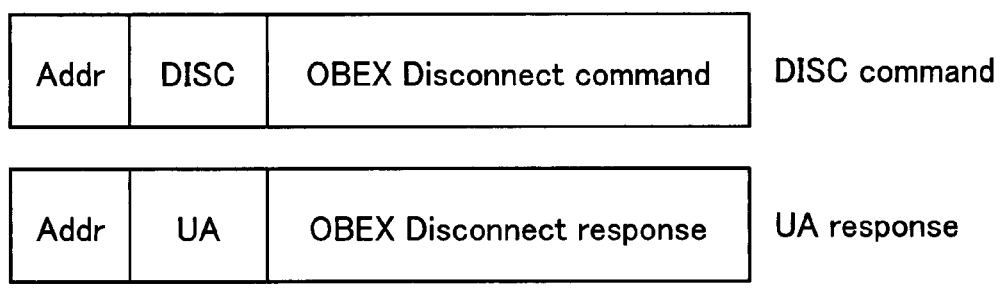

The following will describe another embodiment of the present invention in reference to FIGS. 13 to 35. The communication protocols described in the present embodiment are applicable to embodiments 1 to 8. The terms defined in embodiments 1 to 8 are used in the present embodiment according to the same definitions unless otherwise noted.
Communication Layers FIG. 13 is a schematic diagram for relationship among the OSI 7-layer model, the IrDA layers, and the layers of the communication system of the present invention.

The communication system according to the present embodiment is divided into communication layers with equivalent functions to those of the layers in the OSI 7-layer model. However, as shown in FIG. 13, the communication system has a six-layer structure in which the session layer and the presentation layer are merged into a single layer.

For ease of explanation, the present embodiment will describe the invention as applied to IrSimple as an example. However, the present invention is by no means limited to IrSimple. IrSimple is an improved version of conventional IrDA.

In the present embodiment, the data link layer, the network layer, the transport layer, and the session/presentation layer may be referred to as LAP, LAMP, SMP, and OBEX, respectively, in accordance with IrSimple. To distinguish between the communication layers in the transmitter and those in the receiver, the layers in the transmitter (primary station) are indicated by "P," and those in the receiver (secondary station) by "S." For example, "LAP(P)" denotes the data link layer in the transmitter.
(2) Sequence Between Transmitter and Receiver
(2-1) Connection Sequence
[A] Response is Sent FIG. 14(a) is a sequence diagram showing a connection sequence according to the present embodiment (response is sent). FIG. 14(c) is an illustration of the structure of communication data used in the connection sequence of the present embodiment (response is sent).

In the present embodiment (response is sent), a global address is used for the destination device address of an SNRM command, thereby giving a searching function to the SNRM command (SNRM command in FIG. 14(c)).

Furthermore in the present embodiment (response is sent), the SNRM command, which is a connection packet for the data link layer, and the UA response contain parameters and commands required in the connection of the upper layers, such as the network layer, the transport layer, the session layer, and the presentation layer. Accordingly, the present embodiment uses only one connection packet, rather than several as required in conventional IrDA, to connect all of the upper layers.

Thus, the present embodiment carries out the search and connection sequence with a single pair of packets, rather than a plurality of packets as required in conventional cases.
[B] No Response is Sent FIG. 14(b) is a sequence diagram showing a connection sequence according to the present embodiment (no response is sent). FIG. 14(c) is an illustration of the structure of communication data used in the connection sequence of the present embodiment (no response is sent). Note that in the present embodiment (no response is sent), the UA response (UA response for SNRM in FIG. 14(c)) is not required.

A communication mode which involves no response from the receiver may be selected depending on the user, application, or data type. When such a method is selected, the SNRM command alone can complete both search and connection as shown in FIG. 14(b).

The connection sequence of the present embodiment, as explained above, reduces the time required to make a connection by handling all connection requests for the plural communication layers at the same time, and therefore can easily recover from a disconnection of the communication path. In view of this, the connection sequence is particularly suitable for wireless communication in which the communication path is easily cut off (e.g. infrared communication). Note that the connection sequence is effective also with other wireless and wired communication, including IEEE 802.11 and Bluetooth.

The present embodiment will describe an example in which all the communication layers are connected by a single round of communication. The present invention is not limited to such cases. For example, the present invention may be arranged so that one communication layer is connected first, and the remaining two or more communication layers are connected thereafter. Alternatively, a connection for one communication layer may be established through plural rounds of communication. For example, given that two rounds of communication are required to establish a connection for the network layer, the connection of the data link layer and the first of the two rounds of communication for the connection of the network layer may be handled by one connection request, and the second round of communication for the connection of the network layer and the connection of the transport layer may be handed by one connection request.
(2-2) Data Exchange Sequence
[A] Response is Sent FIGS. 15(a), 15(b) are sequence diagrams each showing a data exchange sequence according to the present embodiment (response is sent). FIG. 15(a) is an illustration of the structure of communication data used in the data exchange sequence of the present embodiment (response is sent).

In the present embodiment (response is sent), a response from a lower layer/upper layer is not transmitted for each data, thereby reducing the number of responses as many as possible. Then, a response is sent as to presence of an error after a large amount of data is transmitted.

In data communication, the transmitter uses (i) a flag for asking the receiver if there is any problem in the sequence of packet number or in the data received and (ii) a packet constituted of plural data items created by dividing the data according to the packet size.

As shown in FIG. 15(a), the transmitter transmits a predetermined number of packets, and then transmits a packet in which the flag is on. If the receiver on the other end has detected no error since the start of receiving the data or since a previous response sent in reply to a packet in which the flag is on, the receiver notifies the transmitter of proper transmission. If an error is detected, the receiver ignores the data items after the missed packet, and only confirms the flag. When it is confirmed that the flag is on, the receiver informs the transmitter of the packet number of the packet which ahs not been received due to the error.

When the transmitter is notified of a proper transmission from the receiver, the transmitter continues to transmit a next packet. When it is notified of an error, the transmitter retransmits the packets, starting with the packet which was not properly received and ending with the packet bearing the turned-on flag.

With this, the interval between packets is reduced, thereby efficiently performing transmission.

As shown in FIG. 15(a), the present embodiment (response is sent) uses an UI frame (FIG. 16(b)). Therefore, the data link layer (LAP layer) is incapable of recognizing missing of packets, and the missing is detected by the transport layer.

In the UI frame, the data for the transport layer contains the sequential number, a flag for confirming the data, a flag for informing as to whether the packet is the final packet of the data, and a flag for checking if there is any problem in the received data. The data transmission is carried out using these flags.

[B] No Response is Sent

FIGS. 17(a), 17(b) are sequence diagrams each showing a data exchange sequence according to the present embodiment (no response is sent). FIG. 17(b) is an illustration of the structure of communication data used in the data exchange sequence of the present embodiment (no response is sent).

In the present embodiment (no response is sent), if no response from the receiver is needed, only the completeness of data is confirmed. Therefore, the transmitter puts a sequential number on each packet, and transmits all the data at once.

The receiver only confirms whether there is any error in the transmission. When all the packets (data) are properly received, the proper completion of data is perceived in the receiver, and the next operation is carried out, which is display, printing, storing, etc. of the received data. On the other hand, when an error is detected, the error is perceived in the receiver, and a different operation is carried out, which is error indication to the user, stand-by for the next data, etc.

Note that the present embodiment (no response is sent) also uses the UI frame (FIG. 16(b)) shown in FIG. 17(b).

(2-3) Disconnection Sequence

[A] Response is Sent

FIG. 18(a) is a sequence diagram showing a disconnection sequence of the present embodiment (response is sent). FIG. 18(c) is an illustration of the structure of communication data used in the disconnection sequence of the present embodiment (response is sent).

As shown in FIG. 18(c), in the present embodiment (response is sent), the DISC command and the UA response contain the parameters and commands required for a disconnection of the upper layers. such as the network layer, the transport layer, the session layer, and the presentation layer.

In this way, the present embodiment carries out a disconnection sequence with a single pair of packets, rather than a plurality of packets as required in conventional cases.

[B] No Response is Sent

FIG. 18(b) is a sequence diagram showing a disconnection sequence according to the present embodiment (no response is sent). FIG. 18(c) is an illustration of the structure of communication data used in the disconnection sequence of the present embodiment (response is sent). Note that in the present embodiment (no response is sent), the UA response (UA response in FIG. 18(c)) is not required.

As shown in FIG. 18(b), in the present embodiment (no response is sent), when the connection is established without requiring a response from the receiver, the DISC command alone can complete both search and disconnection.

(3) Sequence in Transmitter and Sequence in Receiver

In FIGS. 19 to 35, for ease of explanation, the data link layer, the network layer, the transport layer, and the session/presentation layer may be referred to as LAP, LAMP, TTP or SMP, and OBEX, respectively. To distinguish between the communication layers in the transmitter and those in the receiver, the layers in the transmitter are indicated by "P," and those in the receiver by "S." For example, "LAP(P)" denotes the data link layer in the transmitter.

(3-1) Connection Sequence

[A] Response is Sent

Figure 19:
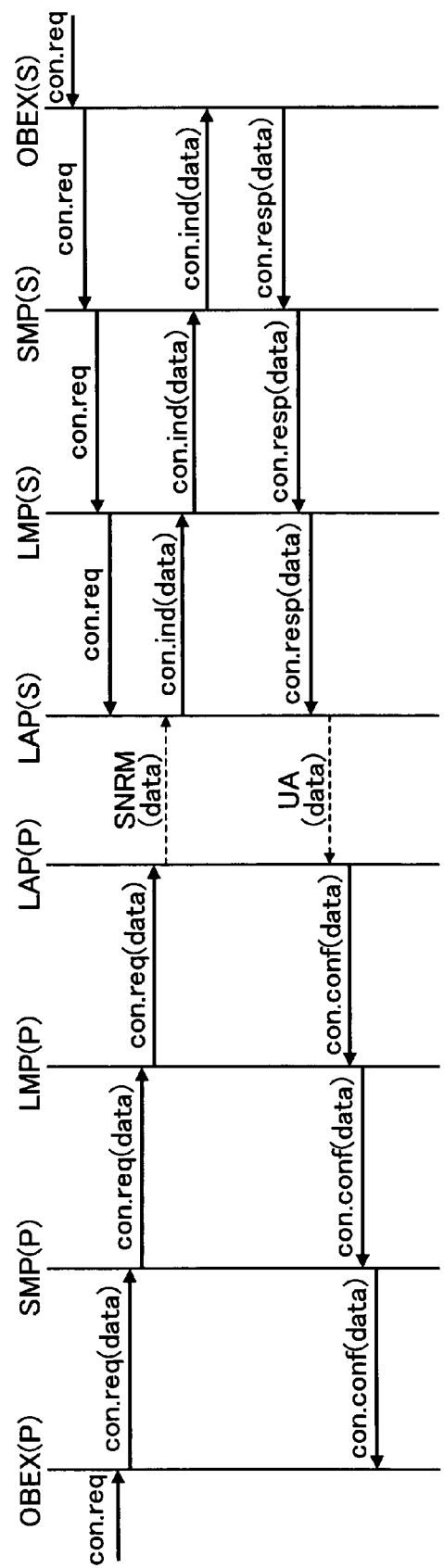
FIG. 19 is a sequence diagram showing a flow of functions (commands and messages) and packets between layers for a connection sequence in accordance with an embodiment of the present invention.
Figure 20A:
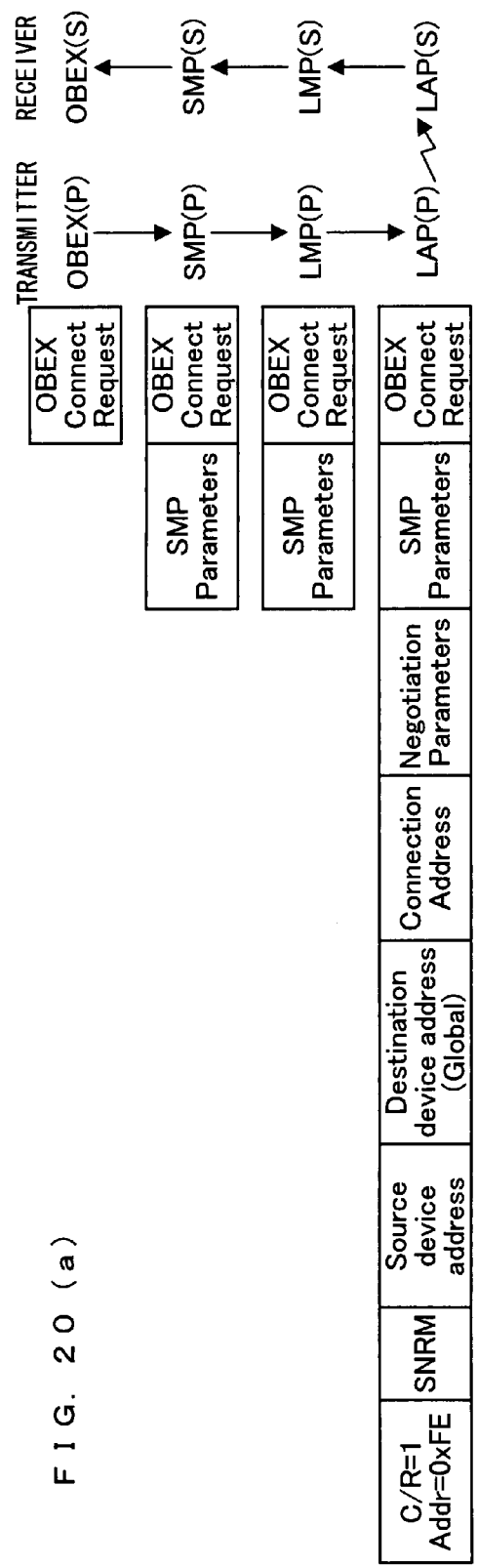
FIG. 20(a) is an illustration of changes of data in functions indicated by rightward arrows between the layers in FIGS. 19 and 21 for a connection sequence in accordance with an embodiment of the present invention.
Figure 20B:
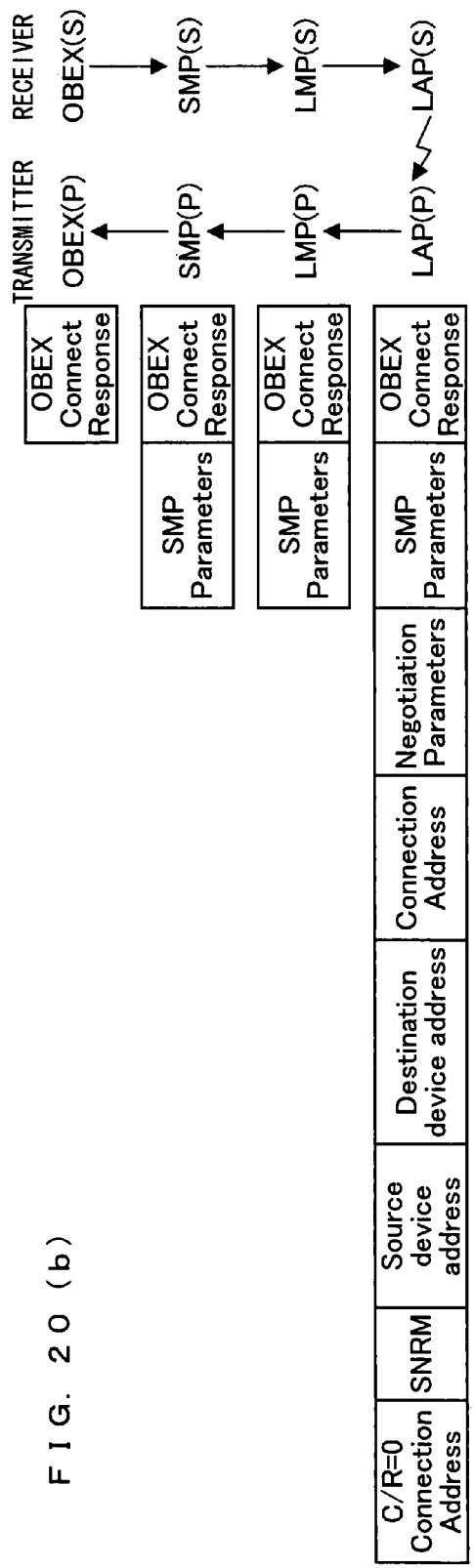
FIG. 20(b) is an illustration of changes of data in functions between the layers in accordance with an embodiment of the present invention.

FIG. 19 is a sequence diagram showing a connection sequence of the present embodiment (response is sent). FIGS. 20(a), 20(b) are illustrations of the structure of communication data used in the connection sequence of the present embodiment (response is sent).

As shown in FIG. 19, in the present embodiment (response is sent), the transmitter and the receiver first carry out preparation for a connection. Then, the transmitter passes on the request from the upper layer to the lower layers, and then transmits the request as a single packet (SNRM). Meanwhile, the receiver receives the SNRM packet, and passes on the notification of the successful establishment of a connection to the upper layers, and then passes on a response from the OBEX(S) from the upper to the lower layer, and transmits the response as a single packet (UA). The transmitter is notified of the establishment of the connection through the reception of UA, and passes on the notification (Connect.confirm) from lower to upper layers.

The following will separately describe the sequence in the transmitter and the sequence in the receiver.

First, the communication layers in the transmitter will be described.

When a connection request is transmitted from the application to the OBEX(P), the OBEX(P) emits a connection request function (Primitive), in which data contains a connection request command to the lower layer (SMP(P)). Furthermore, when a connection confirmation function is transmitted from the SMP(P) to the OBEX(P), the OBEX(P) checks a response for an OBEX connection which is contained in the data. When the response tells that the connection has been properly done ("Success"), the OBEX(P) finishes the connecting operation.

The SMP(P) receives the connection request function from the OBEX(P), and adds a parameters required for communication with the SMP(S) of the receiver to the data, and emits the connection request function to the lower layer (LMP(P)). When a connection confirmation function is transmitted from the LMP(P) to the SMP(P), the SMP(S) extracts a parameter generated by the SMP(S) of the receiver from the data of the function, and checks the value, and then finishes the negotiation with the SMP(S). Further, the SMP(P) removes the parameter of the SMP(S) from the data of the connection confirmation function, and transmits the resulting data to the OBEX(P) as the connection confirmation function.

The LMP(P) receives the connection request function from the SMP(P), and immediately adds parameter(s) required for communication with the LMP(S) of the receiver to the data of the connection request function from the SMP(P), and emits the connection request function to the lower layer (LAP(P)). When a connection confirmation function is transmitted from the LAP(P) to the LMP(P), the LMP(P) extracts parameter(s) generated by the LMP(S) of the receiver from the data of the function, and checks the value, and then finishes the negotiation with the LMP(S). Further, the LMP(P) removes the parameter(s) of the LMP(S) from the data of the connection confirmation function, and transmits the resulting data to the SMP(P) as the connection confirmation function.

Note that, in general operation, an LSAP (Link Service Access Point) is defined to manage the logic port. When the connection is established by connecting the layers one by one, the LMP is not required. In this case, a connectionless value is used as the fixed value of the LSAP. Therefore, the exchange of the connection parameter(s) for LMP is not required.

The LAP(P) receives the connection request function from the LMP(P), and immediately adds parameter(s) required for communication with the LAP(S) of the receiver to the data of connection request function from the LMP(P), and emits the SNRM command to the physical layer of the receiver. When the UA response is transmitted from the physical layer of the receiver to the LAP(P), the LAP(P) extracts the parameter(s) generated by the LAP(S) of the receiver from the data of the UA response, and checks the value, and then finishes the negotiation with the LAP(S). Further, the LAP(P) removes the parameter(s) of LAP(S) from the data of the UA response, and transmits the resulting data to the LMP(P) as the connection confirmation function.

Next, the communication layers in the receiver will be described.

The OBEX(S) receives the connection request function from the application, and stands by for the next reception. When a connection notification function (Indication) is transmitted from the lower layer (SMP(S)), the OBEX(S) checks a command for OBEX connection which is contained in the data. When the command indicates that the connection has been properly done, the OBEX(S) emits a response "Success" as a connection response function (Response) to the SMP(S), and finishes the connection operation.

The SMP(S) receives the connection request function from the OBEX(S), and stands by for the next reception. When the connection notification function is transmitted from the lower layer (SMP(S)), the SMP(S) extracts the parameter(s) generated by the SMP(P) of the transmitter from the data of the function, and creates parameter(s) for response, and emits the connection request function containing the data thus created by removing the parameter(s) of the SMP(P) from the data of the function, to the OBEX(S), and then stands by for a connection response function which comes from the OBEX(S). Further, when the connection response function is transmitted from the OBEX(S), the SMP(S) adds the parameter(s) of the response to the data of the connection response function of the OBEX(S), emits the connection response function to the LMP(S), and finishes the negotiation for the SMP layer.

The LMP(S) receives the connection request function from the SMP(S), and stands by for the next reception. When the connection notification function is transmitted from the lower layer (LAP(S)), the LMP(S) extracts the parameter(s) generated by the LMP(P) of the transmitter from the data of the function, and creates parameter(s) for response, and emits the connection request function containing the data thus created by removing the parameter(s) of the LMP(P) from the data of the function, to the SMP(S), and then stands by for a connection response function which comes from the SMP(S). Further, when the connection response function is transmitted from the SMP(S), the LMP(S) adds the parameter(s) of the response, to the data of connection response function of the SMP(S), emits the connection response function to the LAP(S), and finishes the negotiation for the LMP layer.

Note that in general operation, an LSAP (Link Service Access Point) is defined to manage the logic port. When the connection is established by connecting the layers one by one, the LMP is not required. In this case, a connectionless value is used as the fixed value of the LSAP. Therefore, the exchange of connection parameter(s) for LMP is not required.

The LAP(S) receives the connection request function from the LMP(S), and stands by for the next reception. When the SNRM command is transmitted from the physical layer to the LAP(S), the LAP(S) extracts parameter(s) generated by the LAP(P) of the transmitter from the data of the SNRM command, and creates parameter(s) for response after transmitting the connection request function, containing the data thus created by removing the parameter(s) of LAP(P) from the data of the SNRM command, to the LMP(S), and then stands by for a connection response function which comes from the LMP(S). Further, when the connection response function is transmitted from the LMP(S), the LAP(S) adds the parameter(s) of the response to the data of the connection response function of the LMP(S), emits the UA response to the physical layer, and finishes the negotiation for the LAP layer.

[B] No Response is Sent

Figure 21:
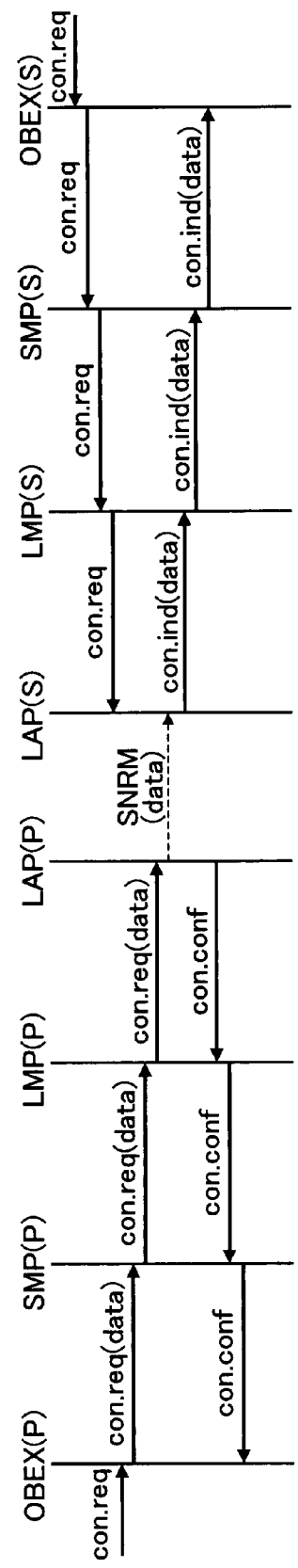
FIG. 21 is a sequence diagram showing a flow of functions (commands and messages) and packets between layers for a connection sequence in accordance with an embodiment of the present invention.

FIG. 21 is a sequence diagram showing a connection sequence according to the present embodiment (no response is sent). FIG. 20(a) is an illustration of the structure of communication data used in the connection sequence according to the present embodiment (no response is sent).

As shown in FIG. 21, in the present embodiment (no response is sent), the transmitter and the receiver first carry out preparation for a connection. Then, the transmitter passes on the request from the upper layer to the lower layers, and then transmits the request as a single packet (SNRM). Having transmitted the SNRM packet, the transmitter passes on the notification of completion of a connection (Connect.confirm) from the LAP(P) to the upper layers. Meanwhile, the receiver receives the SNRM packet, and passes on the notification of completion of a connection from the lower to the upper layer. The connection is regarded completed when the notification of completion of a connection is received by the OBEX(S).

The following will describe the sequence in the transmitter and the sequence in the receiver.

First, the communication layers in the transmitter will be described.

When a connection request is transmitted from the application to the OBEX(P), the OBEX(P) immediately emits a connection request function (Primitive), in which data contains a connection request command, to the lower layer (SMP (P)). Further, when a connection confirmation function is transmitted from the SMP(P) to the OBEX(P), the OBEX(P) finishes the connecting operation.

The SMP(P) receives the connection request function from the OBEX(P), and immediately adds parameter(s) required for communication with the SMP(S) of the receiver to the data of the connection request function of the OBEX(P), and emits the connection request function to the lower layer (LMP (P)). When a connection confirmation function is transmitted from the LMP(P) to the SMP(P), the SMP(P) regards that the procedure has been done with the transmitted parameter(s), and finishes the negotiation for the SMP layer. Then, the SMP(P) transmits the connection confirmation function to the OBEX(P).

The LMP(P) receives the connection request function from the SMP(P), and immediately adds parameters required for communication with the LMP(S) of the receiver to the data of the connection request function from the SMP(P), and emits the connection request function to the lower layer (LAP(P)). When a connection confirmation function is transmitted from the LAP(P) to the LMP(P), the LMP(P) regards that the procedure has been done with the transmitted parameter(s), and finishes the negotiation for the LMP layer. Then the LMP(P) transmits the connection confirmation function to the SMP(P).

Note that in general operation, an LSAP (Link Service Access Point) is defined to manage the logic port. When the connection is established by connecting the layers one by one, the LMP is not required. In this case, a connectionless value is used as the fixed value of LSAP. Therefore, the exchange of connection parameter(s) for LMP is not required.

The LAP(P) receives the connection request function from the LMP(P), and immediately adds parameter(s) required for communication with the LAP(S) of the receiver to the data of the connection request function from the LMP(P), and emits the SNRM command to the physical layer of the receiver. Transmitting the SNRM command, the LAP(P) regards that the procedure has been done with the transmitted parameter(s), and finishes the negotiation for the LAP layer. Then the LAP(P) transmits the connection confirmation function to the LMP(P).

Next, the communication layers in the receiver will be described.

The OBEX(S) receives the connection request function from the application, and stands by for the next reception. When a connection notification function (Indication) is transmitted from the lower layer (SMP(S)) to the OBEX(S), the OBEX(S) checks a command for OBEX connection which is contained in the data. When the command indicates that the connection has been properly done, the OBEX(S) finishes the connecting operation.

The SMP(S) receives the connection request function from the OBEX(S), and stands by for the next reception. When the connection notification function is transmitted from the lower layer (SMP(S)), the SMP(S) extracts parameter(s) generated by the SMP(P) of the transmitter from the data of the function, and finishes negotiation by using the parameter(s). Then the SMP(S) emits the connection request function containing the data thus created by removing the parameter(s) of SMP(P) from the data of the function, to the OBEX(S).

The LMP(S) receives the connection request function from the SMP(S), and stands by for the next reception. When the connection notification function is transmitted from the lower layer (LAP(S)), the LMP(S) extracts parameter(s) generated by the LMP(P) of the transmitter from the data of the function, and finishes negotiation by using the parameter(s). Then the LMP(S) emits connection request function containing the data thus created by removing the parameter(s) of the LMP(P) from the data of the function, to the SMP(S).

Note that in general operation, an LSAP (Link Service Access Point) is defined to manage the logic port. When the connection is established by connecting the layers one by one, the LMP is not required. In this case, a connectionless value is used as the fixed value of the LSAP. Therefore, the exchange of connection parameter(s) for the LMP is not required.

The LAP(S) receives the connection request function from the LMP(S), and stands by for the next reception. When the SNRM command is transmitted from the physical layer, the LAP(S) extracts parameter(s) generated by the LAP(P) of the transmitter from the data of the SNRM command, and finishes negotiation by using the parameter(s). Then the LAP(S) emits the connection request function containing the data thus created by removing the parameter(s) of LAP(P) from the data of the function, to the LMP(S).

(3-2) Data Exchange Sequence

[A] Response is Sent

Figure 22:
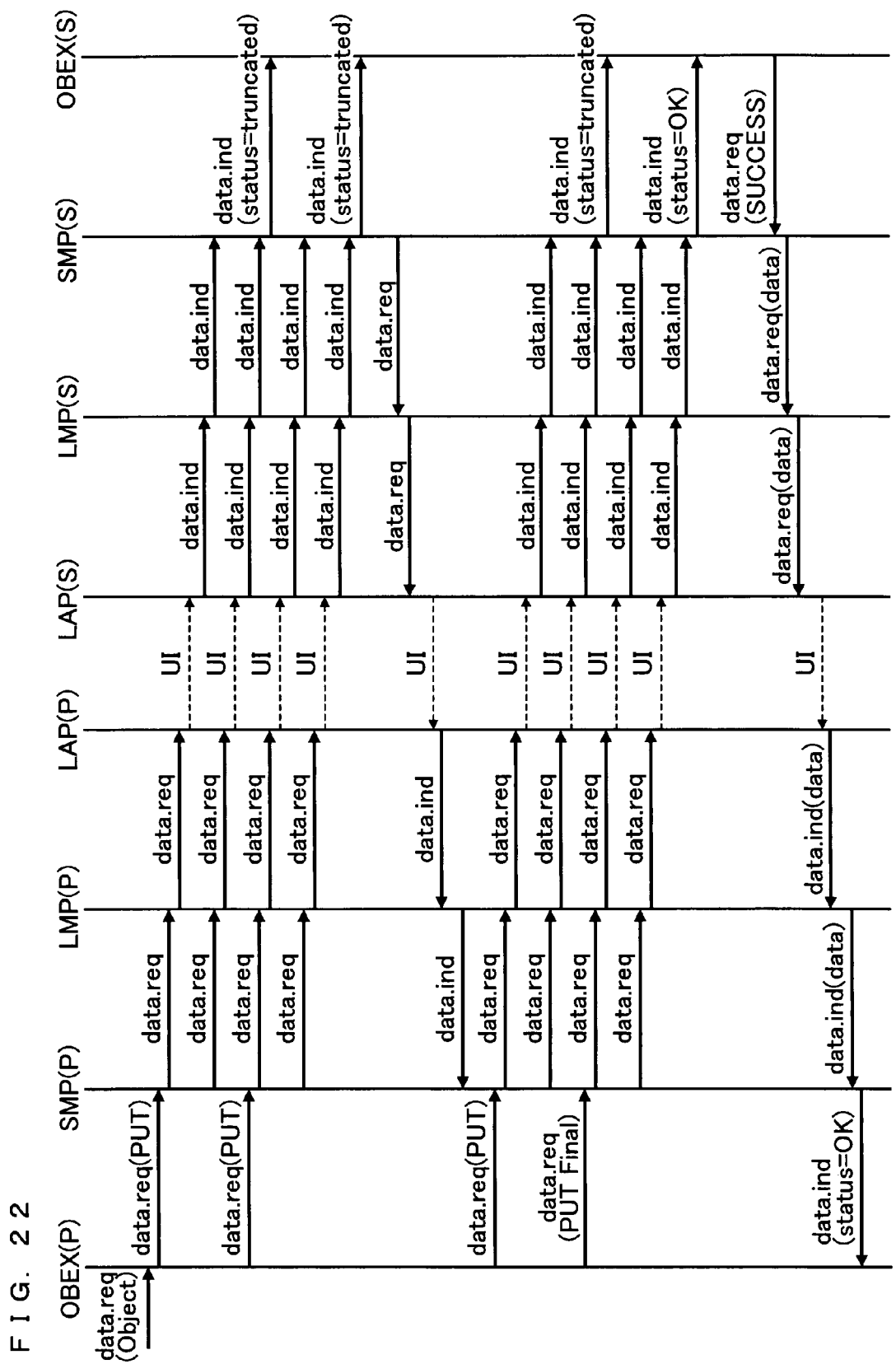
FIG. 22 is a sequence diagram showing a flow of functions (commands and messages) and packets between layers for a data exchange in accordance with an embodiment of the present invention.
Figure 23:
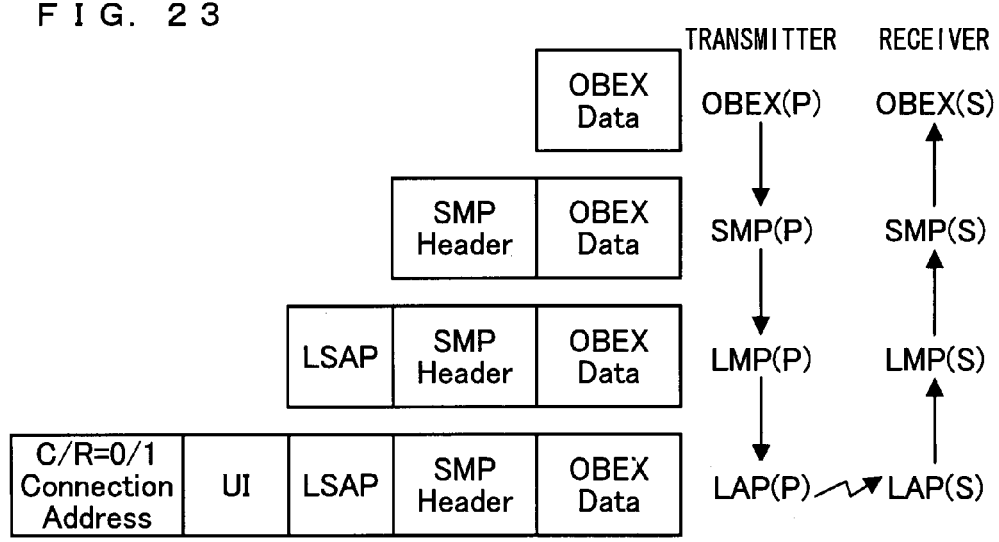
FIG. 23 is an illustration of changes of data in functions between the layers in FIGS. 22 and 24 for a data exchange in accordance with an embodiment of the present invention.

FIG. 22 is a sequence diagram showing a data exchange sequence according to the present embodiment (response is sent). FIG. 23 is an illustration of the structure of communication data used in the data exchange sequence of the present embodiment (response is sent).

As shown in FIG. 22, in the present embodiment (response is sent), the transmitter generates a PUT command, which is propagated through the lower layers to be transmitted as a UI frame (FIG. 16(b)).

Obtaining the data, the receiver propagates a notification from lower to upper layers. At this time, the SMP(S) notifies the upper layer OBEX(S) of continuity of data (status=truncated).

After transmitting a predetermined number of packets, the transmitter transmits a packet in which the flag for confirming proper data transmission is on. The receiver receives the data with the flag on, and checks if the transmission has been done properly. If an error is detected, the SMP(S) informs the transmitter of the packet number which has not been received due to the error.

if no error is detected, the transmitter outputs the next packets. If an error is detected, the transmitter retransmits the packets having been suspended after the error.

The transmitter puts an ON-flag in the final data, the flag indicating that this is the final data. Meanwhile, the SMP(S) notifies the OBEX(S) that all data items have been received (status=OK), and stands by for a response from the OBEX(S). The response generated from the OBEX(S) is propagated to the lower layers, and is outputted as a UI frame.

if the response is "Success," the transmitter finishes the operation in a general way.

The following will separately describe the sequence in the transmitter and the sequence in the receiver.

In the transmitter, the OBEX(P) outputs a PUT command to the lower layers as a data transmission function. However, if the SMP(P) is capable of transmission without a response ("Continue" in general) with respect to a PUT command, except for the PUT Final (final PUT), the OBEX(P) outputs the next command. In the case of a command other than the PUT Final or the PUT command, the operation is suspended to wait for the data notification function from the lower layer, and the command is finished after checking the response in the data.

The data transmission function denotes a function (Data Request) for requesting the lower layer to transmit data. Further, the data notification function denotes a function (Data Indicate) serving as a notification of data reception from the lower layer.

In the receiver, the OBEX(S) receives data from the lower layer with the data notification function. However, the OBEX(S) does not send back a response to PUT commands other than the PUT Final command, and sends back, as a response, a data transmission function to commands other than the PUT Final command or PUT command.

The following will describe a header, etc. of the data transmission functions and the data notification functions in the upper and lower layers. These data items are used for both the transmitter and the receiver.

In receiving the data transmission function from the OBEX, (a) if the predetermined size for transmission data in the LMP is smaller than the size of data in the data transmission function, the SMP divides the data into smaller items to allow the LMP to transmit the data. On the other hand, (b) if the predetermined size for transmission data in the LMP is larger than the size of data in the data transmission function, the SMP combines plural data items of the data transmission function to make data having a larger volume but being transmittable. The SMP also creates a SMP header constituted of, for example, a sequential number, an argument for asking the other device about data reception condition, an argument indicating the end of data, an argument indicating necessity of transmission of OBEX response to the SMP of the other device, and an argument indicating whether the received data was a complete set of data items. Further, the SMP header is added to the divided/combined data and is contained in the data transmission function. The data transmission function is transmitted to the LMP.

When the SMP receives the data notification function from the LMP, the SMP extracts the SMP header from the data in the function, and checks whether the sequential numbers are appropriate (i.e., the numbers are in sequence). If the numbers are in sequence, the SMP transmits the data notification function to the OBEX. At this point, the data notification function may be outputted for each data notification function coming from the lower layer, or for a predetermined set of those.

The SMP(P) of the transmitter modifies the data transmission function from the OBEX(P), into a data transmission function suitable for the LMP(P), and emits the data transmission function with a predetermined amount of data. After that, the SMP(P) sets "true" for the argument for asking the receiver about data reception condition, and transmits the data transmission function. The SMP(P) then stands by for the data notification function from the LMP(P).

The SMP(P) analyzes the SMP header in the data notification function sent from the LMP(S), and confirms if the transmission has been done properly, by referring to the argument indicating whether the received data was a complete set of data items. Having been confirmed that the transmission has been done properly, the SMP is turned into a state allowing transmission to the OBEX(P), that is, it is ready to send the next data. In this state, the SMP(P) is capable of receiving data from the OBEX(P).

On the other hand, when the SMP(P) has found out, according to the argument indicating whether the received data was a complete set of data items, that the transmission has not been done properly, the SMP(P) regenerates data sequence from the unsent data transmission function to the argument set to "true" for asking the receiver about data reception condition. The SMP(P) repeats the regeneration predetermined times, or until the all data of the data transmission function is received in the receiver.

Further, when the SMP(P) receives from OBEX(P) the data transmission function with an argument indicating the end of data, which is set to "true," the SMP(P) sets "true" for the argument indicating the end of data, or for the argument indicating necessity of response from OBEX(S) in the data of transmission function to the LMP(P), and sends this new transmission function to the LMP(P).

On the other hand, when the SMP(S) of the receiver receives from the LMP(S) the data notification function in which either the argument indicating the end of data or the argument indicating necessity of transmission of OBEX(S) response to the other end is set to "true," the SMP(S) removes the header of the SMP(S) from the data notification function before transmitting the function to the OBEX(S).

Further, when the SMP(S) receives the data notification function from the LMP(S), the SMP(S) analyzes the SMP header in the data in the data notification function, and checks the sequential number. If the SMP(S) confirms that the receiver has received all data items until the header in which the argument for asking the receiver about data reception condition is "true," the SMP(S) creates a SMP header by modifying the argument indicating whether the received data was a complete set of data items into an appropriate format for indicating that the received data was a complete set of data items. With this data, the SMP(S) transmits the data transmission function to the LMP(S).

On the other hand, when the SMP(S) found out that there was a problem in data reception in the receiver, the SMP(S) infers the number of SMP header not transmitted and stores the number. For example, when the data items 0, 1, 2, 3, 5 are received, obviously the fifth number should be "4," but "4" is missing. That is, the number of data not received is "4." After this, the SMP(S) only checks if the argument for asking the receiver about data reception condition is set to "true" in the SMP header, and stops output of the data notification function to the OBEX(S).

When the SMP(S) receives the data notification function in which the argument for asking the receiver about data reception condition is "true," the SMP(S) creates a SMP header by modifying the argument indicating whether the received data was a complete set of data items into an appropriate format for indicating that the received data was not a complete set of data items, and inserting the number of the SMP header not properly received into the field for the sequential number. With this data, the SMP(S) transmits the data transmission function to the LMP(S).

Further, when the SMP(S) receives the data notification function in which either the argument indicating the end of data or an argument indicating necessity of transmission of OBEX(S) response to the other end is "true," the SMP(S) transmits the data notification function to the OBEX(S), and stands by for a data transmission request from the OBEX(S).

When the SMP(S) receives a data transmission request from the OBEX(S), the SMP(S) creates a SMP header by modifying argument indicating whether the received data was a complete set of data items into an appropriate format for indicating that the received data was a complete set of data items. The SMP(S) adds the SMP header to the data transmission function from the OBEX(S), and sends the resulting data to the LMP(S). Note that, since the notification to the OBEX(S) stops in case of error, the SMP(S) stands by only when the transmission is properly completed.

When the LMP receives the data transmission request function from the upper layer, the LMP adds a LMP header to the data of the data transmission request function, and adds the data to the data transmission function, and transmits the function to the LAP. Further, when the LMP receives the data notification function from the LAP, the LMP removes the LMP header from the data of the function and provides the resulting data in the data notification function, and transmits the function to the SMP.

Note that, when the connection is established by connecting the layers one by one, the LMP is not required. In this case, the LMP header includes LSAP having a connectionless value.

When the LAP receives the data transmission request function from the LMP, the LAP adds a LAP header to the data of the data transmission request function, and incorporates this data into a UI frame, and transmits the UI frame to the physical layer. Further, when the LAP receives the data reception notification from the physical layer, the LAP removes the LAP header from the data of the UI frame and incorporates the resulting data into the data notification function, and transmits the function to the LMP. Note that in the present embodiment, the LAP header contains a connection address and a UI indicator.

[B] No Response is Sent

Figure 24:
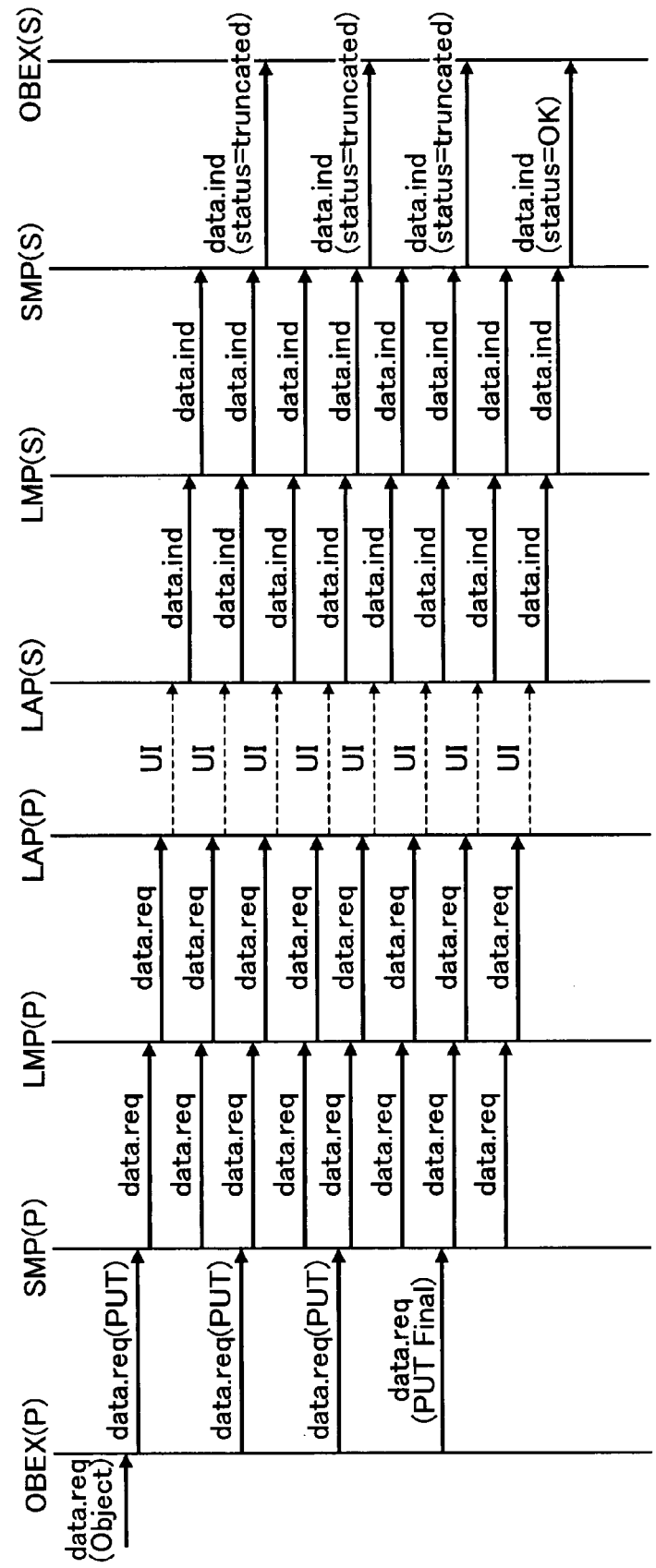
FIG. 24 is a sequence diagram showing a flow of functions (commands and messages) and packets between layers for a data exchange in accordance with an embodiment of the present invention.

FIG. 24 is a sequence diagram showing a data exchange sequence according to the present embodiment (no response is sent). FIG. 23 is an illustration of the structure of communication data used in the data exchange sequence according to the present embodiment (no response is sent).

As shown in FIG. 24, in the present embodiment (no response is sent), the transmitter generates a PUT command, and the PUT command is propagated through the lower layers, and is outputted as a UI frame.

Obtaining the data, the receiver propagates a notification from lower to upper layers. At this time, the SMP(S) notifies the upper layer OBEX(S) of continuity of data (status=truncated).

The transmitter puts an ON-flag in the final data, the flag indicating that this is the final data. Meanwhile, the receiver confirms the ON-flag of the SMP(S), and notifies the OBEX(S) that all data items have been received (status=OK), and then finishes data exchange sequence.

The following will separately describe the sequence in the transmitter and the sequence in the receiver.

In the transmitter, the OBEX(P) outputs a PUT command to the lower layers as a data transmission function. However, the OBEX(P) is capable of finishing a command without a response with respect to each command. Then, the OBEX(P) outputs the next command if transmission is allowed in the SMP(P).

In the receiver, the OBEX(S) receives the data notification function from the lower layer. However, the OBEX(S) does not send back a response for each command, only receiving data.

The following will describe a header, etc. of the data transmission functions and the data notification functions in the upper and lower layers. These data items are used for both the transmitter and the receiver.

In receiving the data transmission function from the OBEX, (a) if the predetermined size for transmission data in the LMP is smaller than the size of data in the data transmission function, the SMP divides the data into smaller items to allow the LMP to transmit the data. On the other hand, (b) if the predetermined size for transmission data in the LMP is larger than the size of data in the data transmission function, the SMP combines plural data items of the data transmission function to make data having a larger volume but being transmittable. The SMP also creates a SMP header constituted of, for example, a sequential number, an argument for asking the other device about data reception condition, an argument indicating the end of data, an argument indicating necessity of transmission of OBEX response to the SMP of the other device, and an argument indicating whether the received data was a complete set of data items. Further, the SMP header is added to the divided/combined data and is contained in the data transmission function. The data transmission function is transmitted to the LMP.

When the SMP receives the data notification function from the LMP, the SMP extracts the SMP header from the data in the function, and checks whether the sequential numbers are appropriate (i.e., the numbers are in sequence). If the numbers are in sequence, the SMP transmits the data notification function to the OBEX. At this time, the data notification function may be outputted for each data notification function coming from the lower layer, or for a predetermined set of those.

The SMP(P) of the transmitter modifies the data transmission function from OBEX(P), into a data transmission function suitable for the LMP(P). When the SMP(P) receives from the OBEX(P) a data transmission function in which the argument for asking the receiver about data reception condition is set to "false," the SMP(P) adds the SMP header to the data, and transmits the data to the LMP(P). On the other hand, when the SMP(P) of the receiver receives from the OBEX(P) a data transmission function in which the argument indicating the end of data is set to "true," the SMP(P) sets "true" for the argument indicating the end of data, or for the argument indicating necessity of transmission of OBEX(S) response in the transmission function to the LMP(P), and sends this new transmission function to the LMP(S).

Further, when the SMP(S) receives the data notification function from the lower layer, the SMP(S) analyzes the SMP header in the data in the data notification function, and checks the sequential number. If the SMP(S) confirms that the reception has been done normally, the SMP(S) transmits the data transmission function to the LMP(S).

On the other hand, when the SMP(S) found out that there was a problem in data reception in the receiver, the SMP(S) notifies the OBEX(S) of the error. For example, when the data items 0, 1, 2, 3, 5 are received, obviously the fifth number should be "4," but "4" is missing.

After that, the SMP(S) stands by for a function with a SMP header in which the argument indicating the end of data or the argument indicating necessity of transmission of OBEX(S) response to the receiver and is set to "true." The SMP(S) stops data notification to the OBEX(S) until it receives either the "true" data notification function (however no notification is sent to the OBEX(S)), receives a disconnection notification function, or does not carry out the data notification to the OBEX(S) until a certain time period has been elapsed.

When the LMP(P) of the transmitter receives a data transmission request function from the SMP(S), the LMP(P) adds the LMP header to the data of the function. The LMP(P) then transmits the data transmission request function containing the created data to the LAP(P).

When the LMP(S) of the receiver receives the data notification function from the LAP(S), the LMP(S) removes the LMP header from the data of the data notification function, and provides the data to the data notification function, and transmits the function to the SMP(S).

Note that when the connection is established by connecting the layers one by one, the LMP is not required. In this case, a connectionless value is used as the fixed value of LSAP in the LMP header.

When the LAP(P) of the transmitter receives the data transmission request function from the LMP(P), the LAP(P) adds a LAP header to the data of the data transmission request function, and incorporates this data into a UI frame, and transmits the UI frame to the physical layer.

Further, when the LAP(S) of the receiver receives the data reception notification from the physical layer, the LAP(S) removes the LAP header from the data of the UI frame and incorporates the resulting data into the data notification function, and transmits the function to the LMP(S). Note that, in the present embodiment, the LAP header contains a connection address and a UI indicator.

(3-3) Disconnection Sequence

[A] Response is Sent

Figure 25:
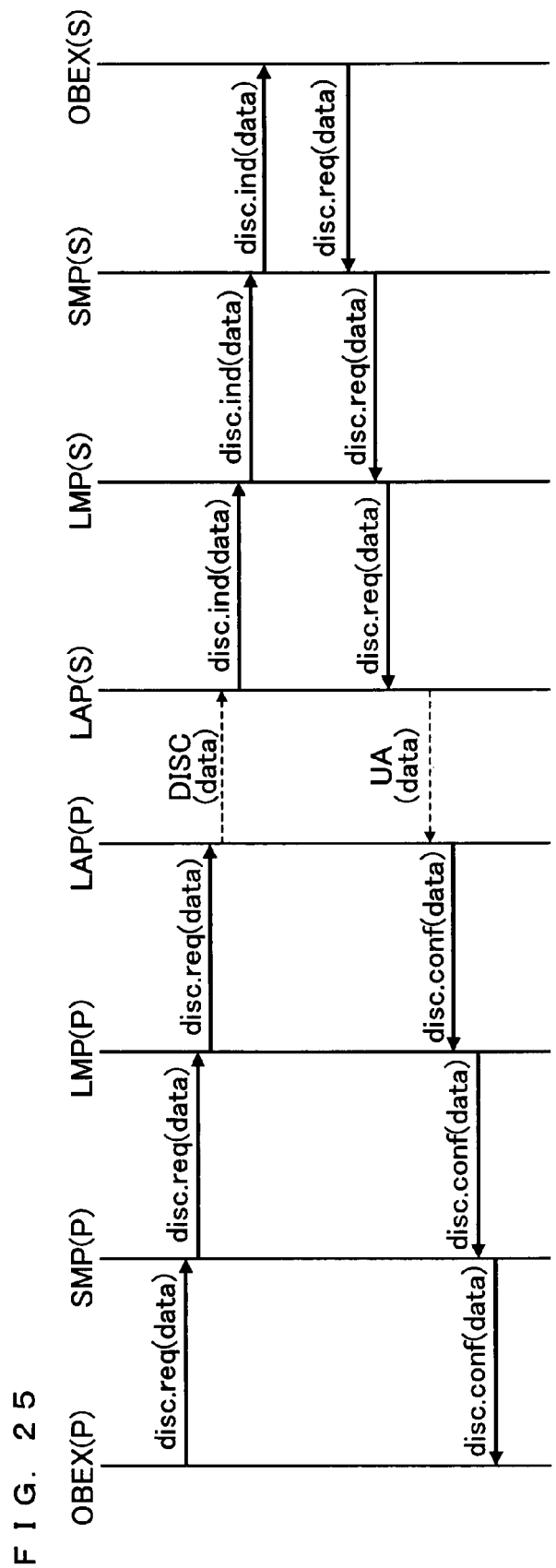
FIG. 25 is a sequence diagram showing a flow of functions (commands and messages) and packets between layers for a disconnection sequence in accordance with an embodiment of the present invention.

FIG. 25 is a sequence diagram showing a disconnection sequence according to the present embodiment (response is sent). FIGS. 26(a), 26(b) are illustrations of the structure of communication data used in the disconnection sequence of the present embodiment (response is sent).

As shown in FIG. 25, in the present embodiment (response is sent), the disconnection command of the transmitter is propagated from upper to lower layers, and a DISC command is generated. Meanwhile, the receiver receives the DISC command, and passes on the command from lower to upper layers, and then passes on a response from upper to lower layers, and a UA response is generated. The notification of reception of the UA response is passed on from lower to upper layers of the transmitter, and the sequence is completed.

The following will separately describe the sequence in the transmitter and the sequence in the receiver.

First, the communication layers in the transmitter will be described.

When a disconnection request is transmitted from the application to the OBEX(P), the OBEX(P) immediately emits a disconnection request function (Primitive), which contains a disconnection request command, to the lower layer (SMP(P)). Further, when a disconnection confirmation function is transmitted from the SMP(P) to the OBEX(P), the OBEX(P) checks a response for OBEX disconnection which is contained in the data. When the response tells that the disconnection has been properly done ("Success"), the OBEX(P) finishes the disconnecting operation.

The SMP(P) receives the disconnection request function from the OBEX(P), and immediately adds parameter(s) required for communication with the SMP(S) of the receiver to the data, and emits the disconnection request function to the lower layer (LMP(P)). When a disconnection confirmation function is transmitted from LMP(P) to the SMP(P), the SMP(P) extracts parameter(s) generated by the SMP(S) of the receiver from the data of the function, and checks the value, and then finishes the disconnection process with the SMP(S). Further, the SMP(P) removes the parameter(s) of the SMP(S) from the data of the disconnection confirmation function, and transmits the resulting data to the OBEX(P) as the disconnection confirmation function. It however should be noted that there is normally no parameter to be added to the disconnection request function in the SMP(P).

The LMP(P) receives the disconnection request function from the SMP(P), and immediately adds parameter(s) required for communication with the LMP(S) of the receiver to the data of the disconnection request function from the SMP(P), and emits the disconnection request function to the lower layer (LAP(P)). When a disconnection confirmation function is transmitted from the LAP(P) to the LMP(P), the LMP(P) extracts parameter(s) generated by the LMP(S) of the receiver from the data of the function, and checks the value, and then finishes the disconnecting operation with the LMP(S). Further, the LMP(P) removes the parameter(s) of the LMP(S) from the data of the disconnection confirmation function, and transmits the resulting data to the SMP(P) as the disconnection confirmation function. It however should be noted that there is normally no parameter to be added to the disconnection request function in the LMP(P).

The LAP(P) receives the disconnection request function from the LMP(P), and immediately adds parameter(s) required for communication with the LAP(S) of the receiver to the data of the disconnection request function form the LMP(P), and emits the DISC command to the physical layer of the receiver. When the UA response is transmitted from the physical layer of the receiver to the LAP(P), the LAP(P) extracts parameter(s) generated by the LAP(S) of the receiver from the data of the UA response, and checks the value, and then disconnects from the LAP(S). Further, the LAP(P) removes the parameter(s) of LAP(S) from the data of the UA response, and transmits the resulting data to the LMP(P) as the disconnection confirmation function. It however should be noted that there is normally no parameter to be added to the disconnection request function in the LAP(P).

Next, the communication layers in the receiver will be described.

When a disconnection notification function (Indication) is transmitted from the lower layer (SMP(S)), the OBEX(S) checks a command for OBEX disconnection which is contained in the data. When the command indicates that the disconnection has been properly done, the OBEX(S) emits a response called "Success" as a disconnection response function to the SMP(S), and finishes the disconnecting operation.

When the disconnection notification function is transmitted from the lower layer (SMP(S)), the SMP(S) extracts parameter(s) generated by the SMP(P) of the transmitter from the data of the function, and creates parameter(s) for response, and emits the disconnection request function containing the data thus created by removing the parameter(s) of the SMP(P) from the data of the function, to the OBEX(S), and then stands by for a disconnection response function which comes from the OBEX(S). Further, when the disconnection response function is transmitted from the OBEX(S), the SMP(S) adds the parameter(s) of the response to the data of the disconnection response function of the OBEX(S), emits the disconnection response function to the LMP(S), and finishes the disconnection in the SMP layer. It however should be noted that there is normally no parameter to be added to the disconnection request function in the SMP(S).

When the disconnection notification function is transmitted from the lower layer (LAP(S)), the LMP(S) extracts parameter(s) generated by the LMP(P) of the transmitter from the data of the function, and creates parameter(s) for response, and emits the disconnection request function containing the data thus created by removing the parameter(s) of the LMP(P) from the data of the function, to the SMP(S), and then stands by for a disconnection response function which comes from the SMP(S). Further, when the disconnection response function is transmitted from the SMP(S), the LMP(S) adds the parameter(s) of the response to the data of the disconnection response function of the SMP(S), emits the disconnection response function to the LAP(S), and finishes the disconnection in the LMP layer. It however should be noted that there is normally no parameter to be added to the disconnection request function in the LMP(S).

When the DISC command is transmitted from the physical layer, the LAP(S) extracts parameter(s) generated by the LAP (P) of the transmitter from the data of the DISC command, and creates parameter(s) for response after transmitting the disconnection request function, containing the data thus created by removing the parameter(s) of LAP(P) from the data of the DISC command, to the LMP(S), and then stands by for a disconnection response function which comes from the LMP(S). Further, when the disconnection response function is transmitted from the LMP(S), the LAP(S) adds the parameter(s) of the response to the data of the disconnection response function of the LMP(S), emits the UA response to the physical layer, and finishes the disconnection process in the LAP layer. It however should be noted that there is normally no parameter to be added to the disconnection request function in the LAP(S).

[B] No Response is Sent

Figure 26:
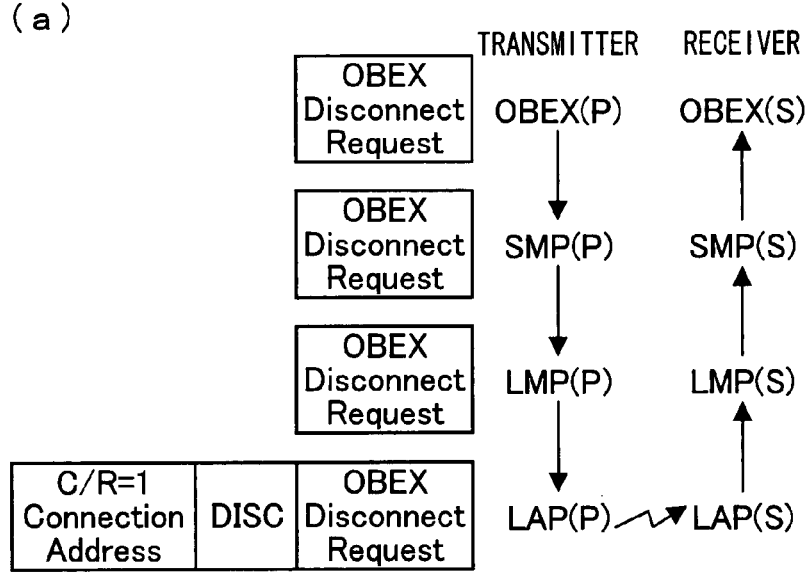
FIG. 26(a) is an illustration of changes of data in functions indicated by rightward arrows between the layers in FIGS. 25 and 27 for a disconnection sequence in accordance with an embodiment of the present invention.
FIG. 26(b) is an illustration of changes of data in functions between the layers in accordance with an embodiment of the present invention.
Figure 26:
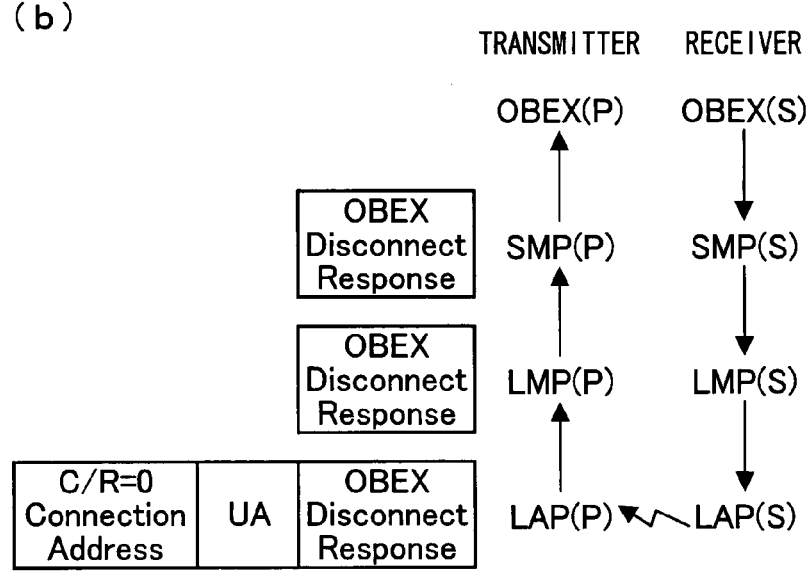

FIG. 27 is a sequence diagram showing a disconnection sequence according to the present embodiment (no response is sent). FIG. 26(*a*) is an illustration of the structure of communication data used in the disconnection sequence of the present embodiment (no response is sent).

As shown in FIG. 27, in the present embodiment (no response is sent), the disconnection command of the transmitter is propagated from upper to lower layers, and a DISC command is generated. In the transmitter, the disconnection operation is completed at this point. Meanwhile, the receiver receives the DISC command, and passes on the DISC command from lower to upper layers. When the DISC command is passed onto the OBEX layer, the disconnection sequence is completed.

The following will describe the sequence in the transmitter and the sequence in the receiver.

First, the communication layers in the transmitter will be described.

When a disconnection request is transmitted from the application to the OBEX(P), the OBEX(P) immediately emits a disconnection request function (Primitive), which contains a disconnection request command, to the lower layer (SMP(P)). Further, when a disconnection confirmation function is transmitted from SMP(P) to the OBEX(P), the OBEX (P) finishes the disconnecting operation.

The SMP(P) receives the disconnection request function from the OBEX(P), and immediately adds parameter(s) required for communication with the SMP(S) of the receiver to the data of the disconnection request function from the OBEX(P), and emits the disconnection request function to the lower layer (LMP(P)). When a disconnection confirmation function is transmitted from the LMP(P) to the SMP(P), the SMP(P) regards the disconnection as being completed with the transmitted parameter(s) and finishes the disconnection in the SMP layer. Further, the SMP(P) transmits the disconnection confirmation function to the OBEX(P). It however should be noted that there is normally no parameter to be added to the disconnection request function in the SMP(P).

The LMP(P) receives the disconnection request function from the SMP(P), and immediately adds parameter(s) required for communication with the LMP(S) of the receiver to the data of the disconnection request function from the SMP(P), and emits the disconnection request function to the lower layer (LAP(P)). When a disconnection confirmation function is transmitted from the LAP(P) to the LMP(P), the LMP(P) regards the disconnection as being completed with the transmitted parameter(s) and finishes the disconnection in the LMP layer. Further, the LMP(P) transmits the disconnection confirmation function to the SMP(P). It however should be noted that there is normally no parameter to be added to the disconnection request function in the LMP(P).

The LAP(P) receives the disconnection request function from the LMP(P) and immediately adds parameter(s) required for communication with the LAP(S) of the receiver to the data of the disconnection request function from the LMP(P), and emits the DISC command to the physical layer of the receiver. When a DISC command is outputted, the LAP(P) regards the disconnection as being completed with the transmitted parameter(s) and finishes the disconnection process in the LAP layer. Further, the LAP(P) transmits the disconnection confirmation function to the LMP(P). It however should be noted that there is normally no parameter to be added to the disconnection request function in the LAP(P).

Next, the communication layers in the receiver will be described.

When a disconnection notification function (Indication) is transmitted from the lower layer (SMP(S)), the OBEX(S) checks a command for OBEX disconnection which is contained in the data. When the command indicates that the disconnection has been properly done, the OBEX(S) finishes the disconnecting operation.

When the disconnection notification function is transmitted from the lower layer (SMP(S)), the SMP(S) extracts parameter(s) generated by the SMP(P) of the transmitter from the data of the function, and completes the disconnection with the parameter(s). Further, the SMP(S) removes the SMP(P) parameter(s) from the data of the disconnection notification function, incorporates the resulting data into a disconnection request function, and sends it to the OBEX(S). It however should be noted that there is normally no parameter to be added to the disconnect request function in the SMP(S).

When the disconnection notification function is transmitted from the lower layer (LAP(S)), the LMP(S) extracts parameter(s) generated by the LMP(P) of the transmitter from the data of the function, and finishes the disconnection with the parameter(s). Further, the LMP(S) removes the parameter(s) of LMP(P) from the data of the function, incorporating the data into a disconnection request function, and sends it the SMP(S). It however should be noted that there is normally no parameter to be added to the disconnection request function in the LMP(S).

When the DISC command is transmitted from the physical layer, the LAP(S) extracts parameter(s) generated by the LAP (P) of the transmitter from the data of the DISC command, and completes disconnection with the parameter(s). Further, the LAP(S) removes the parameter(s) of LAP(P) from the data of the DISC command, and incorporates the resulting data to the disconnection request function and then emits the function to the LMP(S). It however should be noted that there is normally no parameter to be added to the disconnection request function in the LAP(S).

(4) Selection as to Whether or not a Response is to be Sent

With reference to FIGS. 28 to 35, the following will describe a flow of data and parameter(s) between the communication layers in the transmitter and the receiver.

In the present embodiment, the communication layers LAP, LMP, SMP, OBEX in the transmitter and the receiver each have a connection request function, a connection notification function, a connection response function, and a connection confirmation function. These functions are used for access to the LAP layer from the upper layer (i.e., LMP layer).

For the functions, Data (hereinafter, referred to simply as data), Requested-QoS, or Returned-QoS may be specify as arguments. As mentioned earlier, the data is set up in each communication layer.

Meanwhile, QoS notifies the upper layer, including OBEX, of the negotiation parameter(s), such as the baud rate determined in the LAP, and a result of negotiation. Note that conventional IrDA schemes also use QoS.

For example, when the application or the OBEX(P) of the transmitter emits a QoS having a parameter indicating that a response is required or is not required, it is propagated through the lower layers and reaches the LAP(P). Then, the LAP(P) uses the value of the QoS as the value of the negotiation parameter(s) (Ack Less Connect), and transmits the parameter(s) to the receiver.

Consequently, the communication layers of the transmitter and those of the receiver are operated depending on whether or not the application or the OBEX(P) of the transmitter requires a response, thereby enabling connection both in a two-way manner and in a one-way manner.

FIGS. 28 to 32 are illustrations of a flow of data and parameter(s) between the communication layers in the connection sequence (FIG. 19) according to the present embodiment (response is sent). Note that the QoS parameter(s) between OBEX-SMP, between SMP-LMP, between LMP-LAP may be identical or different. They are identified by the added symbols –a, –b, and –c in the figures.

Figure 28:
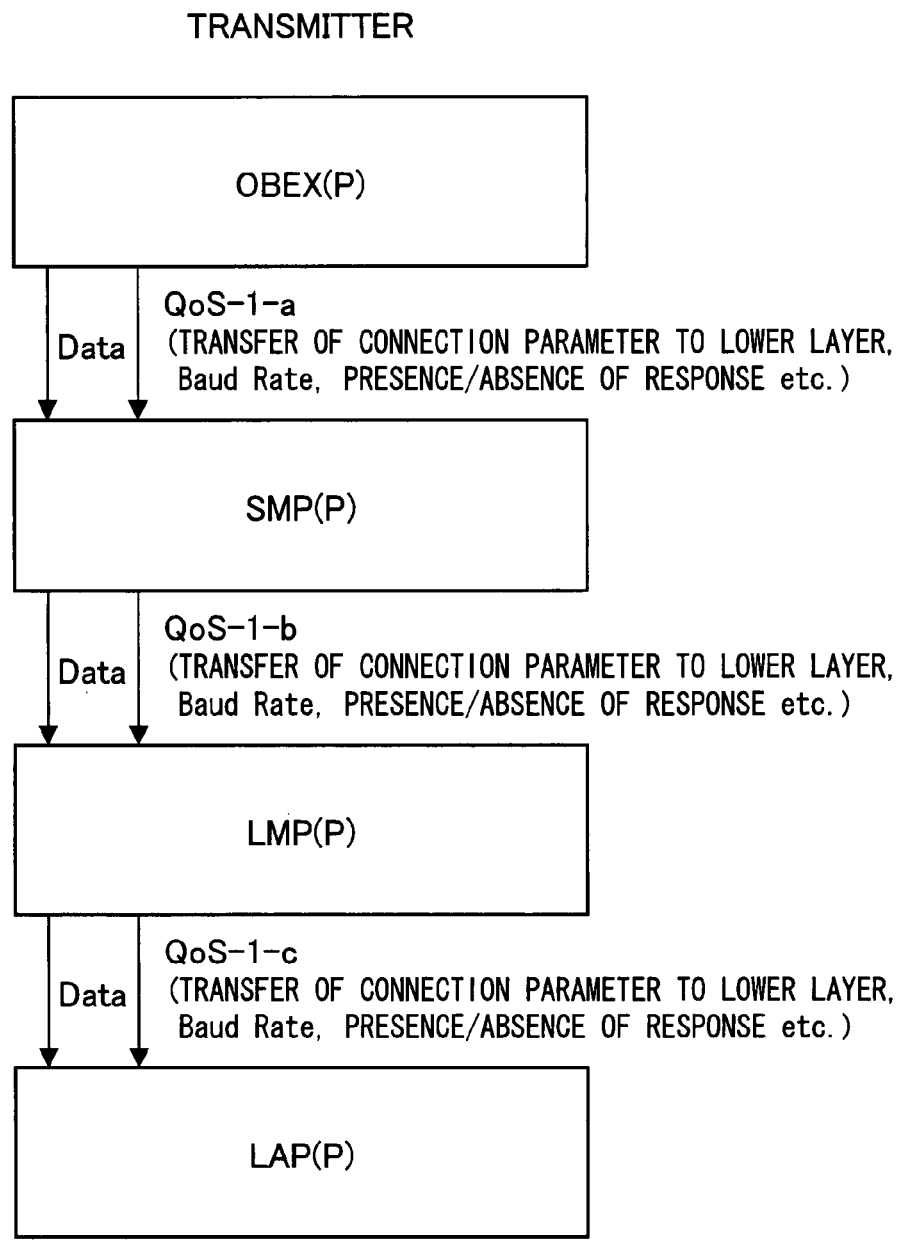
FIG. 28 is a schematic diagram for the data and connection parameters of a connection request function being passed between layers in a primary station in accordance with an embodiment of the present invention.

In the transmitter, as shown in FIG. 28, the data to be transmitted to the receiver and the data of QoS-1 (QoS requested by the transmitter) are propagated through upper to lower layers by con.req(data) (FIG. 19).

Figure 29:
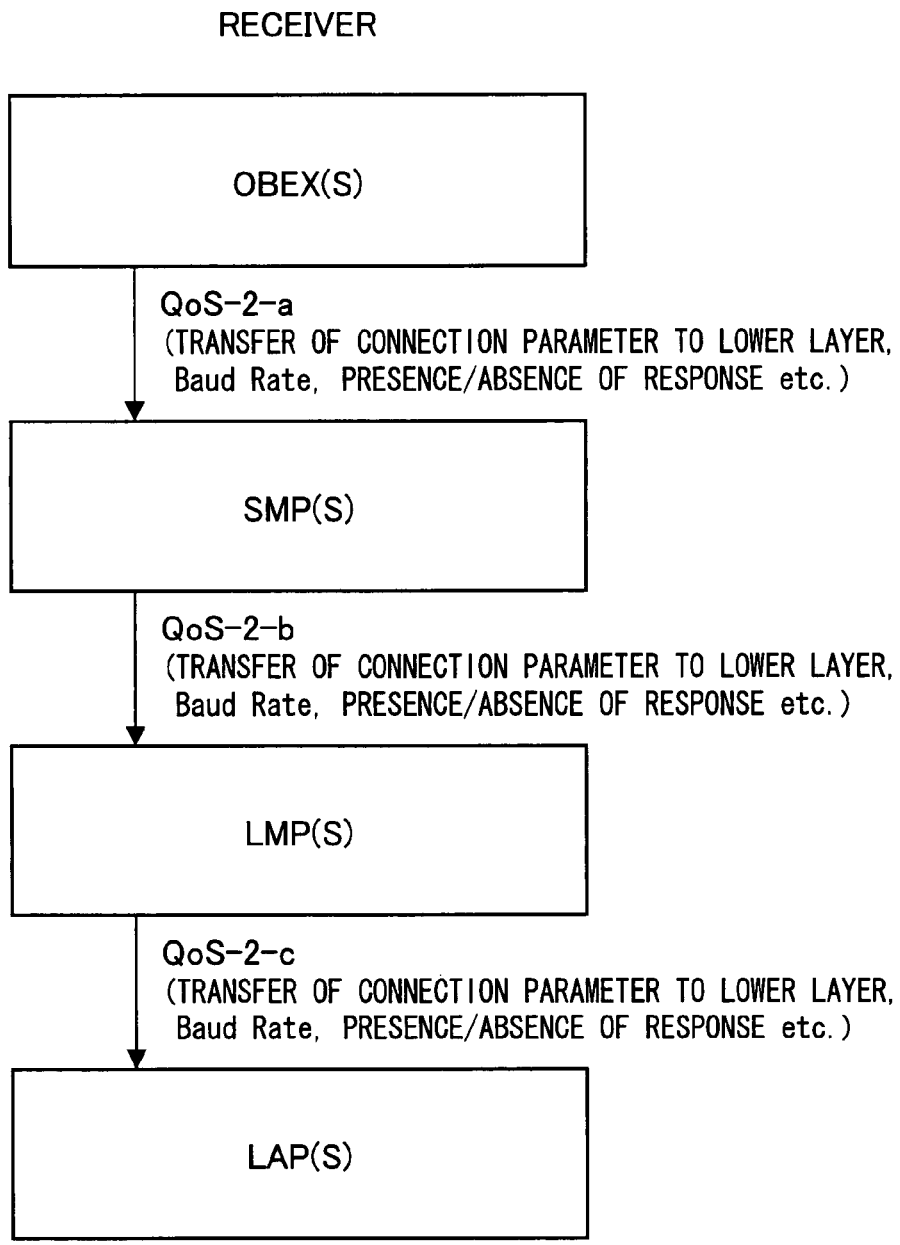
FIG. 29 is a schematic diagram for the connection parameters of a connection request function being passed between layers in a secondary station in accordance with an embodiment of the present invention.

Meanwhile, in the receiver, as shown in FIG. 29, only the data of QoS-2 (QoS requested by the receiver) is propagated through upper to lower layers by the con.req.

Figure 30:
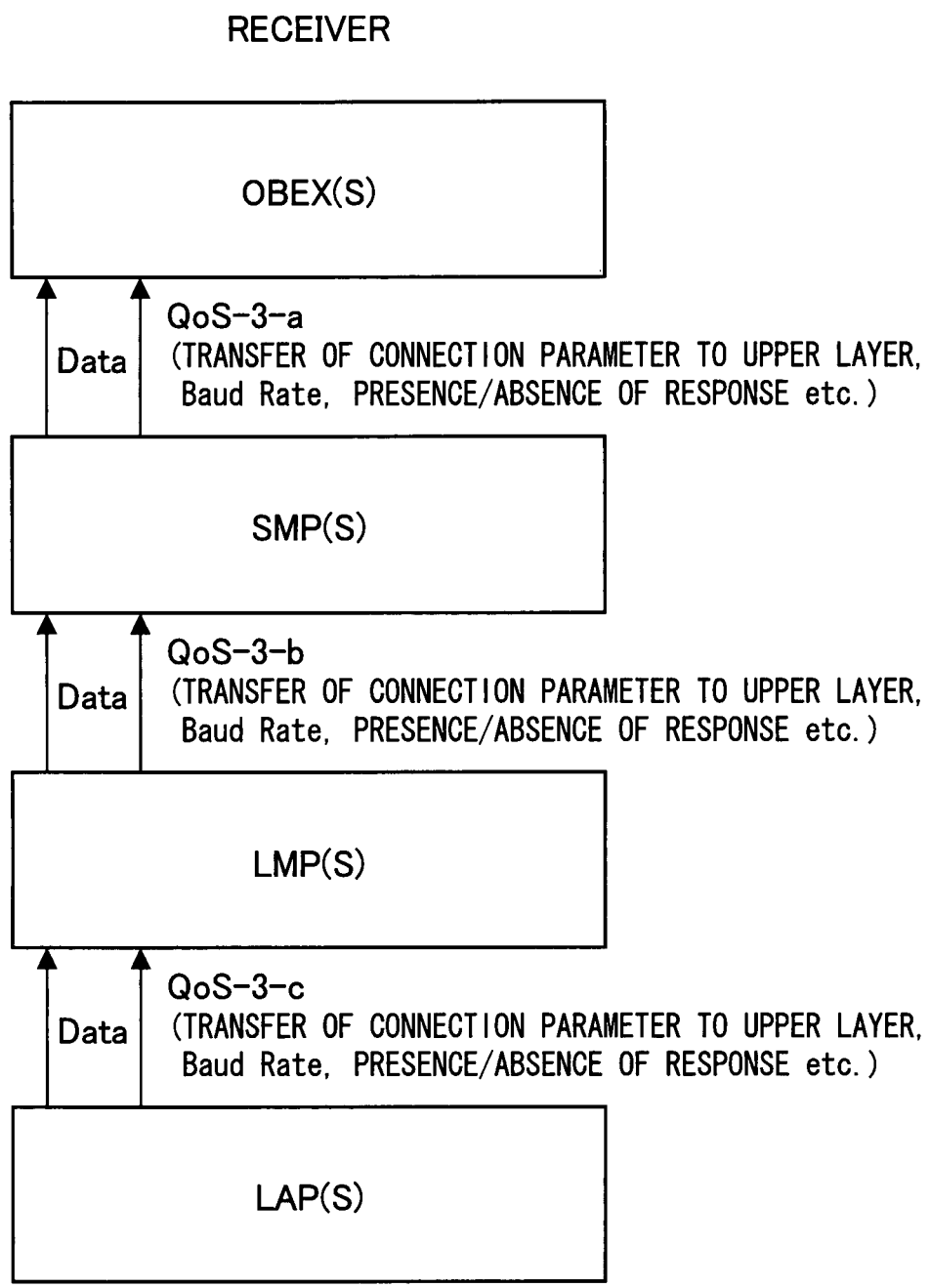
FIG. 30 is a schematic diagram for the data and connection parameters of a connection confirmation function being passed between layers in a primary station and the data and connection parameters of a connection notification function being passed between layers in a secondary station in accordance with an embodiment of the present invention.

Thereafter, in the receiver, the QoS-1 of the transmitter and the QoS-2 of the receiver are compared at the time of receiving the SNRM command in the LAP(S), thereby creating common negotiation parameter(s) QoS-3. Then, as shown in FIG. 30, the LAP(S) passes on the QoS-3 and the data from the transmitter to the upper layers by con.ind(data). The upper layers each store the QoS-3 and hold it as connection parameter(s) to establish a connection.

Figure 31:
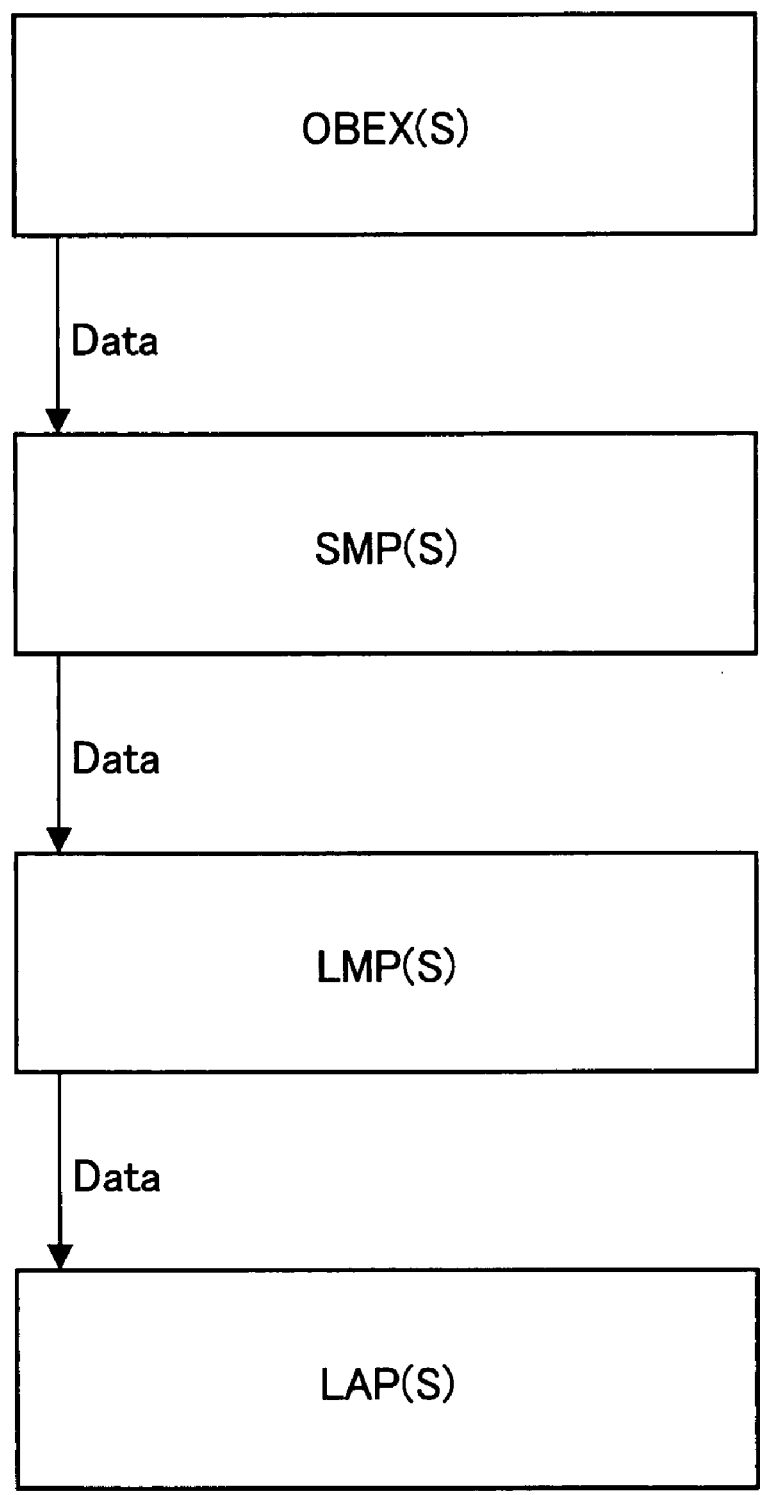
FIG. 31 is a schematic diagram for the data of a connection response function being passed between layers in a secondary station in accordance with an embodiment of the present invention.

In the receiver, QoS is not required in propagation of con-.resp(data). Therefore, as shown in FIG. 31, only data is propagated from upper to lower layers by the con.resp(data). Then, when the LAP(S) receives the con.resp(data), the QoS-3 is incorporated into the UA response, and the UA response is transmitted.

In the transmitter, the LAP(P) receives the UA response and stores the QoS-3 as negotiation parameter(s). Then, as shown in FIG. 32, the LAP(P) passes on the QoS-3 and the data from the receiver to the upper layers by con.conf(data). The communication layers each store the QoS-3 and hold it as connection parameter(s) to establish a connection.

In the present embodiment, as a QoS of con.req, for example, "Requested-QoS: Baud-Rate+Max-Turn-Around-Time+Disconnect-Threshold+DataSize+Ack less connection+Min-Packet-Interval" is used. Further, as a QoS of Con-.ind,con.conf, "Resultant-QoS: Baud-Rate+Disconnect-Threshold+DataSize+Ack less connection (indication primitive only)" is used.

The following will describe a flow of data and parameter(s) between the communication layers in the connection sequence (FIG. 21) according to the present embodiment (no response is sent).

In the transmitter, as shown in FIG. 28, the data to be transmitted to the receiver and the data of QoS-1 (QoS requested by the transmitter) are propagated through upper to lower layers by con.req(data) (FIG. 21).

Then, the LAP(P) of the transmitter stores the QoS-1 as QoS-3. Further, as shown in FIG. 32, the LAP(P) passes on the QoS-3 to the upper layers by con.conf. The communication layers each store the QoS-3 and hold it as connection parameter(s) for the established connection.

Meanwhile, in the receiver, only data of QoS-2 (QoS requested by the receiver) is propagated from upper to lower layers by the con.req, as shown in FIG. 29.

Thereafter, in the receiver, the QoS-1 of the transmitter is determined as QoS-3 at the time of receiving a SNRM command in the LAP(S). Note that when the combination of the parameter(s) of QoS-2 and the QoS-1 is not adequate, the SNRM command cannot be received.

Then, as shown in FIG. 30, the LAP(S) passes on the QoS-3 and the data from the transmitter, to the upper layers by con.ind(data). The upper layers each store the QoS-3 and hold it as connection parameter(s) to establish a connection.

In this manner, QoS-1 and QoS-2 are controlled by the application in the upper layer (application), thereby selecting whether or not a response is to be sent.

The selection as to whether or not a response is to be sent is carried out according to, e.g., a file type of the file to be transmitted, application, and a user selection.

Specifically, for example, consider a case where the selection is carried out according to a type of file. In the case of multimedia-related file, it is possible to select whether or not a response is to be sent. In the case of data that the user would like to confirm its reception such as a file of a telephone book, email, schedule, it is automatically selected that a response is to be sent. Further, consider a case where the selection is carried out according to application. In the case of a slide show, it is automatically selected that no response is to be sent, for example. Further, consider a case where the selection is carried out according to user selection. In this case, the user selects, from a displayed menu, whether or not a response is to be sent, for example.

Figure 33:
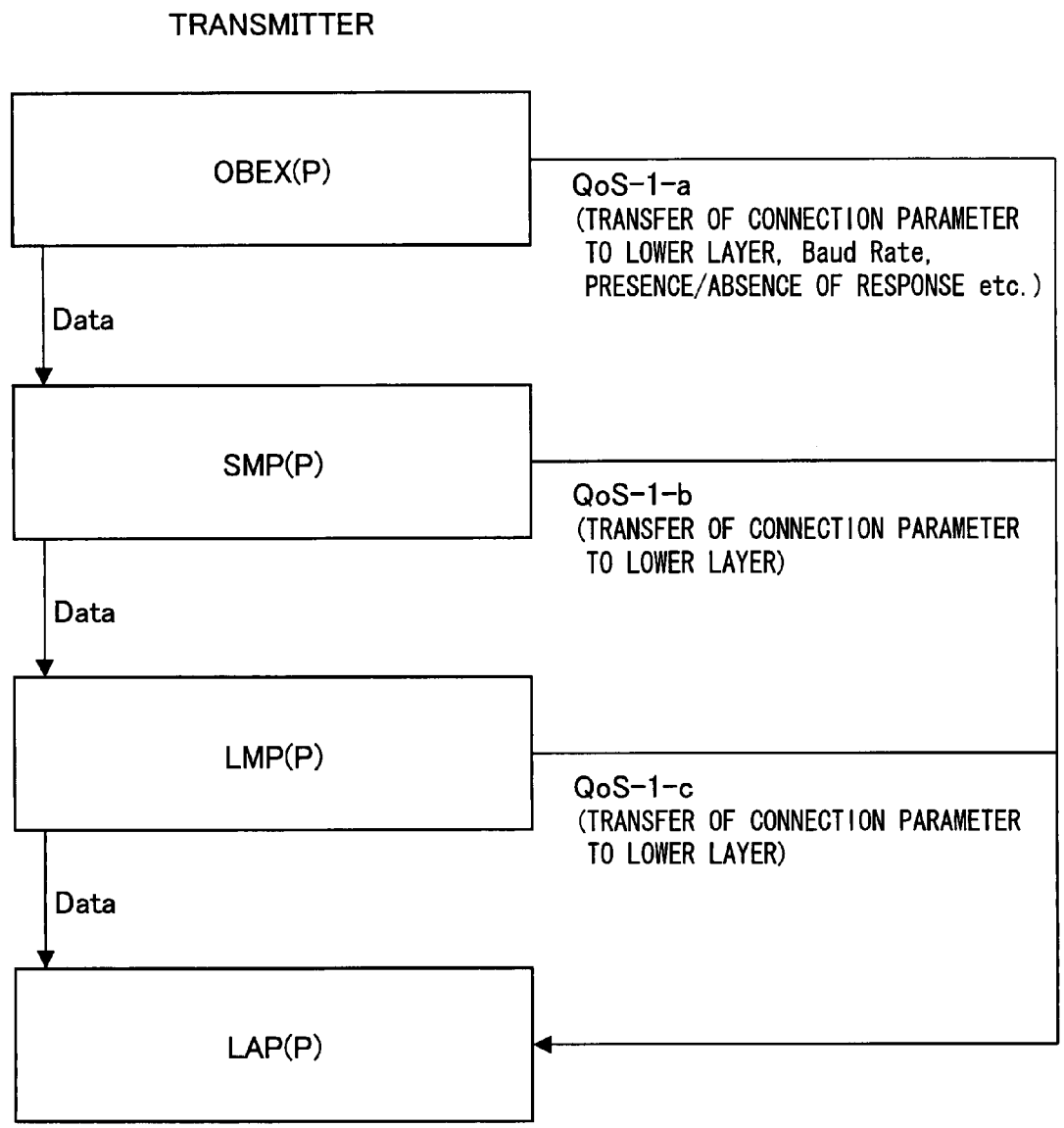
FIG. 33 is a variation of an embodiment, a schematic diagram for the data and connection parameters of a connection request function being passed between layers in a primary station in a case where the connection parameters are shared by the layers.
Figure 34:
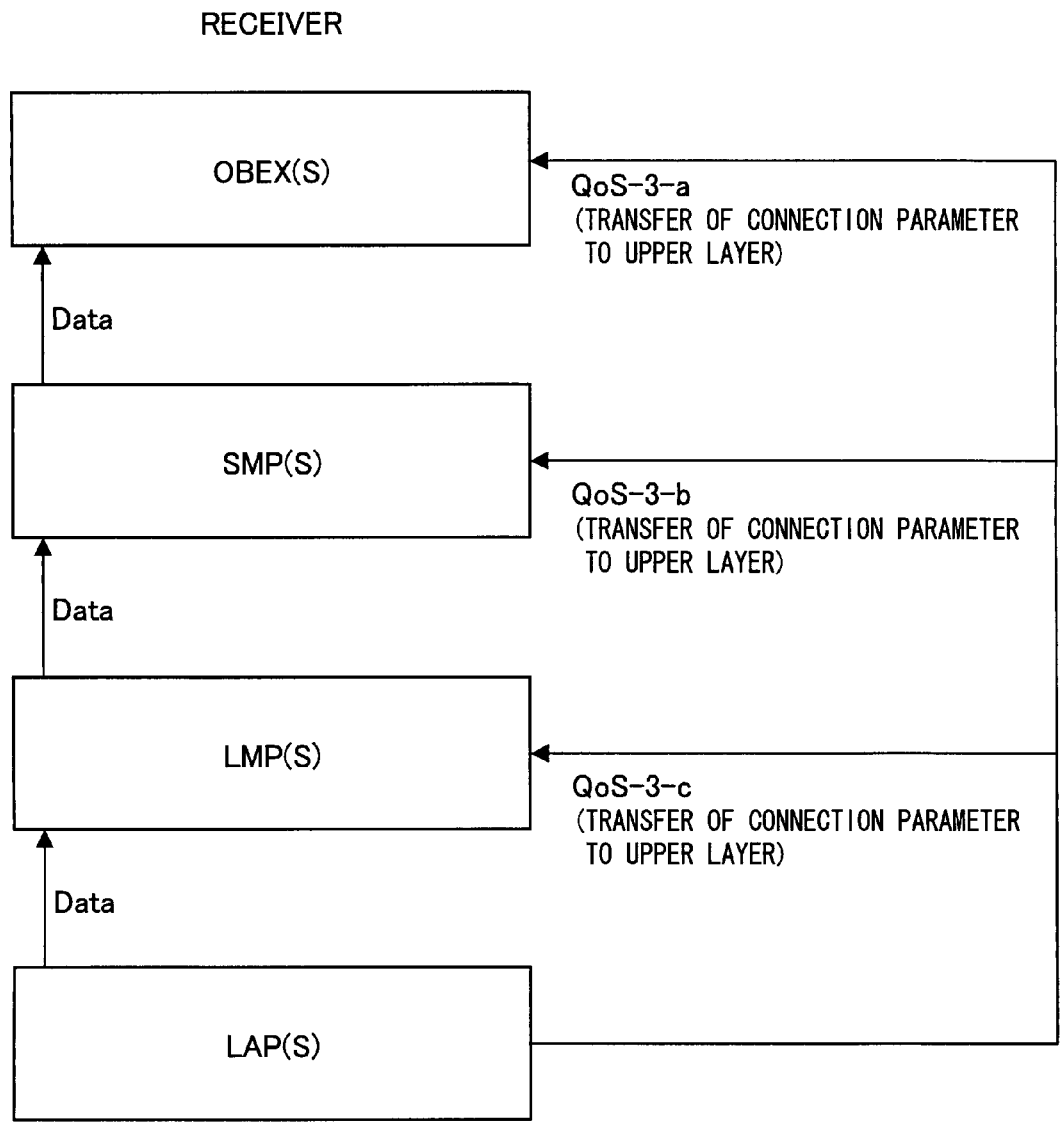
FIG. 34 is a variation of an embodiment, a schematic diagram for the data and connection parameters of a connection notification function being passed between layers in a secondary station in a case where the connection parameters are shared by the layers.
Figure 35:
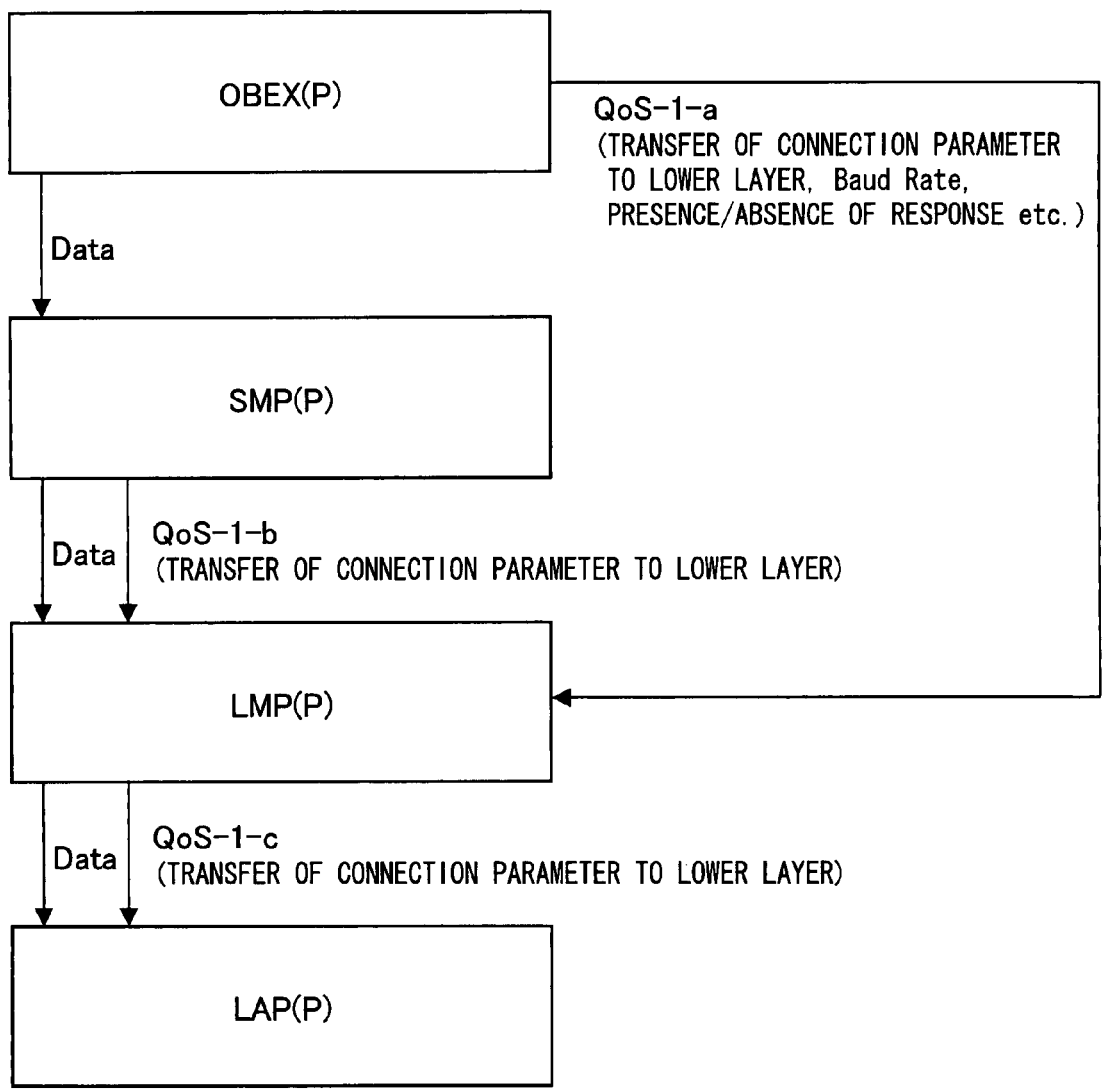
FIG. 35 is a variation of an embodiment, a schematic diagram for the data and connection parameters of a connection request function being passed between layers in a primary station in a case where the layers separately pass the connection parameters to the lower layers.

FIGS. 33 through 35 are illustrations showing alternative flows of data and parameter(s) between the communication layers in a connection sequence according to the present embodiment.

In the transmitter, when the first SNRM command includes information of all the communication layers (FIG. 19), the data and parameter(s) may be directly transmitted to the LAP layer from each communication layer, instead of relaying those from one communication layer to the other (FIG. 28). This direct transmission to the LAP layer is shown in FIG. 33.

On the other hand, as shown in FIG. 34, the receiver may be arranged so that all of the data and the parameter(s) contained in the SNRM command are extracted, and are transmitted directly from the LAP layer to the respective corresponding communication layers.

Further, as shown in FIG. 35, the transmitter may be arranged so that the data and parameter(s) for the OBEX(P), the SMP(P), and the LMP(P) are unified in the LMP(P), and the parameter(s) of the LAP(P) is added to the unified data and parameter(s) in the LAP(P), thereby generating a SNRM command.

The communication device of the present invention may be configured so that it includes a network layer protocol controller, wherein in order to establish a connection, the network layer protocol controller: issues a connection request command to a lower layer when the network layer protocol controller has received a connection request command from an upper layer; issues a connection confirmation command reception notification to the upper layer, without issuing a data transfer request command to the lower layer, when the network layer protocol controller has received a connection confirmation command reception notification from the lower layer; issues a connection request command to the lower layer and passes user data from the upper layer to the lower layer when the network layer protocol controller has received a connection request command from the upper layer; issues a connection confirmation command reception notification to the upper layer and passes user data in a connection confirmation command reception notification to the upper layer when the network layer protocol controller has received the connection confirmation command reception notification from the lower layer; issues a connection request command reception notification to the upper layer, without issuing a data transfer request command to the lower layer, when the network layer protocol controller has received a connection request command reception notification from the lower layer; issues a connection confirmation command to the lower layer when the network layer protocol controller has received a connection confirmation command from the upper layer; issues a connection confirmation command reception notification to the upper layer and passes user data in a connection confirmation command reception notification to the upper layer when the network layer protocol controller has received a connection request command reception notification from the lower layer; and issues a connection confirmation command to the lower layer and passes user data from the upper layer to the lower layer when the network layer protocol controller has received a connection confirmation command from the upper layer.

According to the sequence, the exchange of one pair of packets completes a connection process when establishing a connection, which improves communication efficiency.

Alternatively, the communication device of the present invention may be configured so that it includes a network layer protocol controller, wherein in order to establish a connection, the network layer protocol controller: if being notified of a one-way communication selection from an upper layer, completes a connection process by issuing a connection request command to a lower layer when the network layer protocol controller has received a connection request command from the upper layer; issues a connection request command to the lower layer and passes user data from the upper layer to the lower layer when the network layer protocol controller has received a connection request command from the upper layer; issues a connection request command reception notification to the upper layer if being notified of a one-way communication selection when the network layer protocol controller has received a connection request command reception notification from the lower layer; and issues a connection confirmation command reception notification to the upper layer and passes user data in a connection request command reception notification to the upper layer when the network layer protocol controller has received a connection request command reception notification from the lower layer.

According to the sequence, the transmission of one packet completes a connection process when establishing a connection also when one-way communication is selected, which improves communication efficiency.

Alternatively, the communication device of the present invention may be configured so that in order to disconnect one-way communication with another station, the network layer protocol controller: issues a disconnection request command, without issuing a data transfer request command to a lower layer, when the network layer protocol controller has received a disconnection request command from an upper layer; issues a disconnection request command to the lower layer and passes user data from the upper layer to the lower layer when the network layer protocol controller has received a disconnection request command from the upper layer; issues a disconnection request command reception notification to the upper layer when the network layer protocol controller has received a disconnection request command reception notification from the lower layer; and issues a disconnection confirmation command reception notification to the upper layer and passes user data in a disconnection confirmation command reception notification to the upper layer when the network layer protocol controller has received a disconnection request command reception notification from the lower layer.

With this configuration, the exchange of one pair of packets completes a disconnection process when disconnecting, which improves communication efficiency.

For example, according to the sequence, the time it takes to connect the LMP layers is included in the LAP layer connection time when establishing a connection. When compared to conventional IrDA, the connection time can be reduced by a few tens of microseconds to a few hundreds of microseconds, depending on the device. Further, when disconnecting, the time it takes to disconnect the LMP layers is similarly included in the LAP layer disconnection time. When compared to conventional IrDA, the disconnection time can be reduced by a few tens of microseconds to a few hundreds of microseconds, depending on the device.

Conventional IrDA schemes allows one-to-many two-way communication. In such one-to-many, two-way communication, connection between lower layers is managed through station control, and logical connection is managed by LSAP. Implementing this concept with an IP protocol as an example, confirming the presence of a device connected to a network drive using an IP address would be equivalent to station control, and logically recognizing a network drive would be equivalent to an LSAP process.

The network layer protocol of the present invention allows omission of exchange via station control, thereby improving communication efficiency, in a configuration for one-to-one two-way communication or one-to-one or one-to-many one-way communication (e.g., when, in the present embodiment, the primary station requires no reply from the secondary station).

The network layer protocol of the present invention does not allow one-to-many two-way communication, allowed in the conventional IrDA scheme, due to the execution of steps of the protocol. This is however no problem in use in everyday life (one-to-many communication is rare in conventional IrDA; one-to-one communication is performed in most cases), because the user can identify the device on the other end of communication for the following reasons. One-to-one two-way communication uses light as the communication medium. Because of this, the communication requires line-of-sight coverage for communication, the light shows a narrow angle of spread, and the communication distance is up to a few meters. Furthermore, one-way communication does not involve much of the concept of connection (see an image of remote controller); station control is omittable. "Two-way" communication here indicates that some packets being exchanged; it does not indicate that file or other objects are exchanged.

The network layer protocol of the present invention is suitable for application in the field of free-space optical communication, especially to communication systems and device based on an IrDA infrared communication scheme.

The blocks of the communication device 50 (FIG. 5), especially, the network layer protocol controller 512, may be configured by hardware (communication circuit) or provided by software as executed by a CPU as follows.

The communication device 50 includes a CPU (central processing unit) and memory devices (memory media). The CPU executes instructions in control programs realizing the functions. The memory devices may be a ROM (read only memory) which contains programs, a RAM (random access memory) to which the programs are loaded, or a memory containing the programs and various data. The objective of the present invention can also be achieved by mounting to the communication device 50 a computer-readable storage medium containing control program (communication program) code (executable program, intermediate code program, or source program) for the communication device 50, which is software realizing the aforementioned functions in order for the computer (or CPU, MPU) to retrieve and execute the program code contained in the storage medium.

The storage medium may be, for example, a tape, such as a magnetic tape or a cassette tape; a magnetic disk, such as a Floppy® disk or a hard disk, or an optical disc, such as CD-ROM/MO/MD/DVD/CD-R; a card, such as an IC card (memory card) or an optical card; or a semiconductor memory, such as a mask ROM/EPROM/EEPROM/flash ROM.

As described in the foregoing, the communication device in accordance with the present invention is characterized as follows. It is a communication device as a primary station for communication with a secondary station. The device includes a network layer, an upper layer which is an upper-level communication layer to the network layer, and a lower layer which is a lower-level communication layer to the network layer. The device includes a network layer protocol controller. In order to connect to the secondary station, in the network layer, the network layer protocol controller issues a connection request command to the lower layer when the network layer protocol controller has received a connection request command from the upper layer and issues a connection confirmation command reception notification to the upper layer, without issuing a data transfer request command to the lower layer, when the network layer protocol controller has received a connection confirmation command reception notification from the lower layer.

The communication method in accordance with the present invention is characterized as follows. It is a communication method implemented by a communication device as a primary station for communication with a secondary station. The device includes a network layer, an upper layer which is an upper-level communication layer to the network layer, and a lower layer which is a lower-level communication layer to the network layer. In order to connect to the secondary station, the method involves, in the network layer, the steps of: issuing a connection request command to the lower layer upon receiving a connection request command from the upper layer; and issuing a connection confirmation command reception notification to the upper layer, without issuing a data transfer request command to the lower layer, upon receiving a connection confirmation command reception notification from the lower layer.

Alternatively, the communication device in accordance with the present invention is characterized as follows. It is a communication device as a secondary station for communication with a primary station. The device includes a network layer, an upper layer which is an upper-level communication layer to the network layer, and a lower layer which is a lower-level communication layer to the network layer. The device includes a network layer protocol controller. In order to connect to the primary station, the network layer protocol controller issues a connection request command reception notification to the upper layer, without issuing a data transfer request command to the lower layer, when the network layer protocol controller has received a connection request command reception notification from the lower layer and issues a connection confirmation command to the lower layer when the network layer protocol controller has received a connection confirmation command from the upper layer.

Alternatively, the communication method in accordance with the present invention is characterized as follows. It is a communication method implemented by a communication device as a secondary station for communication with a primary station. The device includes a network layer, an upper layer which is an upper-level communication layer to the network layer, and a lower layer which is a lower-level communication layer to the network layer. In order to connect to the primary station, the method involves the steps of: issuing a connection request command reception notification to the upper layer, without issuing a data transfer request command to the lower layer, upon receiving a connection request command reception notification from the lower layer; and issuing a connection confirmation command to the lower layer upon receiving a connection confirmation command from the upper layer.

The communication system in accordance with the present invention is characterized in that it includes a communication device as the primary station and a communication device as the secondary station.

According to the configurations and methods, in the primary station, in order to connect to the secondary station, the network layer issues a connection request command to the lower layer when the network layer has received a connection request command from the upper layer and issues a connection confirmation command reception notification to the upper layer, without issuing a data transfer request command to the lower layer, when the network layer has received a connection confirmation command reception notification from the lower layer. Meanwhile, in the secondary station, in order to connect to the primary station, the network layer issues a connection request command reception notification to the upper layer, without issuing a data transfer request command to the lower layer, when the network layer has received a connection request command reception notification from the lower layer and issues a connection confirmation command to the lower layer when the network layer has received a connection confirmation command from the upper layer.

According to the connection sequence, no communication is needed to establish a connection between the network layers after the lower layers are connected. That simplifies the connection sequence, improving communication efficiency.

The communication device in accordance with the present invention is preferably such that in order to connect to the secondary station, when the network layer protocol controller has received a connection request command from the upper layer, the network layer protocol controller issues a connection request command to the lower layer and passes, to the lower layer, user data contained in the connection request command from the upper layer.

The communication device in accordance with the present invention is preferably such that in order to connect to the secondary station, when the network layer protocol controller has received a connection confirmation command reception notification from the lower layer, the network layer protocol controller issues a connection confirmation command reception notification to the upper layer and passes, to the upper layer, user data contained in the connection confirmation command reception notification received from the lower layer.

The communication device in accordance with the present invention is preferably such that in order to connect to the primary station, when the network layer protocol controller has received a connection request command reception notification from the lower layer, the network layer protocol controller issues a connection request command reception notification to the upper layer and passes, to the upper layer, user data contained in the connection request command reception notification received from the lower layer.

The communication device in accordance with the present invention is preferably such that in order to connect to the primary station, when the network layer protocol controller has received a connection confirmation command from the upper layer, the network layer protocol controller issues a connection confirmation command to the lower layer and passes, to the lower layer, user data contained in the connection confirmation command received from the upper layer.

Alternatively, the communication device in accordance with the present invention is characterized as follows. It is a communication device as a primary station for communication with a secondary station. The device includes a network layer, an upper layer which is an upper-level communication layer to the network layer, and a lower layer which is a lower-level communication layer to the network layer. The device includes a network layer protocol controller. In order to disconnect from the secondary station, in the network layer, the network layer protocol controller issues a disconnection request command, without issuing a data transfer request command to the lower layer, when the network layer protocol controller has received a disconnection request command from the upper layer and issues a disconnection confirmation command reception notification to the upper layer when the network layer protocol controller has received a disconnection confirmation command reception notification from the lower layer.

Alternatively, the communication method in accordance with the present invention is characterized as follows. It is a communication method implemented by a communication device as a primary station for communication with a secondary station. The device includes a network layer, an upper layer which is an upper-level communication layer to the network layer, and a lower layer which is a lower-level communication layer to the network layer. In order to disconnect from the secondary station, the method involves, in the network layer, the steps of: issuing a disconnection request command, without issuing a data transfer request command to the lower layer, upon receiving a disconnection request command from the upper layer; and issuing a disconnection confirmation command reception notification to the upper layer upon receiving a disconnection confirmation command reception notification from the lower layer.

Alternatively, the communication device in accordance with the present invention is characterized as follows. It is a communication device as a secondary station for communication with a primary station. The device includes a network layer, an upper layer which is an upper-level communication layer to the network layer, and a lower layer which is a lower-level communication layer to the network layer. The device includes a network layer protocol controller. In order to disconnect from the primary station, the network layer protocol controller issues a disconnection request command reception notification to the upper layer when the network layer protocol controller has received a disconnection request command reception notification from the lower layer and issues a disconnection confirmation command to the lower layer when the network layer protocol controller has received a disconnection confirmation command from the upper layer.

Alternatively, the communication method in accordance with the present invention is characterized as follows. It is a communication method implemented by a communication device as a secondary station for communication with a primary station. The device includes a network layer, an upper layer which is an upper-level communication layer to the network layer, and a lower layer which is a lower-level communication layer to the network layer. In order to disconnect from the primary station, the method involves the steps of: issuing a disconnection request command reception notification to the upper layer upon receiving a disconnection request command reception notification from the lower layer; and issuing a disconnection confirmation command to the lower layer upon receiving a disconnection confirmation command from the upper layer.

Alternatively, the communication system in accordance with the present invention is characterized in that it includes a communication device as the primary station and a communication device as the secondary station.

According to the configurations and methods, in the primary station, in order to disconnect from the secondary station, the network layer issues a disconnection request command, without issuing a data transfer request command to the lower layer, when the network layer has received a disconnection request command from the upper layer and issues a disconnection confirmation command reception notification to the upper layer when the network layer has received a disconnection confirmation command reception notification from the lower layer. Meanwhile, in the secondary station, in order to disconnect from the primary station, the network layer issues a disconnection request command reception notification to the upper layer when the network layer has received a disconnection request command reception notification from the lower layer and issues a disconnection confirmation command to the lower layer when the network layer has received a disconnection confirmation command from the upper layer.

According to the disconnection sequence, no communication is needed for a disconnection of the network layers before the lower layers are disconnected. That simplifies the disconnection sequence, improving communication efficiency.

The communication device in accordance with the present invention is preferably such that in order to disconnect from the secondary station, when the network layer protocol controller has received a disconnection request command from the upper layer, the network layer protocol controller issues a disconnection request command to the lower layer and passes, to the lower layer, user data contained in the disconnection request command received from the upper layer.

The communication device in accordance with the present invention is preferably such that in order to disconnect from the secondary station, when the network layer protocol controller has received a disconnection confirmation command reception notification from the lower layer, the network layer protocol controller issues a disconnection confirmation command reception notification to the upper layer and passes, to the upper layer, user data contained in the disconnection confirmation command reception notification received from the lower layer.

The communication device in accordance with the present invention is preferably such that in order to disconnect from the primary station, when the network layer protocol controller has received a disconnection request command reception notification from the lower layer, the network layer protocol controller issues a disconnection request command reception notification to the upper layer and passes, to the upper layer, user data contained in the disconnection request command reception notification received from the lower layer.

The communication device in accordance with the present invention is preferably such that in order to disconnect from the primary station, when the network layer protocol controller has received a disconnection confirmation command from the upper layer, the network layer protocol controller issues a disconnection confirmation command to the lower layer and passes, to the lower layer, user data contained in the disconnection confirmation command received from the upper layer.

Alternatively, the communication device in accordance with the present invention is characterized in that in order to connect to the secondary station, when the network layer protocol controller has received a one-way-communication connection request command from the upper layer, the network layer protocol controller issues a connection request command to the lower layer and thereafter issues a data transfer request command to the lower layer in response to a data transfer request command from the upper layer without waiting for a connection confirmation command from the lower layer.

Alternatively, the communication device in accordance with the present invention is characterized in that in order to connect to the primary station: when the network layer protocol controller has received, from the lower layer, a connection request command reception notification and a notification that the primary station is requesting a one-way transfer, the network layer protocol controller issues a connection request reception notification command to the upper layer; and subsequently when the network layer protocol controller has received a data reception notification from the lower layer without receiving a connection confirmation command from the upper layer, the network layer protocol controller issues a data reception notification to the upper layer.

According to the configuration, in the primary station, in order to connect to the secondary station, when the network layer protocol controller has received a one-way-communication connection request command from the upper layer, the network layer protocol controller issues a connection request command to the lower layer and thereafter issues a data transfer request command to the lower layer in response to a data transfer request command from the upper layer without waiting for a connection confirmation command from the lower layer. Meanwhile, in the secondary station, in order to connect to the primary station, when the network layer protocol controller has received, from the lower layer, a connection request command reception notification and a notification that the primary station is requesting a one-way transfer, the network layer protocol controller issues a connection request reception notification command to the upper layer; and subsequently when the network layer protocol controller has received a data reception notification from the lower layer without receiving a connection confirmation command from the upper layer, the network layer protocol controller issues a data reception notification to the upper layer.

Thus, according to the connection sequence, a connection is established without the secondary station sending a response to the primary station. That makes it possible to establish a connection and transfer data by one-way communication.

The communication device in accordance with the present invention is preferably such that in order to connect to the secondary station, when the network layer protocol controller has received a connection request command from the upper layer, the network layer protocol controller issues a connection request command to the lower layer and passes, to the lower layer, user data contained in the connection request command from the upper layer.

The communication device in accordance with the present invention is preferably such that in order to connect to the primary station, when the network layer protocol controller has received a connection request command reception notification from the lower layer, the network layer protocol controller issues a connection request command reception notification to the upper layer and passes, to the upper layer, user data contained in the connection request command reception notification received from the lower layer.

Alternatively, the communication device in accordance with the present invention is characterized in that in order to disconnect one-way communication with the secondary station, when the network layer protocol controller has received a disconnection request command from the upper layer, the network layer protocol controller issues a disconnection request command without issuing a data transfer request command to the lower layer, thereby completing disconnection from the secondary station without receiving a disconnection confirmation command reception notification from the lower layer.

Alternatively, the communication device in accordance with the present invention is characterized in that in order to disconnect one-way communication with the primary station, when the network layer protocol controller has received a disconnection request command reception notification from the lower layer, the network layer protocol controller issues a disconnection request command reception notification to the upper layer, thereby completing disconnection from the primary station without receiving a disconnection confirmation command from the upper layer.

According to the configuration, in the primary station, in order to disconnect one-way communication with the secondary station, when the network layer protocol controller has received a disconnection request command from the upper layer, the network layer protocol controller issues a disconnection request command without issuing a data transfer request command to the lower layer, thereby completing disconnection from the secondary station without receiving a disconnection confirmation command reception notification from the lower layer. Meanwhile, in the secondary station, in order to disconnect one-way communication with the primary station, when the network layer protocol controller has received a disconnection request command reception notification from the lower layer, the network layer protocol controller issues a disconnection request command reception notification to the upper layer, thereby completing disconnection from the primary station without receiving a disconnection confirmation command from the upper layer.

Thus, according to the disconnection sequence, a connection is disconnected without the secondary station sending a response to the primary station. That makes it possible to disconnect by one-way communication.

The communication device in accordance with the present invention is preferably such that in order to disconnect one-way communication with the secondary station, when the network layer protocol controller has received a disconnection request command from the upper layer, the network layer protocol controller issues a disconnection request command and passes, to the lower layer, user data contained in the disconnection request command received from the upper layer.

The communication device in accordance with the present invention is preferably such that in order to disconnect one-way communication with the primary station, when the network layer protocol controller has received a disconnection request command reception notification from the lower layer, the network layer protocol controller issues a disconnection request command reception notification to the upper layer and passes, to the upper layer, user data contained in the disconnection request command reception notification received from the lower layer.

Alternatively, the communication device in accordance with the present invention is characterized in that the network layer protocol controller complies with an IrLMP (Infrared Link Management Protocol).

The communication device may be realized on a computer. When that is the case, the present invention encompasses a communication program executed on a computer to realize the communication device by manipulating the computer as the network layer protocol controller. The invention also encompasses a computer-readable storage medium containing the program.

The communication device may be realized by a communication circuit which functions as the network layer protocol controller.

The communication device is suitable for application in mobile phones which incorporates the communication device for communication.

The communication device is suitable for application in display devices which produce displays from the data received by the communication device.

The communication device is suitable for application in printing devices which print from the data received by the communication device.

The communication device is suitable for application in recording devices which record the data received by the communication device.

Finally, the communication device of the present invention may be configured as follows.
1. Primary Station: LM_CONNECT.request→LAP_CONNECT.request, LAP_CONNECT.confirm→LM_CONNECT.confirm The communication device [1] of the present invention may be configured as follows. The device has a network layer protocol controller in it. It utilizes an LED or LD as a light source and is used in free-space optical transmission. In order to connect to another device, the network layer protocol controller issues a connection request command to a lower layer when the network layer protocol controller has received a connection request command from an upper layer and issues a connection confirmation command reception notification to the upper layer, without issuing a data transfer request command to the lower layer, when the network layer protocol controller has received a connection confirmation command reception notification from the lower layer.

2. Secondary Station: LAP_CONNCT.indication→LM_CONNECT.indication, LM_CONNECT.response→LAP_CONNECT.response The communication device [2] of the present invention may be configured as follows. The device has a network layer protocol controller in it. It utilizes an LED or LD as a light source and is used in free-space optical transmission. In order to connect to another device, the network layer protocol controller issues a connection request command reception notification to an upper layer, without issuing a data transfer request command to a lower layer, when the network layer protocol controller has received a connection request command reception notification from the lower layer and issues a connection confirmation command to the lower layer when the network layer protocol controller has received a connection confirmation command from the upper layer.

3. Carry, on LAP_CONNECT.request, Upper Layer Data in LM_CONNECT.request Issued by Primary Station The communication device [3] of the present invention, based on the communication device [1], may be configured as follows. In order to connect to another device, when the network layer protocol controller has received a connection request command from the upper layer, the network layer protocol controller issues a connection request command to the lower layer and passes user data from the upper layer to the lower layer.

4. Carry, on LM_CONNECT.confirm, Upper Layer Data of LAP_CONNECT.confirm Issued by Primary Station The communication device [4] of the present invention, based on the communication device [1], may be configured as follows. In order to connect to another device, when the network layer protocol controller has received a connection confirmation command reception notification from the lower layer, the network layer protocol controller issues a connection confirmation command reception notification to the upper layer and passes user data in the connection confirmation command reception notification to the upper layer.

5. Carry, on LM_CONNECT.indication, Upper Layer Data in LAP_CONNECT.indication Issued by Secondary Station The communication device [5] of the present invention, based on the communication device [2], may be configured as follows. In order to connect to another device, when the network layer protocol controller has received a connection request command reception notification from the lower layer, the network layer protocol controller issues a connection request command reception notification to the upper layer and passes user data in the connection request command reception notification to the upper layer.

6. Carry, on LAP_CONNECT.response, Upper Layer Data in LAP_CONNECT.response Issued by Secondary Station The communication device [6] of the present invention, based on the communication device [2], may be configured as follows. In order to connect to another device, when the network layer protocol controller has received a connection confirmation command from the upper layer, the network layer protocol controller issues a connection confirmation command to the lower layer and passes user data from the upper layer to the lower layer.

7. LM_DISCONNECT.request of Primary Station→LAP_DISCONNECT.request, LAP_DISCONNECT.indication of Primary Station→LM_DISCONNECT.indication of Primary Station The communication device [7] of the present invention may be configured as follows. The device has a network layer protocol controller in it. It utilizes an LED or LD as a light source and is used in free-space optical transmission. In order to disconnect from another device, the network layer protocol controller issues a disconnection request command, without issuing a data transfer request command to a lower layer, when the network layer protocol controller has received a disconnection request command from an upper layer and issues a disconnection confirmation command reception notification to the upper layer when the network layer protocol controller has received a disconnection confirmation command reception notification from the lower layer.

8. LAP_DISCONNECT.indication of Secondary Station→LM_DISCONNECT.indication, LM_DISCONNECT.request→LAP_DISCONNECT.request The communication device [8] of the present invention may be configured as follows. The device has a network layer protocol controller in it. It utilizes an LED or LD as a light source and is used in free-space optical transmission. In order to disconnect from another device, the network layer protocol controller issues a disconnection request command reception notification to an upper layer when the network layer protocol controller has received a disconnection request command reception notification from a lower layer and issues a disconnection confirmation command to the lower layer when network layer protocol controller has received a disconnection confirmation command from the upper layer.

9. Carry, on LAP_DISCONNECT.request, Upper Layer Data in LM_DISCONNECT.request Issued by Primary Station The communication device [9] of the present invention, based on the communication device [7], may be configured as follows. In order to disconnect from another device, when the network layer protocol controller has received a disconnection request command from the upper layer, the network layer protocol controller issues a disconnection request command to the lower layer and passes user data from the upper layer to the lower layer.

10. Carry, on LM_DISCONNECT.indication, Upper Layer Data in LAP_DISCONNECT.indication issued by Primary Station The communication device [10] of the present invention, based on the communication device [7], may be configured as follows. In order to disconnect from another device, when the network layer protocol controller has received a disconnection confirmation command reception notification from the lower layer, the network layer protocol controller issues a disconnection confirmation command reception notification to the upper layer and passes user data in the disconnection confirmation command reception notification to the upper layer.

11. Carry, on LM_DISCONNECT.indication, Upper Layer Data in LAP_DISCONNECT.indication Issued by Secondary Station The communication device [11] of the present invention, based on the communication device [8], may be configured as follows. In order to disconnect from another device, when the network layer protocol controller has received a disconnection request command reception notification from the lower layer, the network layer protocol controller issues a disconnection confirmation command reception notification to the upper layer and passes the user data contained in the disconnection confirmation command reception notification received from the lower layer on to the upper layer.

12. Carry, on LAP_DISCONNECT.request, Upper Layer Data in LM_DISCONNECT.request Issued by Secondary Station The communication device [12] of the present invention, based on the communication device [8], may be configured as follows. In order to disconnect from another device, when from the network layer protocol controller has received a disconnection confirmation command from the upper layer, the network layer protocol controller issues a disconnection confirmation command to the lower layer and passes user data from the upper layer to the lower layer.

13. When Primary Station is to Perform One-way Transfer, LM_DATA.request→LAP_DATA.request, with no LAP_CONNECT.confirm The communication device [13] of the present invention, based on the communication device [1], may be configured as follows. In order to connect to another device, when the network layer protocol controller has received a one-way-communication connection request command from the upper layer, the network layer protocol controller issues a connection request command to the lower layer and subsequently issues a data transfer request command to the lower layer in response to a data transfer request command from the upper layer without waiting for a connection confirmation command from the lower layer.

14. Carry, on LAP_CONNECT.request, Upper Layer Data in LM_CONNECt.request for Primary Station to Perform One-way Transfer The communication device [14] of the present invention, based on the communication device [13], may be configured as follows. In order to connect to another device, when the network layer protocol controller has received a connection request command from the upper layer, the network layer protocol controller issues a connection request command to the lower layer and passes user data from the upper layer to the lower layer.

15. When Secondary Station is to Perform One-way Transfer, LAP_DATA.indication→LM_DATA.indication, with no LM_CONNECT.response The communication device [15] of the present invention, based on the communication device [2], may be configured as follows. In order to connect to another device, when the network layer protocol controller has received, from the lower layer, a notification that the other station is requesting a one-way transfer in coincidence with when the network layer protocol controller has received a connection request command reception notification from the lower layer, the network layer protocol controller issues a connection request reception notification command to the upper layer. Subsequently, when the network layer protocol controller has received a data reception notification from the lower layer without receiving a connection confirmation command from the upper layer, the network layer protocol controller issues a data reception notification to the upper layer.

16. Carry, on LM_CONNECT.indication, Upper Layer Data in LAP_CONNECT.indication for Secondary Station to Perform One-way Transfer The communication device [16] of the present invention, based on the communication device [15]), may be configured as follows. In order to connect to the other device, when the network layer protocol controller has received a connection request command reception notification from the lower layer, the network layer protocol controller issues a connection request command reception notification to the upper layer and passes user data in the connection request command reception notification to the upper layer.

17. Disconnect Primary Station in One-way Transfer

The communication device [17] of the present invention, based on the communication device [7], may be configured as follows. In order to disconnect one-way communication with another device, when the network layer protocol controller has received a disconnection request command from the upper layer, the network layer protocol controller issues a disconnection request command without issuing a data transfer request command to the lower layer and completes a disconnection process without receiving a disconnection confirmation command reception notification from the lower layer.

18. Disconnect Secondary Station in One-way Transfer

The communication device [18] of the present invention, based on the communication device [8], may be configured as follows. In order to disconnect one-way communication with another device, when the network layer protocol controller has received a disconnection request command reception notification from the lower layer, the network layer protocol controller issues a disconnection request command reception notification to the upper layer and completes a disconnection process without receiving a disconnection confirmation command from the upper layer.

19. Primary Station in One-way Transfer: Carry, on LAP_DISCONNECT.request, Upper Layer Data in LM_DISCONNCT.request The communication device [19] of the present invention, based on the communication device [17], may be configured as follows. In order to disconnect from another device, when the network layer protocol controller has received a disconnection request command from the upper layer, the network layer protocol controller issues a disconnection request command to the lower layer and passes user data from the upper layer to the lower layer.

20. Secondary Station in One-way Transfer: Carry, on LM_DISCONNECT.indication, Upper Layer Data in LAP_DISCONNECT.indication The communication device [20] of the present invention, based on the communication device [18], may be configured as follows. In order to disconnect from another device, when the network layer protocol controller has received a disconnection request command reception notification from the lower layer, the network layer protocol controller issues a disconnection confirmation command reception notification to the upper layer and passes user data in the disconnection confirmation command reception notification to the upper layer.

21. IrLMP

The communication device [21] of the present invention, based on any one of the communication devices [1 to 20], is such that, especially, the network layer protocol is an IrLMP (Infrared Link Management Protocol).

22. Communication System

The communication system of the present invention utilizes any one of the communication devices [1 to 21].

23. Communication Circuit

The communication circuit of the present invention realizes any one of the communication devices [1 to 21].

24. Transmission/reception Program

The communication system of the present invention realizes any one of the communication devices [1 to 21].

25. Mobile Phone

The mobile phone of the present invention incorporates any one of the communication devices [1 to 21].

26. Display Device

The display device of the present invention incorporates any one of the communication devices [1 to 21].

27. Printing Device

The printing device of the present invention incorporates any one of the communication devices [1 to 21].

28. Recording Device

The recording device of the present invention incorporates any one of the communication devices [1 to 21].

The embodiments and examples described in Best Mode for Carrying Out the Invention are for illustrative purposes only and by no means limit the scope of the present invention. Variations are not to be regarded as a departure from the spirit and scope of the invention, and all such modifications as would be obvious to one skilled in the art are intended to be included within the scope of the claims below.

INDUSTRIAL APPLICABILITY

The present invention is capable of reducing time required for a connection and disconnection. The invention is applicable to a wide range of communication devices and especially suitable for use in communication devices with free-space optical communication functionality.

The invention claimed is:

1. A communication device as a primary station for communication with a secondary station,
the communication device comprising a network layer, an upper layer which is an upper-level communication layer to the network layer, and a lower layer which is a lower-level communication layer to the network layer,
the communication device comprising a network layer protocol controller, wherein in order to connect to the secondary station, in the network layer, the network layer protocol controller issues a connection request command to the lower layer when the network layer protocol controller has received a connection request command from the upper layer and issues a connection confirmation command reception notification to the upper layer, without issuing a data transfer request command to the lower layer, when the network layer protocol controller has received a connection confirmation command reception notification from the lower layer,
when the network layer protocol controller has received a one-way-communication request command from the upper layer, the network layer protocol controller issues a connection request command to the lower layer and thereafter issues a data transfer request command to the lower layer in response to a data transfer request command from the upper layer without waiting for a connection confirmation command from the lower layer.

2. A communication device as a secondary station for communication with a primary station,
the communication device comprising a network layer, an upper layer which is an upper-level communication layer to the network layer, and a lower layer which is a lower-level communication layer to the network layer,
the communication device comprising a network layer protocol controller, wherein in order to connect to the primary station the network layer protocol controller issues a connection request command reception notification to the upper layer, without issuing a data transfer request command to the lower layer, when the network layer protocol controller has received a connection request command reception notification from the lower layer and issues a connection confirmation command to the lower layer when the network layer protocol controller has received a connection confirmation command from the upper layer;
when the network layer protocol controller has received, from the lower layer, a connection request command reception notification and a notification that the primary station is requesting a one-way transfer, the network layer protocol controller issues a connection request reception notification command to the upper layer; and
subsequently when the network layer protocol controller has received a data reception notification from the lower layer without receiving a connection confirmation command from the upper layer, the network layer protocol controller issues a data reception notification to the upper layer.

3. A communication device as a primary station for communication with a secondary station,
the communication device comprising a network layer, an upper layer which is an upper-level communication layer to the network layer, and a lower layer which is a lower-level communication layer to the network layer,
the communication device comprising a network layer protocol controller, wherein in order to disconnect from the secondary station, in the network layer, the network layer protocol controller issues a disconnection request command, without issuing a data transfer request command to the lower layer, when the network layer protocol controller has received a disconnection request command from the upper layer and issues a disconnection confirmation command reception notification to the upper layer when the network layer protocol controller has received a disconnection confirmation command reception notification from the lower layer,
wherein in order to disconnect one-way communication with the secondary station, when the network layer protocol controller has received a disconnection request command from the upper layer, the network layer protocol controller issues a disconnection request command without issuing a data transfer request command to the lower layer, thereby disconnecting from the secondary station without receiving a disconnection confirmation command reception notification from the lower layer.

4. A communication device as a secondary station for communication with a primary station,
the communication device comprising a network layer, an upper layer which is an upper-level communication layer to the network layer, and a lower layer which is a lower-level communication layer to the network layer,
the communication device comprising a network layer protocol controller, wherein in order to disconnect from the primary station, the network layer protocol controller issues a disconnection request command reception notification to the upper layer when the network layer protocol controller has received a disconnection request command reception notification from the lower layer and issues a disconnection confirmation command to the lower layer when the network layer protocol controller has received a disconnection confirmation command from the layer,
wherein in order to disconnect one-way communication with the primary station, when the network layer protocol controller has received a disconnection request command reception notification from the lower layer, the network layer protocol controller issues a disconnection request command reception notification to the upper layer, thereby disconnecting from the primary station without receiving a disconnection confirmation command from the upper layer.

5. The communication device of claim 1, wherein in order to connect to the secondary station, when the network layer protocol controller has received a connection request command from the upper layer, the network layer protocol controller issues a connection request command to the lower layer and passes, to the lower layer, user data contained in the connection request command from the upper layer.

6. The communication device of claim 2, wherein in order to connect to the primary station, when the network layer protocol controller has received a connection request command reception notification from the lower layer, the network layer protocol controller issues a connection request command reception notification to the upper layer and passes, to the upper layer, user data contained in the connection request command reception notification received from the lower layer.

7. The communication device of claim 3, wherein in order to disconnect one-way communication with the secondary station, when the network layer protocol controller has received a disconnection request command from the upper layer, the network layer protocol controller issues a disconnection request command and passes, to the lower layer, user data contained in the disconnection request command received from the upper layer.

8. The communication device of claim 4, wherein in order to disconnect one-way communication with the primary station, when the network layer protocol controller has received a disconnection request command reception notification from the lower layer, the network layer protocol controller issues a disconnection request command reception notification to the upper layer and passes, to the upper layer, user data contained in the disconnection request command reception notification received from the lower layer.

9. A communication device as a primary station for communication with a secondary station,
the communication device comprising a network layer, an upper layer which is an upper-level communication layer to the network layer, and a lower layer which is a lower-level communication layer to the network layer,
the communication device comprising a network layer protocol controller, wherein in order to connect to the secondary station, in the network layer, when the network layer protocol controller has received a one-way communication connection request command directly from the upper layer, the network layer protocol controller issues a connection request command directly to the lower layer and issues a connection confirmation command directly to the upper layer without receiving a connection confirmation command reception notification from the lower layer.

10. The communication device of claim 9, wherein in order to connect to the secondary station, in the network layer, when the network layer protocol controller has received a connection request command from the upper layer, the network layer protocol controller issues a connection request command to the lower layer and regards a connection as having been established without a connection confirmation command to the upper layer.

11. A communication device as a secondary station for communication with a primary station,
the communication device comprising a network layer, an upper layer which is an upper-level communication layer to the network layer, and a lower layer which is a lower-level communication layer to the network layer,
the communication device comprising a network layer protocol controller, wherein in order to connect to the primary station, when the network layer protocol controller has received, directly from the lower layer, a connection request command reception notification and a notification that the primary station is requesting a one-way transfer, the network layer protocol controller issues a connection request command reception notification directly to the upper layer without issuing a data transfer request command to the lower layer.

12. The communication device of claim 1, wherein the network layer protocol controller complies with an IrLMP (Infrared Link Management Protocol).

13. A communication method implemented by a communication device as a primary station for communication with a secondary station,
the communication device including a network layer, an upper layer which is an upper-level communication layer to the network layer, and a lower layer which is a lower-level communication layer to the network layer,
in order to connect to the secondary station, the communication method comprising, in the network layer, the steps of, upon receiving a one-way-communication connection request command directly from the upper layer, issuing a connection request command directly to the lower layer and issuing a connection confirmation command directly to the upper layer without receiving a connection confirmation command reception notification from the lower layer.

14. A communication method implemented by a communication device as a primary station for communication with a secondary station,
the communication device including a network layer, an upper layer which is an upper-level communication layer to the network layer, and a lower layer which is a lower-level communication layer to the network layer,
in order to connect to the secondary station, the communication method comprising, in the network layer, the steps of, upon receiving a one-way-communication connection request command directly from the upper layer, issuing a connection request command directly to the lower layer and regarding a connection as having been established without issuing a connection confirmation command to the upper layer.

15. A communication system, comprising the communication device of claim 9 and the communication device of the secondary station comprising a network layer, an upper layer which is an upper-level communication layer to the network layer, and a lower layer which is a lower-level communication layer to the network layer,
the communication device of the secondary station comprising a network layer protocol controller, wherein in order to connect to the primary station, when the network layer protocol controller has received, directly from the lower layer, a connection request command reception notification and a notification that the primary station is requesting a one-way transfer, the network layer protocol controller issues a connection request command reception notification directly to the upper layer without issuing a data transfer request command to the lower layer.

16. A non-transitory computer-readable storage medium containing a communication program for running the communication device of claim 1, the communication program causing a computer to function as the network layer protocol controller.

17. A mobile phone, comprising the communication device of claim 1, the communication device performing communication.

18. A display device, comprising the communication device of claim 1, the display device producing a display from data received by the communication device.

19. A printing device, comprising the communication device of claim 1, the printing device printing from data received by the communication device.

20. A recording device, comprising the communication device of claim 1, the recording device recording data received by the communication device.

* * * * *